United States Patent

Sato et al.

[11] Patent Number: 5,824,240
[45] Date of Patent: Oct. 20, 1998

[54] NONLINEAR OPTICAL ELEMENT AND PROCESS FOR THE PREPARATION OF SAME

[75] Inventors: Katsuhiro Sato; Yoshiyuki Ono; Shigetoshi Nakamura, all of Minami-ashigara, Japan

[73] Assignee: Fuji Xerox Co. Ltd., Tokyo, Japan

[21] Appl. No.: 195,011

[22] Filed: Feb. 14, 1994

[30] Foreign Application Priority Data

| Feb. 12, 1993 | [JP] | Japan | 5-046158 |
| Mar. 18, 1993 | [JP] | Japan | 5-082503 |
| Jun. 4, 1993 | [JP] | Japan | 5-158142 |
| Jan. 12, 1994 | [JP] | Japan | 6-013110 |

[51] Int. Cl.$^6$ ............... F21V 9/00; F21V 9/04
[52] U.S. Cl. .......... 252/582; 252/584; 252/587; 359/328; 359/329
[58] Field of Search .......... 252/582, 587, 252/588, 589, 584; 359/326, 328, 329

[56] References Cited

U.S. PATENT DOCUMENTS

| 3,073,748 | 1/1963 | Utsumi et al. . | |
| 3,073,785 | 1/1963 | Angelo . | |
| 5,253,103 | 10/1993 | Boyd et al. | 359/329 |
| 5,432,635 | 7/1995 | Tanahashi | 252/582 |

FOREIGN PATENT DOCUMENTS

| 2-271933 | 11/1990 | Japan . |
| 3-119326 | 5/1991 | Japan . |
| 3-140035 | 6/1991 | Japan . |
| 3-199137 | 8/1991 | Japan . |

OTHER PUBLICATIONS

Takahashi et al., Chemical Abstracts, 115:209640, (1991).
R.K. Jain et al.; *Optical Society of America* vol. 73, No. 5; "Degenerate four–wave mixing in semiconductor–doped glasses"; May, 1983; pp. 647–653.

H. Jerominek et al.; *American Institute of Physics*; "Cds microcrystallites–doped thin–film glass waveguides"; Feb., 1988; pp. 957–959.

G.M. Porta et al.; *American Chemical Society*; "Copper/ Polyimide Multilayered Composites"; 1989; pp. 269–276.

M. Nogami et al., "CdS Microcrystal–Doped Silica Glass Prepared by the Sol–Gel Process", *Journal of Non–Crystalline Solids*, vol. 122 (1990), pp. 101–106.

M. Nogami et al., "Preparation and Quantum Size Effect of CuBr Microcrystal Doped Glasses by the Sol–Gel Process", *Journal of Non–Crystalline Solids*, vol. 134 (1991), pp. 71–76.

M. Nogami et al., "Preparation and Nonlinear Optical Properties of Quantum–Sized CuC1–Doped Silica Glass by the Sol–Gel Process", *J. Am. Ceram. Soc.*, vol. 74 (1991), pp. 238–240.

Journal of Chemistry Society of Japan, No. 10 (1992), pp. 1231–1236.

*Primary Examiner*—Philip Tucker
*Attorney, Agent, or Firm*—Oliff & Berridge

[57] ABSTRACT

The present invention provides a nonlinear optical element having a sufficient thickness that can be used as a thin film insusceptible to crack and a process for the preparation thereof. A novel nonlinear optical element which gives a nonlinear response to incident light is provided, comprising finely divided grains of a semiconductor or metal, which grains have been separated out with the reaction of a functional group in a matrix-forming substance containing said functional group, dispersed in a matrix. A process for the preparation of a nonlinear optical element which gives a nonlinear response to incident light is also provided, which comprises mixing a solution of a matrix-forming substance containing a functional group with a metal, a semiconductor or a precursor thereof to form a uniform solution, and then allowing said functional group to undergo reaction to form a matrix while allowing finely divided grains of said metal or semiconductor to be separated out in said matrix.

6 Claims, 6 Drawing Sheets

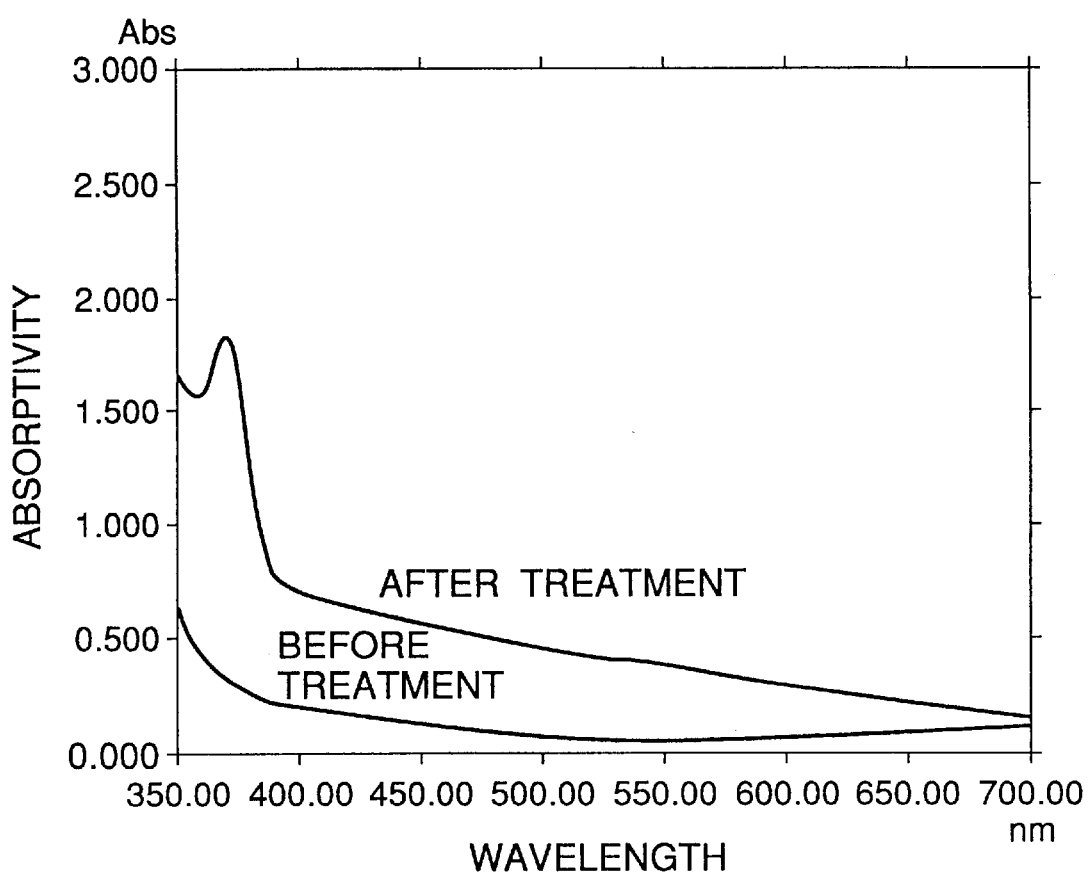

BEFORE HEAT TREATMENT

AFTER HEAT TREATMENT AT 200°C FOR 1 HR

APPARATUS FOR EVALUATING NONLINEAR
OPTICAL CHARACTERISTIC

NONLINEAR OPTICAL ELEMENT AND PROCESS FOR THE PREPARATION OF SAME

FIELD OF THE INVENTION

The present invention relates to a nonlinear optical element comprising finely divided grains of a semiconductor or metal exerting a nonlinear optical effect incorporated therein and a process for the preparation thereof. More particularly, the present invention relates to a nonlinear optical element comprising finely divided grains of a semiconductor or metal exerting a quantum sizing effect, which grains have been dispersed and separated out in a medium obtained by the hydrolysis of a high molecular organic compound, or a silane compound by sol-gel method, or in a mixture medium thereof and a process for the preparation thereof.

BACKGROUND OF THE INVENTION

With the development of data processing, a search has been made for materials exerting a great nonlinear optical effect for the purpose of realizing an optical theory element or optical switch on the basis of which photocomputers are developed. As nonlinear optical materials there have heretofore been known inorganic ferroelectric materials such as $LiNbO_3$, $BaTiO_3$ and $KH_2PO_4$, quantum well structure semiconductors comprising GaAs, etc., organic single crystals such as 4'-nitrobenzylidene-3-acetamino-4-methoxyaniline (MNBA) and 2-methyl-4-nitroaniline (MNA), conjugated organic high molecular compounds such as polydiacetylene and polyarylene vinylene, and semiconductor grain-dispersed glass comprising CdS, CdSSe, etc. dispersed in glass.

In particular, extensive studies have been made on semiconductor grain-dispersed glass as a favorable nonlinear optical material which exhibits both a high nonlinear optical susceptibility and a high response since Jain and Lind discovered in 1983 that a so-called color glass filter comprising semiconductor grains dispersed in glass exhibits a high three-dimensional nonlinear optical effect as described in J. Opt. Soc. Am., 73, 647 (1983).

The preparation of this kind of glass has been normally accomplished by a so-called melt-quenching method which comprises heat-melting a mixture of a powder of glass as a dispersant or starting material thereof and a powder of starting material of semiconductor or metal to make a glass melt, quenching the glass melt to around room temperature by casting on a metal plate or the like or like means to obtain a supercooled glass solid solution comprising semiconductor constituent elements dissolved therein as ions, and then subjecting the solid solution again to heat treatment at a proper temperature for a predetermined period of time to allow semiconductor grains to be separated out.

However, this method is disadvantageous in that it requires the starting material of semiconductor to be heated to a temperature as high as not lower than 1,000° C. where the material can undergo decomposition or evaporation, limiting the kind of applicable semiconductors and the amount of semiconductor to be added. This prevents the realization of a material having a higher nonlinear optical effect for practical use.

As other methods there have been proposed a method which comprises the use of glass or $SiO_2$ and an element semiconductor polycrystal such as CdS and CdT as a target in sputtering process to prepare a semiconductor grain-dispersed glass (as disclosed in J. Appl. Phys., 63 (3), 957 (1988), JP-A-2-307832), etc.

Further, an alternate method has been proposed which comprises the use of a high molecular compound as a matrix other than glass in a gas phase process such as vacuum metallizing to disperse finely divided grains of a semiconductor in the high molecular compound (as disclosed in JP-A-3-119326 and JP-A-3-140335). The gas phase process enables introduction of a large amount of semiconductor as compared to the above-mentioned melt-quenching method. In production of either inorganic matrix or organic matrix, the apparatus used for the gas phase process is expensive, and the speed of film formation is small so that it is suitable for formation of thin films but not thick films. Thus, the thus obtained element cannot be thick, resulting in limited applications.

As an approach for eliminating these difficulties there has been proposed a method which comprises dispersing and maintaining finely divided grains of a semiconductor or metal in a silica gel matrix formed by sol-gel method so that a semiconductor grain-dispersed glass can be prepared at a low temperature.

Examples of such a method include a method which comprises dispersing finely divided grains of a semiconductor prepared by CVD process or the like in a hydrolyzable solution of silicon alkoxide (sol), and then gelatinizing the sol so that the finely divided grains of a semiconductor are fixed in glass (as disclosed in JP-A-2-271933 (The term "JP-A" as used herein means an "unexamined published Japanese patent application")), a method which comprises adding finely divided grains of a semiconductor to a sol containing a silane coupling agent or allowing the finely divided grains to be separated out in the sol, and then gelatinizing the sol so that the finely divided grains are fixated in glass (as disclosed in JP-A-3-199137), and a method which comprises forming a silica gel containing cadmium acetate, and then reacting cadmium acetate with hydrogen sulfate gas to allow cadmium sulfate grains to be separated out in the silica gel to obtain a semiconductor grain-dispersed glass [as disclosed in the proceedings of The Ceramic Society of Japan's 1989 Annual Conference, lecture No. 2F20, J. Non-Cryst. Solids, 122, 101(1990)].

However, tetralkoxysilane used in the conventional sol-gel process can easily crack at the stage of drying the gel. Tetralkoxysilane is also disadvantageous in that it cannot give a sufficient film thickness if it is formed into a thin film on a substrate to make an element. In order to obtain a film thickness enough for element, an approach has been employed which comprises repeating the steps of coating a substrate with a thin film to a thickness of not more than about 0.1 $\mu$m, and then calcining the film at a temperature of hundreds of degrees C. to give an appropriate film thickness.

Further, if as a method for dispersing finely divided grains of a semiconductor in a silica gel matrix formed by sol-gel process there is a method which comprises preparing finely divided grains of a semiconductor by separate methods, and then dispersing the finely divided grains in a sol, it disadvantageous in that the addition of the procedure for the preparation of the finely divided grains of a semiconductor complicates the process. It is also disadvantageous in that the finely divided grains used have a grain diameter as small as not more than hundreds of nanometer and thus can be hardly handled, giving an undesirable factor in the preparation process. These finely divided grains can easily agglomerate and thus can be hardly dispersed uniformly in the medium.

JP-A-2-271933 describes that the dispersion of finely divided grains can be effectively improved by ultrasonic dispersion or the addition of a surface active agent. However, ultrasonic dispersion inevitably involves the agglomeration of finely divided grains during the coating and drying in the formation of a thin film. The latter approach is disadvantageous in that the surface active agent thus added is decomposed or volatilized during the heat treatment, causing the re-agglomeration of finely divided grains.

In this respect, JP-A-3-199137 discloses the use of a silane coupling agent instead of surface active agent in an attempt to solve the problem of agglomeration of finely divided grains. In this approach, the silane coupling agent acts like a surface active agent and undergoes hydrolysis to connect to a matrix, making the material thermally stable and relatively undecomposable. JP-A-3-199137 proposes as a method for solving the problem of handling finely divided grains of a semiconductor to be added to a sol a method which comprises adding finely divided grains of a semiconductor in the form of solution to a sol, and then forming finely divided grains of a semiconductor in the sol with the aid of a solution of a paired ion source or reactive gas. However, this method is disadvantageous in that the finely divided grains thus separated out have a difficulty of diffusion, making it difficult to allow finely divided grains of a semiconductor having a quantum size effect to be uniformly separated out. Thus, the effect of this method leaves much to be desired.

Unlike the foregoing method, a method which comprises preparing a gel solid containing semiconductor material ions, and then subjecting the gel solid to post-treatment with hydrogen sulfate gas or the like to allow finely divided grains of a semiconductor to be separated out have no problems of complicated specification due to handling of finely divided grains or no difficulty of diffusion. However, since this method requires the use of a highly toxic gas such as hydrogen sulfate, it gives a very dangerous working atmosphere that requires a complicated process for safety. In the process which comprises post-treatment to allow finely divided grains to be separated out, as a starting material of finely divided grains of a semiconductor or metal there may be used a material soluble in a reactive medium which is then uniformly dissolved in a solution so that finely divided grains can be uniformly separated out in the medium. However, some materials have no proper solvent, limiting the concentration of finely divided grains which can be added.

Sol-gel method is a low-temperature process compared with melt-quenching, however, it requires to heat to a temperature of about 600° C. Therefore, more low-temperature process is required to solve the problems such as decomposition of a semiconductor material by heating.

On the other hand, studies have been made on finely divided grains of a semiconductor or metal having a nonlinear optical effect. In particular, extensive studies have been made on the use of finely divided grains of cuprous halide which have excitons having a small Bohr diameter that can be effectively confined to give a great three-dimensional nonlinear optical effect (as described in Journal of Non-Crystalline Solids, 134(1991), pp. 71–76, Journal of American Ceramic Society, 74(1991), pp. 238–240, Journal of Chemistry Society of Japan, No. 10 (1992), pp. 1231–1236). These cuprous halides are not soluble in a silane compound such as tetraethoxysilane [$Si(OCH_2CH_3)_4$], which has been heretofore used as a starting material of medium. Thus, the solvents in which these cuprous halides are soluble are limited. Further, since these cuprous halides have a low solubility, the amount of these cuprous halides which can be uniformly dissolved in a sol is low, making it impossible to allow finely divided grains to be separated out in a high concentration in a gel as a product. In general, the higher the concentration of finely divided grains to be added is, the higher can be expected the nonlinear optical effect. For the purpose of obtaining a material exerting a high nonlinear optical effect, a method has been sought for adding cuprous halides in a high density.

Further, if an easily oxidizable material such as cuprous halide is separated out, it undergoes deterioration such as oxidation and decomposition in a sol or during heat deposition, making it difficult to dope the sol with such a material.

SUMMARY OF THE INVENTION

It is thus an object of the present invention to provide a nonlinear optical element which has an enough thickness and can be used as a thin film insusceptible to crack.

It is another object of the present invention to provide a nonlinear optical element which exhibits excellent workability for the formation of an element, mechanical strength, environmental resistance and storage stability.

It is a further object of the present invention to provide a nonlinear optical element comprising a matrix having finely divided grains of a semiconductor or metal dispersed and retained uniformly therein in a high concentration and enabling these finely divided grains to fully attain their functions.

It is a still further object of the present invention to provide a process for the preparation of a nonlinear optical element which enables an easy preparation of the foregoing nonlinear optical element by means of a simple apparatus in a low temperature.

These and other objects of the present invention will become more apparent from the following detailed description and examples.

The inventors made extensive studies on a material which forms a medium having finely divided grains of a semiconductor or metal dispersed and retained therein. As a result, it was found that any material which enables a semiconductor or metal component incorporated therein to be separated out in the form of finely divided grains by heat treatment or chemical treatment, even though it is an organic high molecular material not to mention a high molecular inorganic material, can be used as a matrix of nonlinear optical element, i.e., can be formed into a thin film having a thickness enough for such an element. Thus, the present invention has been worked out.

The foregoing objects of the present invention are accomplished with a nonlinear optical element which gives a nonlinear response to incident light, comprising finely divided grains of a semiconductor or metal, which grains have been separated out with the reaction of a functional group in a matrix-forming substance containing the functional group, dispersed in a matrix.

The foregoing objects of the present invention are also accomplished by a process for the preparation of a nonlinear optical element which gives a nonlinear response to incident light, which comprises mixing a solution of a matrix-forming substance containing a functional group with a metal, a semiconductor or a precursor thereof to form a uniform solution, and then allowing said functional group to undergo reaction to form a matrix while allowing finely divided grains of said metal or semiconductor to be separated out in said matrix, i,e., reducing or eliminating an interaction between the functional group and the metal, semiconductor or precursor thereof to separate out in situ by way of a functional reaction. After the functional reaction for precipitation of the fine grains, the grain-forming compounds may be chemically modified by reduction with a reducing agent (e.g., hydrogen, sodium borohydride) or by a reaction with sulfides (e.g., hydrogen sulfide, sodium sulfide). The matrix-forming substance having a functional group contains at least one high or low molecular compound having a functional and is capable of forming a matrix. Namely, the matrix-forming substance is a substance capable of forming an inorganic high molecular compound, or an organic high or low molecular compound in the resulting matrix upon the functional reaction and of constituting the composition of the final matrix other than the fine grains of metal or semiconductor. In the case where the substance having a functional groups is capable of providing a final matrix having a sufficiently high mechanical strength, such may be used along without other substances. The substance having a functional group may be also used in the form of mixture with other high molecular compound having no functional group so as to adjust the properties (e.g., mechanical strength, refractive index, dielectric constant) of the final matrix.

The functional reaction as mention above refers to a reaction of reducing or eliminating the interaction between the functional group of the matrix-forming substance and the metal, semiconductor or precursor thereof to accelerate precipitation of metal or semiconductor in the form of fine grains. Any functional groups may be used as long as they exhibit an interaction with the metal, semiconductor or precursor thereof to accelerate dissolution, in other words, to increase its doped amount before the functional reaction, and they do not inhibit (rather, accelerate) precipitation of the fine grains after the functional reaction. The functional group is exemplified with a carboxyl group, an amino group, an amido group, and a hydroxyl group, and examples of the functional group include intramolecular reactions or intermolecular reactions resulting on structural changes, such as cyclization, condensation, addition reaction, elimination reaction, and the like. These reactors are initiated by heat, chemical agents such as catalysts, light, or the like. Typical examples of the functional reaction are (1) imide ring formation reaction by heat treatment or chemical treatment, (2) reaction of a functional group such as a carboxyl group, an amino group, a hydroxyl group and a carboxylic anhydride with an isocyanate group or an epoxy group, (3) acid addition salt formation reaction by acid treatment of an amino compound, and (4) others.

The first embodiment of the nonlinear optical element according to the present invention is characterized in that finely divided grains of a semiconductor or metal are dispersed in a high molecular compound formed by thermosetting or chemical treatment, particularly a high molecular compound containing a repeating structural unit represented by the following general formula (1) or a compound containing the high molecular compound:

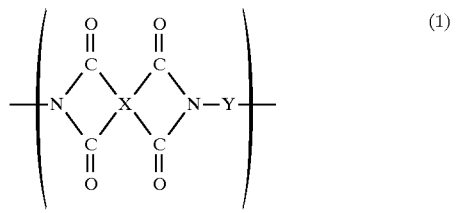

wherein X represents a tetravalent organic group having not less than 2 carbon atoms; and Y represents a divalent organic group having not less than 2 carbon atoms.

The second embodiment of the nonlinear optical element according to the present invention is characterized in that finely divided grains of a semiconductor or metal are dispersed in a high molecular compound containing an imide structure represented by any one of the following general formulae (2) to (4) in its side chain or crosslinked moiety or a matrix containing the high molecular compound:

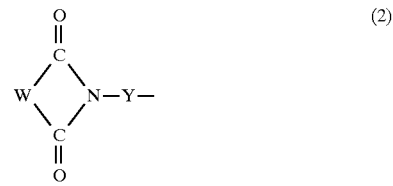

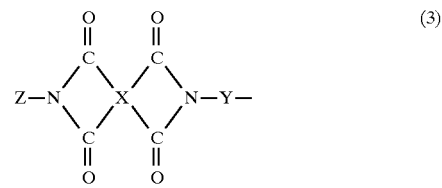

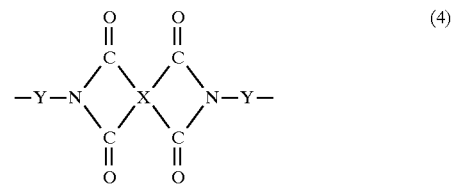

wherein x and Y are as defined above; W represents an organic group having not less than 2 carbon atoms necessary for the formation of an imide ring; and Z represents an alkyl, aryl or aralkyl group.

The third embodiment of the nonlinear optical element according to the present invention is prepared by a process which comprises incorporating, in a matrix containing a high molecular compound having at least one functional group which interacts with a metal or semiconductor or its starting material to accelerate dissolution of the metal or semiconductor or its starting material (hereafter "interaction-exhibiting high molecular compound), (i) the metal or semiconductor or its starting material and (ii) a compound which reacts with said functional group to reduce or eliminate its interaction with said metal or semiconductor or its starting material (hereafter "interaction-eliminating compound"), and then subjecting the material to heat treatment. In some detail, finely divided grains of a semiconductor or metal are dispersed in a matrix formed by reacting a high molecular compound containing a functional group such as a carboxyl group, an amino group, a hydroxyl group and carboxylic anhydride with a compound containing an epoxy group or an isocyanate group, etc.

The fourth embodiment of the nonlinear optical element according to the present invention is characterized in that finely divided grains of a semiconductor or metal are dispersed in an organic compound whose chemical structure has been changed by heat treatment or chemical treatment, particularly a mixture of a compound represented by the following general formula (5) and a high molecular compound as a matrix:

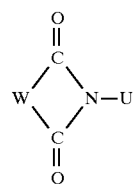
(5)

wherein W is as defined above; and U represents an monovalent organic group which may be substituted by an imide ring.

The fifth embodiment of the nonlinear optical element according to the present invention is characterized in that the matrix is an acid salt of an ammonium salt-containing high molecular compound, preferably an amino-containing high molecular compound consisting of repeating structural units represented by the following general formula (6) or a substance containing the high molecular compound, in which finely divided grains of a semiconductor or metal are dispersed:

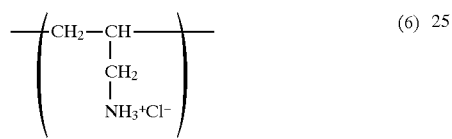
(6)

The sixth embodiment of the nonlinear optical element according to the present invention is characterized in that the matrix is a high molecular compound consisting of repeating structural units represented by the following general formula (7) or a substance containing the high molecular compound, in which finely divided grains of a semiconductor or metal are dispersed:

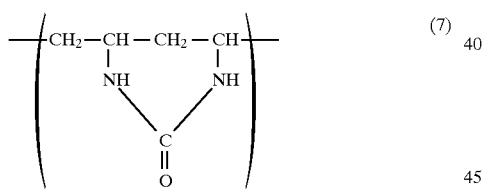
(7)

The seventh embodiment of the nonlinear optical element according to the present invention is characterized in that the matrix is a mixture of a high molecular compound and a hydrolyzate of a compound comprising a hydrolyzable substituent bonded to a trivalent atom or a tetravalent atom other than carbon, said high molecular compound being selected from the group consisting of a high molecular compound having a repeating unit represented by formula (1); a high molecular compound having an imido structure of formula (2), (3) or (4) at its side chain or crosslinked moiety; a compound obtained by the reaction of a high molecular compound having a carboxyl group, an amino group or a hydroxyl group and a compound having an epoxy group or an isocyanate group; an organic compound represented by formula (5); an amino group-containing high molecular compound have a repeating unit represented by formula (6); and a high molecular compound having a repeating unit represented by formula (7), in which matrix finely divided grains of a semiconductor or metal are dispersed:

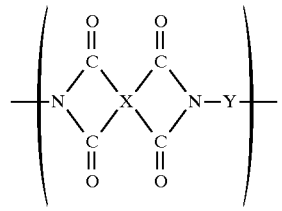
(1)

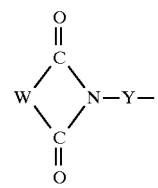
(2)

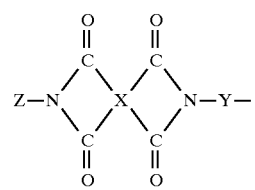
(3)

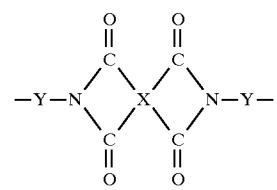
(4)

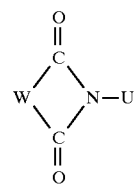
(5)

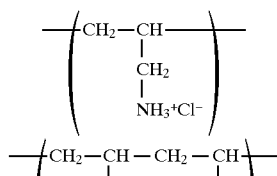
(6)

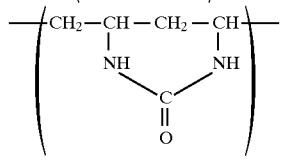
(7)

wherein X represents a tetravalent organic group having not less than 2 carbon atoms; Y represents a divalent organic group having not less than 2 carbon atoms; W represents an organic group having not less than 2 carbon atoms necessary for the formation of an imide ring; Z represents an alkyl, aryl or aralkyl group; and U represents a monovalent organic group which may contain a substituent capable of forming an imide ring.

The eighth embodiment of the nonlinear optical element according to the present invention is characterized in that the matrix is a hydrolyzate of a compound having a hydrolyzable substituent bonded to a trivalent atom or a tetravalent atom other than carbon atom, preferably a hydrolyzate of a silane compound represented by the following general formula (8) or (8A), in which matrix finely divided grains of a semiconductor or a metal are dispersed:

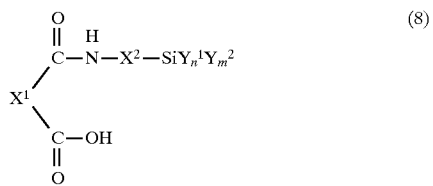
(8)

wherein $X^1$ and $X^2$ each represent a divalent organic group having not less than 2 carbon atoms; and the plurality of $Y^1$'s may be the same or different and each represent a hydrolyzable functional group.

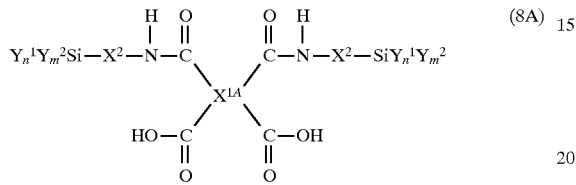
(8A)

wherein $X^{1A}$ represents tetravalent organic residue having not less than two carbon atoms; the plurality of $X^2$ may be the same or different and each represents a divalent organic residue having not less than two carbon atoms; the plurality of $Y^1$ may be the same or different and each represents a hydrolyzable functional group; $Y^2$ represents a monovalent or divalent non-hydrolyzable organic group; n is an integer of 1 to 3; and m is 0, 1, or 2.

The ninth embodiment of the nonlinear optical element according to the present invention is characterized in that the matrix is a hydrolyzate of a polyamide compound containing in its main chain or side chain a silyl group having one or more hydrolyzable substituents or a medium consisting of the polyamide compound and a hydrolyzate of a compound having a hydrolyzable substituent bonded to a trivalent atom or tetravalent atom, in which matrix finely divided grains of a semiconductor or metal are dispersed.

The first embodiment of the nonlinear optical element according to the present invention can be prepared by a process which comprises subjecting a thermosetting material, particularly a high molecular compound having repeating structural units represented by the following general formula (9), as a functional group-containing matrix-forming substance to heat treatment or chemical treatment so that finely divided grains of a semiconductor or metal are separated out:

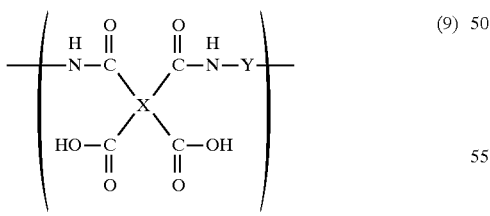
(9)

wherein X represents a tetravalent organic group having not less than 2 carbon atoms; and Y represents a divalent organic group having not less than 2 carbon atoms.

The second embodiment of the nonlinear optical element according to the present invention can be prepared by a process which comprises the use of at least one high molecular compound having in its side chain or crosslinked moiety an amide acid structure represented by any one of the following general formulae (10) to (12) as a functional group-containing matrix-forming substance:

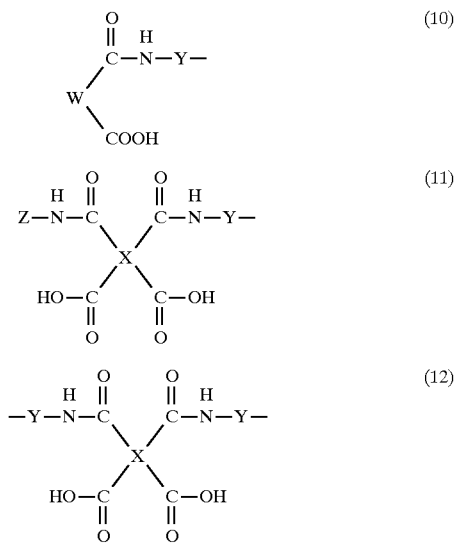

wherein X and Y are as defined above; W represents an organic group having not less than 2 carbon atoms necessary for the formation of an imide ring; and Z represents an alkyl, aryl or aralkyl group.

The third embodiment of the nonlinear optical element according to the present invention can be prepared by a process which comprises dissolving in a solution of a interaction-exhibiting high molecular compound with an interaction-eliminating compound, removing the solvent therefrom, and then subjecting the material to heat treatment. In some detail, it can be prepared by the use of a mixture of a high molecular compound containing a functional group such as a carboxyl group, an amino group, a hydroxyl group and a carboxylic anhydride and a compound having an epoxy group or an isocyanate group as a functional group-containing matrix-forming substance.

The fourth embodiment of the nonlinear optical element according to the present invention can be prepared by a process which comprises the use of a mixture of a compound represented by the following general formula (13) and a high molecular compound as a functional group-containing matrix-forming substance:

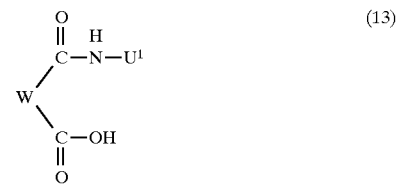
(13)

wherein W is as defined above; and $U^1$ represents an organic group which may contain a substituent capable of forming an imide ring.

The fifth embodiment of the nonlinear optical element according to the present invention can be prepared by a process which comprises the use of an amino-containing high molecular compound, preferably an amino-containing high molecular compound containing repeating structural units represented by the following general formula (14), as a functional-containing matrix-forming substance:

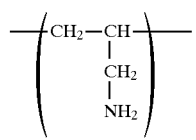

(14)

The sixth embodiment of the nonlinear optical element according to the present invention can be prepared by a process which comprises the use of a high molecular compound containing repeating structural units represented by the following general formula (15) as a functional group-containing matrix-forming substance:

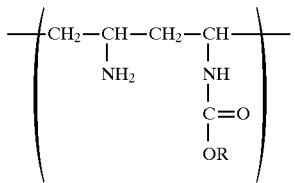

(15)

wherein R represents an alkyl group.

The seventh embodiment of the nonlinear optical element according to the present invention can be prepared by a process which comprises the use of a mixture of a high molecular compound consisting of repeating structural units represented by the foregoing general formula (9) and a hydrolyzate of a compound having a hydrolyzable substituent bonded to a trivalent atom or a tetravalent atom other than a carbon atom as a functional group-containing matrix-forming substance.

The eighth embodiment of the nonlinear optical element according to the present invention can be prepared by a process which comprises the use of a silane compound represented by the foregoing general formula (8) or (8A) as a functional group-containing matrix-forming substance.

The ninth embodiment of the nonlinear optical element according to the present invention can be prepared by a process which comprises the use of a polyamic acid compound containing in its main chain or side chain a silyl group having at least one hydrolyzable substituent as a functional group-containing matrix-forming substance.

BRIEF DESCRIPTION OF THE DRAWINGS

By way of example and to make the description more clear, reference is made to the accompanying drawings in which:

FIG. 6 shows an absorption spectrum of a high molecular compound/CuCl composite film of Example 11;

FIGS. 7(a) and 7(b) shows an infrared absorption spectrum of Example 34 wherein FIG. 7(a) shows the result obtained after coated and dried and FIG. 7(b) shows the result after heat treatment at 200° C. for 1 hour;

DETAILED DESCRIPTION OF THE INVENTION

Figure 1A:
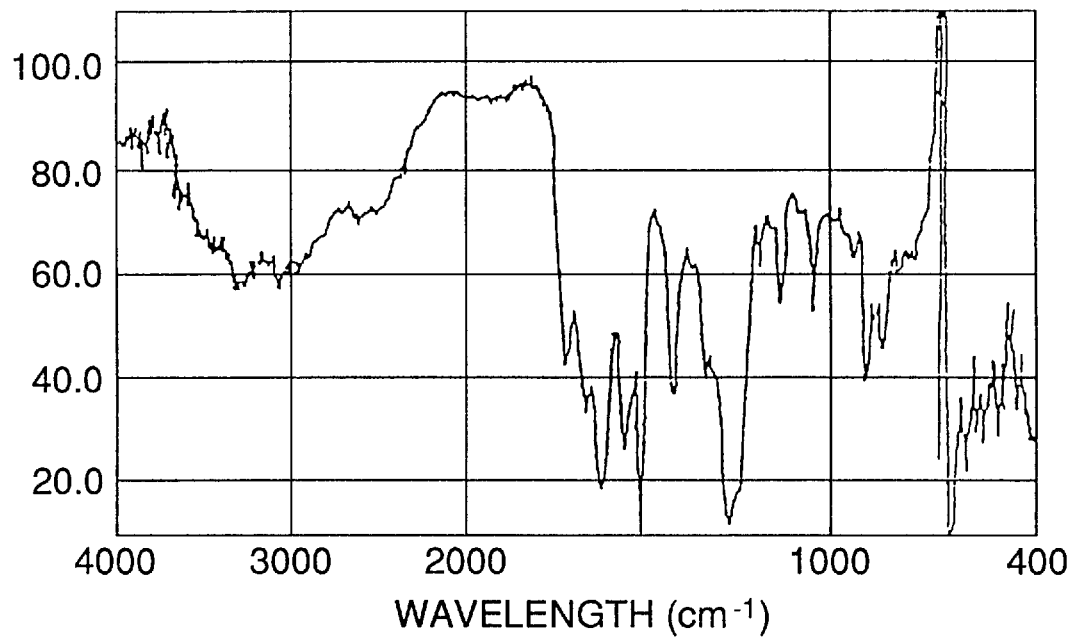
FIGS. 1(a) and 1(b) shows an infrared absorption spectrum of composite films of Examples 1, 2 and 5 before and after treatment, respectively.

The present invention will be further described hereinafter.

In every embodiment of the present invention as described above, the matrix contains fine grains of metal or semiconductor generally in an amount of 0.01 to 99.0% by weight, preferably 0.1 to 99.0% by weight and particularly 10.0 to 95.0% by weight, based on the total weight of the non-linear optical element. The matrix substance may also contain another matrix substance, preferably not more than 50% by weight, preferably not more than 30% by weight.

In the present invention, the imide ring formation reaction (1) corresponds to the formation of the foregoing first, second, fourth, seventh, eighth and ninth embodiments of the nonlinear optical element. The reaction (2) corresponds to the formation of the third embodiment of the nonlinear optical element. The acid addition seat formation reaction (3) corresponds to the formation of the fifth embodiment of the nonlinear optical element. The hydrolysis reaction (4) corresponds to the formation of the sixth embodiment of the nonlinear optical element.

In the present invention, the first embodiment of the nonlinear optical element preferably comprises a high molecular compound having repeating structural units represented by the foregoing general formula (1) which can be prepared from a high molecular compound having repeating structural units represented by the foregoing general formula (9). Any other high molecular compounds can be similarly used so far as they are thermosetting. In other words, any high molecular compounds which in the form of precursor can thoroughly make a solid solution of a semiconductor or metal or its starting material, which undergo thermosetting reaction to change its chemical properties, or which are thoroughly transparent to the wavelength of light used, i.e., the wavelength at which finely divided grains of a semiconductor or metal exhibit a great nonlinear optical effect can be used.

X has one or two benzene nuclei which may be substituted. When X has two benzene nuclei, the two benzene nuclei connect directly or connect via an alkylene group having 1 to 10 carbon atoms which may be substituted by an oxygen atom, a carbonyl group or a halogen atom. X preferably has an unsubstituted benzene nucleus. X has 2 to 30 carbon atoms, preferably 6 to 20 carbon atoms.

Y has an aromatic group which may be substituted by one or two substituents. When Y has two benzene nuclei, the two benzene nuclei connect directly or connect via an alkylene group having 1 to 10 carbon atoms which may be substituted by an oxygen atom, a sulfur atom or a halogen atom. Examples of a substituent of the benzene nuclei include an alkyl group having 1 to 5 carbon atoms which may be substituted by a halogen atom, an alkoxy group having 1 to 5 carbon atoms or a halogen atom. Y has 2 to 30 carbon atoms, preferably 6 to 20 carbon atoms.

Referring further to the high molecular compound having repeating structural units represented by the general formula (9) used as a precursor of such a high molecular compound, examples of X in the general formula (9) include organic residues represented by the following structural formulae:

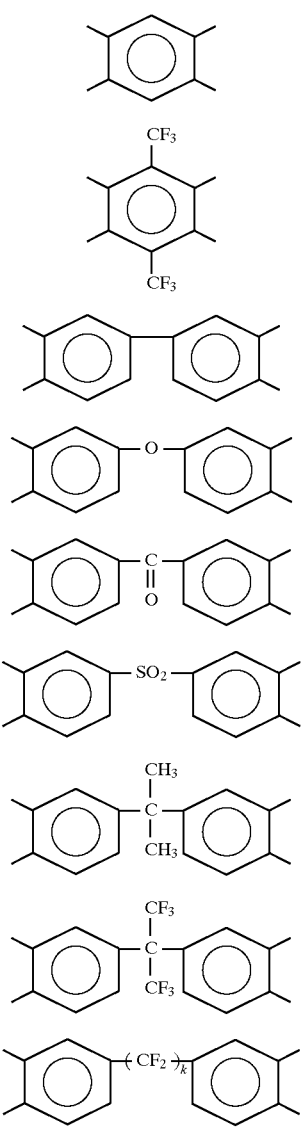
wherein k represents an integer 1 to 6.
Examples of Y include organic residues represented by the following structural formulae:
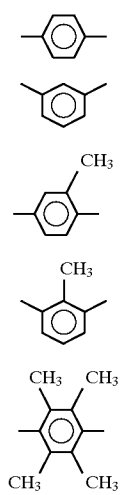
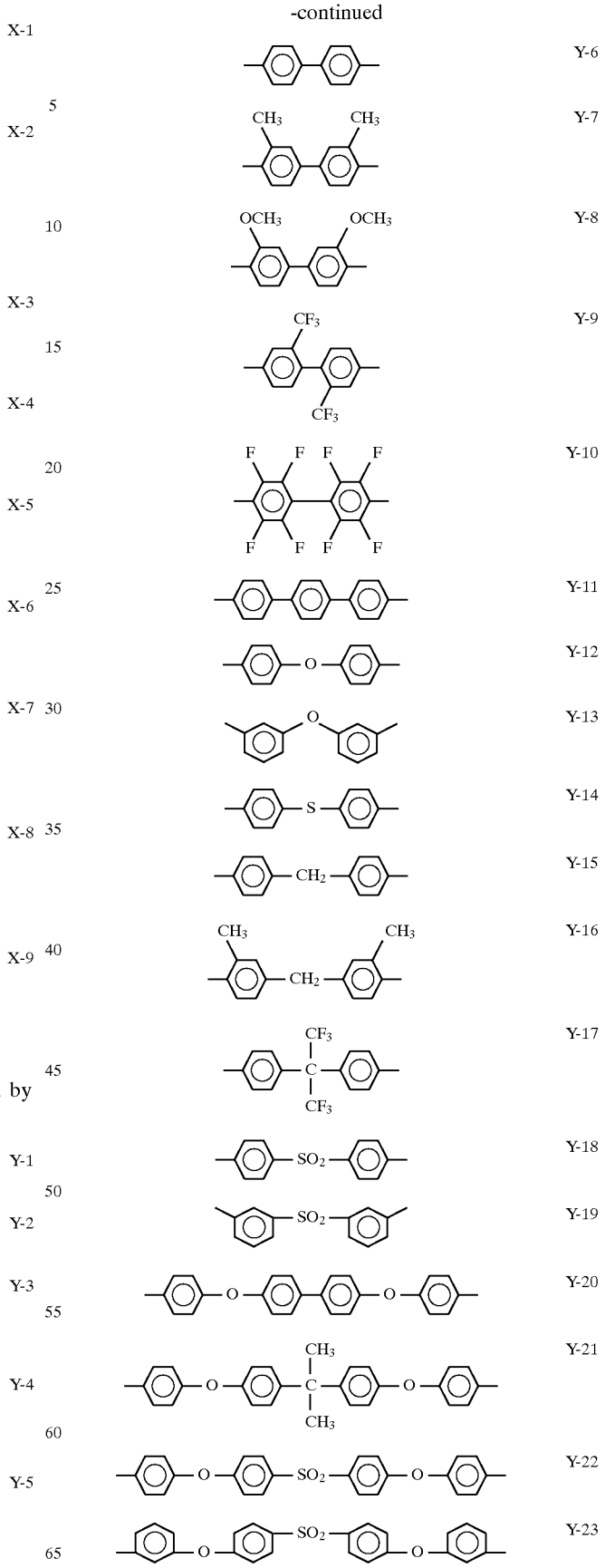

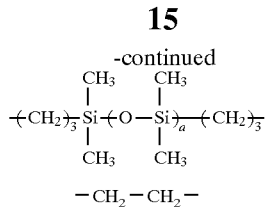

Y-24

$-CH_2-CH_2-$    Y-25 wherein a represents an integer 1 to 1,000.

These exemplary high molecular compounds can be synthesized from a tetracarboxylic dihydrate having a chemical structure represented by X and a diamine having a structure represented by Y. These high molecular compounds are soluble in a polar organic solvent such as dimethylformamide, dimethylacetamide, n-methylpyrrolidone, dimethyl sulfoxide, dimethyl sulfonamide, m-cresol, p-chlorophenol, dimethylimidazoline, tetramethylurea, diglyme, triglyme and tetraglyme. Thus, these high molecular compounds can be easily formed into a film by spin coating or dip coating process or worked into a fiber. The intrinsic viscosity [η] of these high molecular compounds is preferably in the range of 0.1 to 6 dl/g at a temperature of 30° C. in a solvent such as dimethylacetamide. The intrinsic viscosity as defined herein is determined by extrapolating the relative viscosity or reduced viscosity at various concentrations calculated from measurements of the relative viscosity at various polymer concentrations to the concentration of 0. Further, these high molecular compounds contain many amide acid structures as functional groups to interact with various inorganic elements and inorganic compounds. Thus, these high molecular compounds, in the form of solution or solid free of solvent, can comprise a metal or semiconductor or a compound as its starting material stably dissolved therein in a relatively high concentration. When heated or subjected to chemical treatment after dipped in a mixture of acetic anhydride and pyridine (about 1:1), these high molecular compounds undergo the following reaction.

The heat treatment can be effected at a temperature of 100° to 400° C., preferably 150° to 300° C., for example, as relatively low as around 200° C., and for 1 minute to 5 hours, preferably 5 minutes to 3 hours. Examples of solvents which can be used besides the foregoing solvents include a mixture of acetic anhydride, pyridine and benzene and a mixture of acetic anhydride, pyridine and dimethylacetamide. The solvent treatment is conducted by stirring in a solvent.

The foregoing dissolution, heating and chemical treatment are all preferably effected in vacuo or in an inert atmosphere.

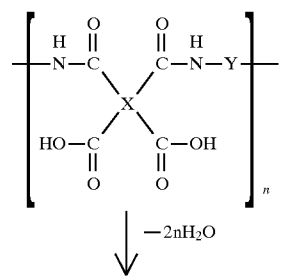

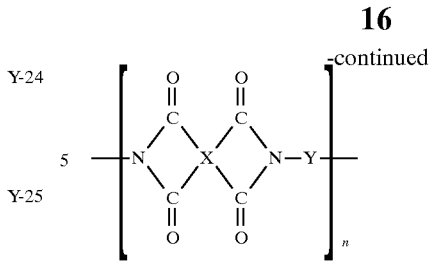

wherein n represents a polymerization degree.

When the foregoing reaction occurs, the elimination of the amide acid structure contained in the high molecular compound which is a matrix is followed by the formation of an imide ring structure with the deposition of the metal or semiconductor or the compound as its starting material which has been dissolved as a dopant in the high molecular compound. Other high molecular compound may be also used so as to adjust the physical properties (e.g., mechanical strength, refractive index, dielectric constant) of the final matrix.

In the second embodiment of the nonlinear optical element according to the present invention, the matrix consists of or comprises a high molecular compound having its side chain or crosslinked moiety an imide structure represented by any one of the foregoing general formulae (2) to (4). This high molecular compound can be prepared by a process which comprises dissolving a semiconductor or metal or its starting material in a solution of at least one high molecular compound having in its side chain or crosslinked moiety an amide acid structure represented by any one of the foregoing general formulae (10) to (12) or a mixture thereof with other high molecular compounds, removing the solvent therefrom, and then subjecting the material to heat treatment or chemical treatment. The amount of the above other high molecular compounds is 50 wt % or less, preferably 30 wt % or less based on the total amount of the matrix.

In the foregoing general formulae (2) to (4) and (10) to (12), W represents an organic group having not less than 2 carbon atoms necessary for the formation of an imide ring. Specific examples of such an organic group include the following groups:

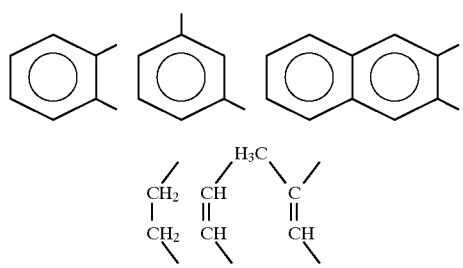

Z represents an alkyl group having 1 to 5 carbon atoms, aryl group having 6 to 20 carbon atoms or aralkyl group having 7 to 20 carbon atoms. Specific examples of Z include a methyl group, an ethyl group, a benzyl group, a p-methylphenyl group, and a p-methoxyphenyl group.

The at least one high molecular compound having in its side chain or crosslinked moiety an amide acid structure represented by any one of the foregoing general formulae (10) to (12) to be used in the present invention is not specifically limited but is preferably one which thoroughly makes a solid solution of a metal or semiconductor or its starting material, which undergoes heat treatment or chemical treatment to change its chemical properties or which exhibits a sufficiently small absorption at the wavelength of light used, i.e., the wavelength at which finely divided grains of a semiconductor exhibits a great nonlinear optical effect.

As such a high molecular compound there may be used one having an imide structure which has been derived from a high molecular compound having an imide precursor structure as described below by heat treatment or chemical treatment. In other words, the main chain structure of the high molecular compound having its side chain or crosslinked moiety an imide precursor structure is not specifically limited. Examples of such a main chain structure include polyethylene resin, polystyrene resin, polyacrylate resin, polymethacrylate resin, polycarbonate resin, polyester resin, cellulose resin, silicone resin, vinyl polymer, polyamide resin, polyamide-imide resin, polyurethane resin, polyurea resin, and copolymers thereof. The desired high molecular compound is selected from the group consisting of high molecular compounds having such a main chain structure and having in its side chain or crosslinked moiety at least one imide precursor structure. The desired high molecular compound may have a polymer structure formed with a high molecular compound having the same main chain structure as mentioned above free of imide precursor structure. Such a high molecular compound may be used in the form of mixture of two or more such high molecular compounds or in admixture with a high molecular compound having the same main chain structure as mentioned above free of imide precursor structure depending on the purpose of controlling the physical properties (e.g., mechanical strength, refractive index, dielectric constant) so far as its optical transparency is not lowered by phase separation. Examples of the imide precursor structure contained in the side chain or crosslinked moiety in the high molecular compound include a carboxyl group, an amino group, and an amide acid group, which are converted to an imide structure when subjected to heat treatment or chemical treatment. An imide precursor structure having an amide acid structure which can be easily changed to an imide structure even in a solid phase is desirable. This amide acid can be obtained by reacting a high molecular compound having in its side chain or crosslinked moiety an amino group with a dicarboxylic anhydride or tetracarboxylic dianhydride or reacting a high molecular compound having in its side chain or crosslinked moiety an acid anhydride structure with an amine or diamine. Alternatively, the similar reaction may be effected at the stage of monomer to synthesize a monomer having an amide acid structure which is then allowed to undergo polymerization reaction to obtain a high molecular compound having in its side chain or crosslinked moiety an imide precursor structure.

These high molecular compounds are soluble in a polar organic solvent such as dimethylformamide, dimethylacetamide, n-methylpyrrolidone, dimethyl sulfoxide, dimethyl sulfonamide, m-cresol, p-chlorophenol, dimethylimidazolidone, tetramethylurea, diglyme, triglyme and tetraglyme. Thus, these high molecular compounds can be easily formed into a film by spin coating or dip coating process or worked into a fiber. The intrinsic viscosity [η] of these high molecular compounds is preferably in the range of 0.1 to 6 dl/g at a temperature of 30° C. in a solvent such as a dimethylacetamide. Further, these high molecular compounds contain amide acid structures as functional groups to interact with various inorganic elements and inorganic compounds. Thus, these high molecular compounds, in the form of solution or solid free of solvent, can comprise a metal or semiconductor or a compound as its starting material stably dissolved therein in a relatively high concentration. When heated or subjected to chemical treatment with a mixture of acetic anhydride and pyridine, these high molecular compounds undergo dehydration and ring closure to become high molecular compounds having an imide structure represented by any one of the foregoing general formulae (2) to (4). The heat treatment is effected at a temperature not higher than the decomposition temperature of these high molecular compounds.

When the foregoing reaction occurs, the amide acid structure contained in the high molecular compound which is a matrix is eliminated with the subsequent formation of an imide ring structure as well as the deposition of the metal or semiconductor or the compound as its starting material which has been dissolved as a dopant in the high molecular compound.

In the third embodiment of the nonlinear optical element according to the present invention, the matrix is formed by subjecting a mixture of a high molecular compound containing a functional group such as a carboxyl group, an amino group, a hydroxyl group or a carboxylic anhydride and a compound containing a group such as an epoxy group and an isocyanate group to heat treatment or other treatment. In some detail, the matrix is prepared by a process which comprises dissolving in a solution of an interaction-exhibiting high molecular compound with an interaction-eliminating compound, removing the solvent therefrom, and then subjecting the material to heat treatment or other treatment. More particularly, the matrix is preferably prepared by a process which comprises dissolving in a solution of an interaction-exhibiting high molecular compound with an interaction-eliminating compound (first step), forming the solution by coating or other methods, removing the solvent therefrom to obtain a solid solution (second step), and then subjecting the solid solution to heat treatment (third step) to prepare a desired composite material having microcrystals of a semiconductor or metal separated out therein. The matrix can also be produced by dissolving a metal or semiconductor or its starting material in a solution of the interaction-exhibiting high molecular compound, removing the solvent, dispersing the interaction-eliminating compound, in the resulting medium and then heating the medium. The composite material may be optionally subjected to reduction with hydrogen or chemical treatment with a sulfide such as hydrogen sulfide.

The high molecular compound having a carboxyl group, an amino group, a hydroxy group or a carboxylic anhydride group reacts with an equivalent amount of another high molecular compound having an isocyanate group or an epoxy group. These high molecular compounds are charged in a reactor in the ratio of the former to the latter of from 10/1 to 1/3, preferably 4/1 to 1/2, and more preferably from 4/1 to 1/1.

The interaction-exhibiting high molecular compound to be used in the present invention is not specifically limited but is preferably one which thoroughly makes a solid solution of a metal or semiconductor or its starting material, which can easily undergo heat reaction with an interaction-eliminating compound or which exhibits a sufficiently small absorption at the wavelength of light used, i.e., the wavelength at which finely divided grains of a semiconductor exhibits a great nonlinear optical effect.

As such an interaction-exhibiting high molecular compound there may be used one set forth below. In other words, the main chain structure of the high molecular compound is not specifically limited so far as it has a reactive functional group such as a carboxyl group, an amino group, hydroxyl group and carboxylic anhydride in its side chain or crosslinked moiety. Examples of such a main chain structure include polyethylene resin, polystyrene resin, polyacrylate resin, polymethacrylate resin, polycarbonate resin, polyester resin, cellulose resin, silicone resin, vinyl polymer, polyamide resin, polyamide-imide resin, polyurethane resin, polyurea resin, and copolymers thereof. The interaction-exhibiting high molecular compound may have a copolymer structure formed with a high molecular compound having the same main chain structure as mentioned above free of reactive functional group such as a carboxyl group, an amino group, a hydroxyl group and carboxylic anhydride. Such a high molecular compound may be used in the form of mixture of two or more such high molecular compounds or in admixture with a high molecular compound having the same main chain structure as mentioned above free of reactive functional group such as a carboxyl group, an amino group, hydroxyl group and carboxylic anhydride depending on the purpose of controlling the physical properties (e.g., mechanical strength, refractive index, dielectric constant) so far as its optical transparency is not lowered by phase separation.

The interaction-eliminating compound is not specifically limited. Examples of such an interaction-eliminating compound include polyisocyanates such as monoisocyanate and diisocyanate and polyepoxide compounds such as monoepoxide and diepoxide, which can react with the functional group. Two or more these compounds may be used in combination. Alternatively, compounds having these reactive groups bonded to high molecular compounds may be used.

If a polyisocyanate such as diisocyanate or polyepoxide such as diepoxide is used, it serves as a crosslinking agent for high molecular compound to improve the solvent resistance thereof. Taking into account flexibility or the like, it may be used in admixture with a monoepoxide or in combination with a monoisocyanate. These compounds are not specifically limited so far as they can react with the foregoing functional group. Examples of these compounds will be set forth below.

Examples of these compounds include isocyanates such as methylisocyanate, ethylisocyanate, chloroethylisocyanate, propylisocyanate, butylisocyanate, cyclohexylisocyanate, phenylisocyanate, methylphenylisocyanate, methoxyphenylisocyanate, chlorophenylisocyanate, nitrophenylisocyanate, carboethoxyisocyanate, toluenesulfonylisocyanate and biphenylisocyanate, polyisocyanates such as hexamethylene-1,6-diisocyanate, diphenylmethanediisocyanate, toluenediisocyanate, naphthalene-1,5-diisocyanate and benzene-1,3,5-triisocyanate, monoepoxides such as 1,2-epoxycyclohexane, 1,2-epoxy-3-phenylpropane, 3,4-epoxy-2,2,5,5-tetramethyl-3-phenylhexane and phenolglycidylether, polyepoxides such as 2',3,2',3'-diepoxydicyclopentylether, bisphenol A-diglycidylether, bisphenol C-diglycidylether, bisphenol Z-diglycidylether, glycerintriglycidylether, triglycidyl-p-aminophenol, trihydroxybiphenyltriglycidylether and bisresorcinoltetraglycidylether, and high molecular compounds having the foregoing reactive groups in the main chain or side chain in polyethylene resin, polystyrene resin, polyacrylate resin, polymethacrylate resin, polycarbonate resin, polyester resin, cellulose resin, silicone resin, vinyl resin, polyamide resin, polyamide-imide resin, polyurethane resin or polyurea resin.

The interaction-exhibiting high molecular compound, optionally in admixture with a high molecular compound free of the functional group, and the interaction-eliminating compound may be dissolved in a polar solvent such as dimethylformamide, dimethylacetamide, n-methylpyrrolidone, dimethylsulfoxide, dimethylsulfonamide, m-cresol, p-chlorophenol, dimethylimidazolidone, tetramethylurea, diglyme, triglyme, tetraglyme and sulforan as well as a halogenated solvent such as methylene chloride and chloroform, an alcohol such as methanol, ethanol, butanol and terpineol, a ketone such as acetone and methyl ethyl ketone, an ester such as ethyl acetate and butyl acetate, an ether such as diethyl ether and dibutyl ether or a hydrocarbon solvent such as toluene, xylene and tridecane, mixed with a metal or semiconductor or its starting material as mentioned later, and then subjected to coating process such as spin coating and dip coating to make a film or subjected to other forming processes to make a form. The material can also be worked into a fiber. The foregoing interaction-exhibiting high molecular compound preferably exhibits an intrinsic viscosity $[\eta]$ of 0.1 to 6 dl/g in a solvent such as a dimethylacetamide at a temperature of 30° C.

The foregoing functional group-containing interaction-exhibiting high molecular compound interacts with various inorganic elements and inorganic compounds to form a complex or salt to accelerate the dissolution of the inorganic elements and inorganic compounds. Thus, these high molecular compounds, in the form of solution or solid solution free of solvent, can comprise a metal or semiconductor or its starting material dissolved stably therein in a relatively high concentration. The solid solution thus obtained may be then heated to react the functional group in the interaction-exhibiting high molecular compound with the interaction-eliminating compound such as isocyanate to obtain a high molecular composite material having a metal or semiconductor dispersed therein. The heat treatment is effected at a temperature of not higher than the decomposition temperature of the high molecular compound, preferably not higher than 150° C., though depending on the reactivity of the functional group-containing high molecular compound and the compound such as isocyanate.

When the foregoing reaction occurs, the functional groups contained in the interaction-exhibiting high molecular compound partially or entirely undergo reaction to reduce or eliminate its interaction with a metal or semiconductor or its starting material, allowing the metal or semiconductor or its starting which has interacted with the functional groups as a dopant to be separated out.

In the fourth embodiment of the nonlinear optical element according to the present invention, the matrix comprises a compound represented by the foregoing general formula (5) and a high molecular compound. The matrix is formed as follows. The preparation process comprises dissolving in a solution of a high molecular compound in a proper solvent (which is the same as the polar solvent in the above third embodiment) a mixture of a metal or semiconductor or its starting material and an organic compound represented by the foregoing general formula (13) which interacts with the metal or semiconductor or its starting material and undergoes heat treatment or chemical treatment to change its chemical structure (first step), removing the solvent therefrom to obtain a solid solution of the high molecular compound, organic compound and semiconductor or its starting material (second step), and then subjecting the material to heat treatment or chemical treatment to change the chemical structure of the organic compound to allow the desired microcrystals of semiconductor or metal to be separated out (third step).

In formula (5), U is preferably an alkyl group having 1 to 5 carbon atoms or an alkoxyl group having 1 to 5 carbon atoms, which may further be substituted by the compound having an imide structure represented by formulae (2), (3) or (4).

The high molecular compound as a constituent component of the matrix in this embodiment is not specifically limited but is preferably one which is thoroughly transparent at the wavelength of light used, i.e., the wavelength at which finely divided grains of a semiconductor exert a great nonlinear optical effect. Examples of such a high molecular compound include polyethylene resin, polystyrene resin, polyacrylate resin, polymethacrylate resin, polycarbonate resin, polyester resin, cellulose resin, silicone resin, vinyl resin, polyamide resin, polyimide resin, polyamide-imide resin, polyurea resin, polyurethane resin, and high molecular compounds having a copolymer structure formed therewith. A plurality of these high molecular compounds may be used in admixture depending on the purpose of controlling the physical properties (e.g., refrax index, mechanical strength, dielectric constant) so far phase separation or the like doesn't lower the optical transparency thereof.

The organic compound is used in an amount of 70 wt % or less, preferably 50 wt % or less, based on the total amount of the matrix.

The organic compound which is used in admixture with the foregoing high molecular compound and undergoes heat treatment or chemical treatment to change its chemical structure is not specifically limited but is preferably one which interacts with the foregoing metal or semiconductor or its starting material to accelerate the dissolution of the foregoing metal or semiconductor or its starting material and receives an external stimulation to change its chemical structure to reduce or eliminate its interaction with the metal or semiconductor or its starting material. An example of such an organic compound is a compound synthesized from an amine represented by the foregoing general formula (5) and an acid anhydride. Such a compound has an amide acid structure and thus interacts with a metal or semiconductor or its starting material to accelerate the dissolution thereof. When such a compound is subjected to heat treatment or other treatments such as dipping in a mixture of acetic anhydride and pyridine, it undergoes the following reaction:

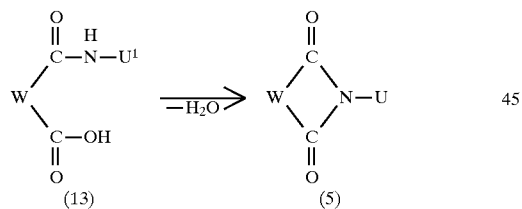

The heat treatment can be effected at a temperature of 100° to 400° C., preferably 150° to 300° C., and for 1 minute to 5 hours, preferably 5 minutes to 3 hours. The solvent treatment is conducted by stirring in a solvent which is enough to stir.

When this reaction occurs, the amide structure is eliminated, followed by the formation of an imide ring structure with the deposition of the metal or semiconductor or its starting material which has been dissolved interacted in this compound as a dopant.

Alternatively, a chelating agent capable of forming a complex compound with a metal or semiconductor or its starting material, such as acetylacetone and ethylenediamine, may be used to form a complex compound which is then subjected to heating so that finely divided grains of a metal or semiconductor or its starting material may be similarly separated out.

The fifth embodiment of the nonlinear optical element according to the present invention is characterized in that finely divided grains of a semiconductor or metal are dispersed in a matrix containing at least an acid salt of an amino-containing high molecular compound. This embodiment of the nonlinear optical element can be formed by a process which comprises dissolving a semiconductor or metal or its starting material in a solution containing at least an amino-containing high molecular compound, obtaining a solid solution and then treating the material with an acid to allow finely divided grains of a semiconductor or metal to be separated out.

In other words, the present invention provides a process which comprises mixing a solution of a high molecular compound in a proper solvent with a metal or semiconductor or its starting to make a solution (first step), removing the solvent after molding by means of coating or other process in vacuo to obtain a solid solution of the high molecular compound and the semiconductor or its starting material (second step), and then treating the solid solution with an acid to change the high molecular compound as a matrix to allow the desired semiconductor or metal microcrystals to be separated out (third step).

The high molecular compound to be used in the present invention is not specifically limited but is preferably one which in the form of precursor can thoroughly make a solid solution of a semiconductor or its starting material, which undergoes acid treatment to change its chemical properties or which is thoroughly transparent at the wavelength of light used, i.e., the wavelength at which finely divided grains of a semiconductor exert a great nonlinear optical effect. Examples of such a high molecular compound include the following compounds:

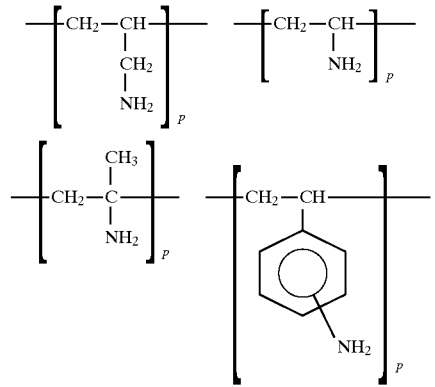

wherein p represents a polymerization degree, and the high molecular compound exhibits an intrinsic viscosity [η] of 0.1 to 6 dl/g.

These exemplary high molecular compounds are soluble in water or a polar organic solvent such as dimethylformamide, dimethylacetamide, n-methylpyrrolidone, dimethyl sulfoxide, dimethyl sulfonamide, m-cresol, p-chlorophenol, dimethylimidazolidone, tetramethylurea, diglyme, triglyme and tetraglyme. Thus, these high molecular compounds can be easily formed into a film by spin coating or dip coating process or worked into a fiber. Further, these high molecular compounds contain many amine structures as functional groups to interact with various inorganic elements and inorganic compounds. Thus, these high molecular compounds, in the form of solution or solid solution free of solvent, can comprise a metal or semiconductor or a compound as its starting material stably dissolved therein in a relatively high concentration. When subjected to chemical treatment with an acid such as hydrochloric acid, these high molecular compounds undergo the following reaction.

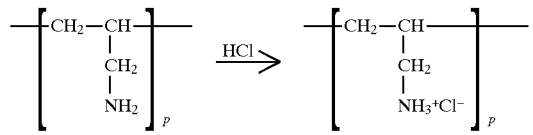

wherein p represents a polymerization degree.

When this reaction occurs, the amino group contained in the high molecular compound as a matrix turns to a hydrochloride structure, causing the metal or semiconductor or compound as its starting material which has been dissolved coordinated to the amino group in the high molecular compound as a dopant to be separated out.

These high molecular compounds may be used singly or in combination, or in admixture with a proper amount of high molecular compounds free of amino group for the purpose of controlling the physical properties (e.g., mechanical strength, dielectric constant, refrax index). Further, a copolymer high molecular compound consisting of an amino-containing moiety and an amino-free moiety may be used as well.

The acid to be used in the acid treatment is not specifically limited to hydrochloric acid but may be an acid capable of forming a salt with an amino group, such as acetic acid.

The sixth embodiment of the nonlinear optical element according to the present invention is characterized in that finely divided grains of a semiconductor or metal are dispersed in a matrix containing at least a high molecular compound consisting of repeating structure units represented by the foregoing general formula (7). This embodiment of the nonlinear optical element can be formed by a process which comprises dissolving a semiconductor or metal or its starting material in a solution containing at least a high molecular compound consisting of repeating structure units represented by the foregoing general formula (15), removing the solvent after molding by means of coating, etc., and then subjecting the material to heat treatment to allow finely divided grains of a semiconductor or metal to be separated out.

In other words, the present invention provides a process which comprises mixing a solution of a high molecular compound consisting of repeating structure units represented by the foregoing general formula (15) in a proper solvent with a metal or semiconductor or its starting material to make a solution (first step), removing the solvent after molding by means of coating, etc. to obtain a solid solution of the high molecular compound and the semiconductor or its starting material (second step), and then subjecting the solid solution to heat treatment to change the high molecular compound as a matrix to allow the desired semiconductor or metal microcrystals to be separated out (third step).

The high molecular compound consisting of repeating structure units represented by the foregoing general formula (15) is soluble in water or a polar organic solvent such as dimethylformamide, dimethylacetamide, n-methylpyrrolidone, dimethyl sulfoxide, dimethyl sulfonamide, m-cresol, p-chlorophenol, dimethylimidazolidone, tetramethylurea, diglyme, triglyme and tetraglyme. Thus, the high molecular compound can be easily formed into a film by spin coating or dip coating process or worked into a fiber. Further, the high molecular compound contains many amine structures as functional groups to interact with various inorganic elements and inorganic compounds. Thus, the high molecular compound, in the form of solution or solid free of solvent, can comprise a metal or semiconductor or a compound as its starting material stably dissolved therein in a relatively high concentration. When subjected to heat treatment, the high molecular compound undergoes the following chemical change:

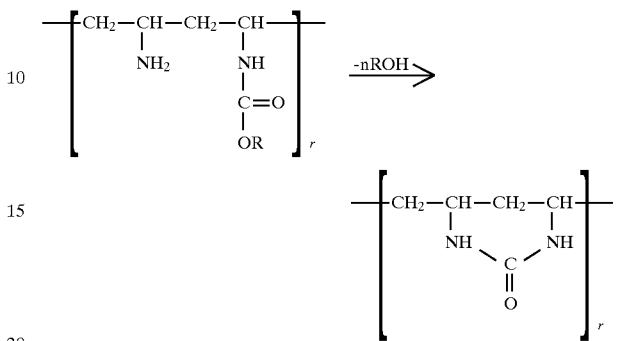

wherein R represents an alkyl group having 1 to 10 carbon atoms, preferably 1 to 5 carbon atoms; r represents a polymerization degree; and the high molecular compound exhibits an intrinsic viscosity $[\eta]$ of 0.1 to 6 dl/g.

The heat treatment can be effected at a temperature of 30° to 400° C., preferably 70° to 300° C., and for 1 minute to 5 hours, preferably 5 minutes to 3 hours.

When this reaction occurs, the amino group contained in the high molecular compound as a matrix is eliminated, allowing the metal or semiconductor or a compound as its starting material which has been dissolved coordinated to the amino group in the high molecular compound to be separated out.

In the seventh embodiment of the nonlinear optical element according to the present invention, finely divided grains of a semiconductor or-metal which exert a nonlinear optical effect are contained in a medium consisting of a hydrolyzate of a compound having a hydrolyzable substituent bonded to a trivalent atom or a tetravalent atom other than carbon and a high molecular compound having repeating structure units represented by the foregoing general formula (1).

This nonlinear optical element can be prepared by carrying out the following successive procedure to allow finely divided grains of a semiconductor or metal to be separated out:

(a) step of dissolving finely divided grains of a semiconductor or metal which exert a nonlinear optical effect or a metal salt or metal complex as its starting material and a high molecular compound having repeating structure units represented by the foregoing general formula (1) in the presence of a proper solvent;

(b) step of mixing the solution thus obtained with a compound having a hydrolyzable substituent bonded to a trivalent atom or a tetravalent atom other than carbon atom or a hydrolyzate thereof to make a uniform solution;

(c) step of allowing the hydrolyzable compound thus obtained to undergo hydrolysis to gelatinize the solution; and (d) step of removing the solvent therefrom, and then subjecting the material to heat treatment to allow finely divided grains of a semiconductor or metal to be separated out.

The hydrolyzable compound to be used in the present invention may be preferably used in combination with at least one selected from the group consisting of network-forming silane compounds represented by the following general formulae (16), (17) and (18). These silane compounds may be used singly or in combination.

$$R^1SiY^2 \quad (16)$$

$$\begin{array}{c} R^2 \\ \phantom{X}\diagdown \\ \phantom{XX}SiY^3{}_2 \\ \phantom{X}\diagup \\ R^3 \end{array} \quad (17)$$

$$\begin{array}{c} R^5 \\ | \\ R^4\!-\!SiY^4 \\ | \\ R^6 \end{array} \quad (18)$$

In these general formulae, $R^1$, $R^2$, $R^3$, $R^4$, $R^5$ and $R^6$ may be the same or different and each represent a saturated or unsaturated aliphatic hydrocarbon group, saturated or unsaturated alicyclic group, aromatic hydrocarbon group, aralkyl group or heterocyclic- group. These organic compound residues all may have substituents. $R^2$ and $R^3$, or any two of $R^4$, $R^5$ and $R^6$ may be connected to each other to form a carbon ring residue or heterocyclic residue. $Y^2$, $Y^3$ and $Y^4$ each represent a hydrolyzable functional group.

$R^1$, $R^2$, $R^3$, $R^4$, $R^5$ and $R^6$ are preferably an alkyl group having 1 to 20 carbon atoms which may be substituted by a halogen atom or an amino group, or a vinyl group which may be substituted by a halogen atom.

$Y^2$ and $Y^4$ are preferably an alkoxy group having 1 to 3 carbon atoms or a halogen atom.

Specific examples of the silane compounds represented by the foregoing general formulae (16), (17) and (18) include the following compounds. These compounds can be used singly or in combination.

In view of availability, formula (16) is preferably. Silane derivatives represented by the general formula (16):
$CH_3SiCl_3$,
$CH_3Si(NCO)_3$,
$CH_3Si(OCH_3)_3$,
$CH_3Si(OCH_2CH_3)_3$,
$CH_3Si(O(CH_2)_2CH_3)_3$,
$CH_3Si(OCH(CH_3)_2)_3$,
$CH_3Si(O)CH_2)_3CH_3)_3$,
$CH_3Si(OC(CH_3)_3)_3$,
$ClCH_2Si(OCH_2CH_3)_3$,
$CH_3CH_2SiCl_3$,
$CH_3CH_2Si(OC_3)_3$,
$CH_3CH_2Si(OCH_2CH_3)_3$,
$CH_3CH_2Si(O(CH_2)_2{}_{CH3})_3$,
$CH_3CH_2Si(OCH(CH_3)_2)_3$,
$CH_3CH_2Si(O(CH_2)_3CH_3)_3$,
$CH_3CH_2Si(OC(CH_3)_3)_3$,
$CH_2\!=\!CHSi(OCH_3)_3$,
$CH_2\!=\!CHSi(OCH_2CH_3)_3$,
$CH_2\!=\!CHSi(OC(CH_3)_3)_3$,
$ClCH_2CH_2Si(OCH_2CH_3)_3$,
$CH_3(CH_2)_2Si(OCH_3)_3$,
$Br(CH_2)Si(OCH_3)_3$,
$CH_2\!=\!CHCH_2Si(OCH_3)_3$,
$CH_2\!=\!CHCH_2Si(OCH_2CH_3)_3$,
$Cl(CH_2)_3Si(OCH_2CH_3)_3$,
$Cl(CH_2)_3Si(OCH_3)_3$,
$CH(CH_2)_3Si(OCH_3)_3$,
$H_2N\,(CH_2)_3SiCl_3$,
$H_2N\,(CH_2)_3Si(OCH_3)_3$,
$H_2N\,(CH_2)_3Si\,(OCH_2CH_3)_3$,
$NC(CH_2)_2Si(OCH_3)_3$,
$NC(CH_2)_2Si(OCH_2CH_3)_3$,
$H_3CO(CH_2)_3Si(OCH_3)_3$,
$CF_3(CH_2)_2Si(OCH_3)_3$,
$CF_3(CH_2)_2Si(OCH_2CH_3)_3$,
$CH_3(CH_2)_4Si(OCH_3)_3$,
$CH_3(CH_2)_4SiCl_3$,
$CH_3(CH_2)_4Si(NCO)_3$,
$CH_3(CH_2)_5Si(OCH_3)_3$,
$CH_3(CH_2)_5Si(OCH_2CH_3)_3$,
$CH_3(CH_2)_5Si(O(CH_2)_2CH_3)_3$,
$CH_3(CH_2)_5Si(O(CH_2)_3CH_3)_3$,
$CH_3(CH_2)_5Si(OC(CH_3)_3)_3$,
$CH_3(CH_2)_7Si(OCH_3)_3$,
$CH_3(CH_2)_7Si(OCH_2CH_3)_3$,
$Br(CH_2)_8Si(OCH_3)_3$,
$CH_3(CH_2)_9Si(OCH_3)_3$,
$CH_3(CH_2)_9Si(OCH_2CH_3)_3$,
$CH_3(CH_2)_9Si(OC(CH_3)_3)_3$,
$CH_3(CH_2)_{11}Si(OCH_3)_3$,
$CH_3(CH_2)_{11}Si(OCH_2CH_3)_3$,
$CH_3(CH_2)_{11}Si(OC(CH_3)_3)_3$,
$CH_3(CH_2)_{15}Si(OCH_3)_3$,
$CH_3(CH_2)_{15}Si(OCH_2CH_3)_3$,
$CH_3(CH_2)_{15}Si(OC(CH_3)_3)_3$,
$CH_3(CH_2)_{17}Si(OCH_3)_3$,
$CH_3(CH_2)_{17}Si(OCH_2CH_3)_3$,
$CH_3(CH_2)_{17}Si(OCH(CH_3)_3)_3$,
$H_2N\,(CH_2)_2NH(CH_2)_3Si(OCH_3)_3$,
$(H_3C)_2N(CH_2)_3Si(OCH_3)_3$,
$H_2N\,(CH_2)_3OC(CH_3)_2CH\!=\!CHSi(OCH_3)_3$,
$CH\!=\!CH(CH_2)_6Si(OCH_3)_3$,
$H_2N(CH_2)_{11}Si(OCH_3)_3$,
$CH_3COO(CH_2)_3Si(OCH_3)_3$,
$CH\!=\!CH(CH_2)_4Si(OCH_3)_3$,
$CH_2\!=\!CHCOO(CH_2)_3Si(OCH_3)_3$,
$F_3C(CF_2)_5(CH_2)_2Si(OCH_3)_3$,
$NCCH_2CH_2O\!-\!C(CH_2)_2\!-\!CH\!=\!CHSi(OCH_3)_3$,
$F_3C(CF_2)_5(CH_2)_2Si(OCH_2CH_3)_3$,
$(CH_3CH_2OOC)_2CH(CH_2)_2Si(OCH_2CH_3)_3$, $$\underset{O}{\overset{\|}{CH_3CO}}(CH_2)_3Si(OCH_3)_3, \quad \underset{O}{\overset{\|}{CH_2\!=\!CHCO}}(CH_2)_3Si(OCH_3)_3,$$

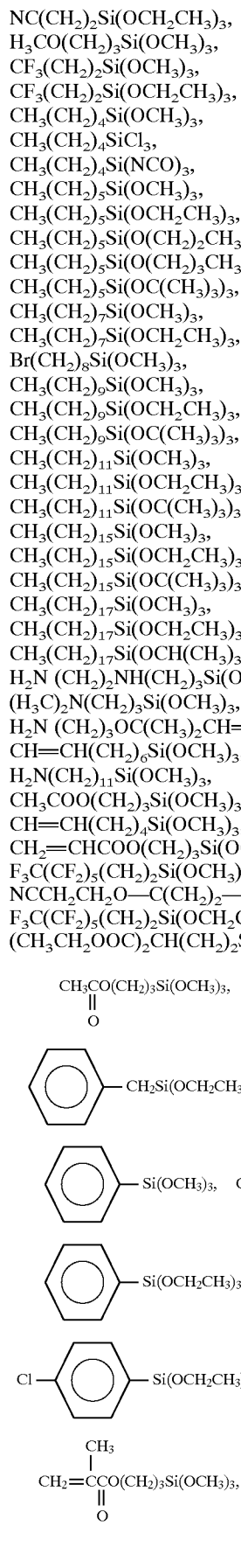

$$\underset{\underset{O}{\|}}{\overset{CH_3}{\underset{|}{CH_2\!=\!CCO}}}(CH_2)_3Si(OCH_3)_3, \quad H_2N\!-\!\!\bigcirc\!\!-\!Si(OCH_3)_3,$$

-continued

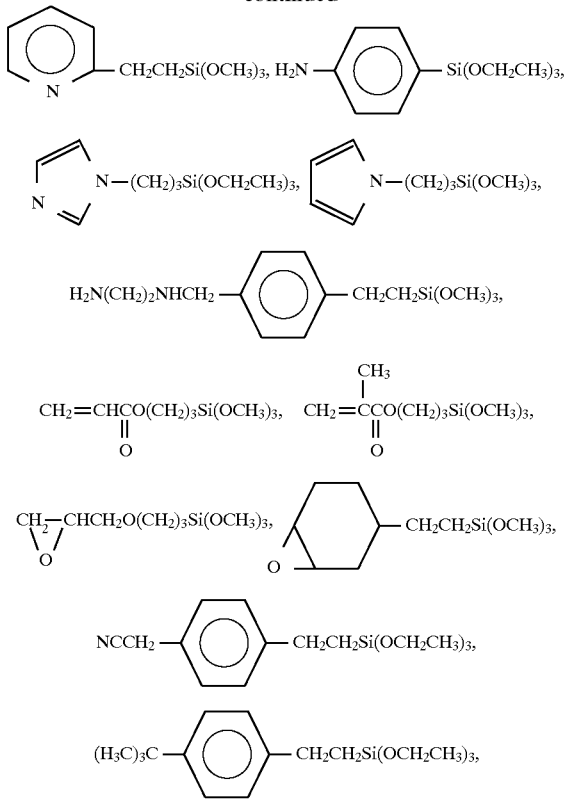

Silane derivatives represented by the general formula (17):
$(CH_3)_2SiCl_2$,
$(CH_3)_2Si(NCO)_2$,
$(CH_3)_2Si(OCH_3)_2$,
$(CH_3)_2Si(OCH_2CH_3)_2$,
$(CH_3)_2Si(O(CH_2)_2CH_3)_2$,
$(CH_3)_2Si(OCH(CH_3)_2)_2$,
$(CH_3)_2Si(O(CH_2)_3CH_3)_2$,
$(CH_3)_2Si(OC(CH_3)_3)_2$,
$(CH_2CH_3)_2Si(OCH_3)_2$,
$(CH_2CH_3)_2SiCl_2$,
$(CH_2CH_3)_2Si(OC_2CH_3)_2$,
$(CH_2CH_3)_2Si(O(CH_2)_2CH_3)_2$,
$(CH_2CH_3)_2Si(OCH(CH_3)_2)_2$,
$(CH_2CH_3)_2Si(O(CH_2)_3CH_3)_2$,
$(CH_2CH_3)_2Si(OC(CH_3)_3)_2$,
$(CH_2=CH)_2Si(OCH_3)_2$,
$(CH_2=CH)_2Si(OCH_2CH_3)_2$,
$(CH_3(CH_2)_2)_2Si(OCH_3)_2$,
$CH_3(CH_2)_5Si(CH_3)(OCH_3)_2$,
$CH_3(CH_2)_5Si(CH_3)(OCH_2CH_3)_2$,
$CH_3(CH_2)_5Si(CH_3)(O(CH_2)_2CH_3)_2$,
$CH_3(CH_2)_5Si(CH_3)(O(CH_2)_3CH_3)_2$,
$CH_3(CH_2)_5Si(CH_3)(OC(CH_3)_3)_2$,
$CH_3(CH_2)_5Si(CH_2CH_3)(OCH_3)_2$,
$CH_3(CH_2)_7Si(CH_3)(OCH_2CH_3)_2$,
$CH_3(CH_2)_7Si(CH_3)(OCH_3)_2$,
$Br(CH_2)_8Si(CH_3)(OCH_3)_2$,
$CH_3(CH_2)_{21}Si(CH_3)(OCH_3)_2$,
$CH_3(CH_2)_9Si(CH_3)(OCH_3)_2$,
$CH_3(CH_2)_{11}Si(CH_3)(OCH_3)_2$,
$CH_3(CH_2)_{15}Si(CH_3)(OCH_3)_2$,
$CH_3(CH_2)_{17}Si(CH_3)(OCH_3)_2$,
$CH=CH(CH_2)_6Si(CH_3)(OCH_3)_2$, $F_3C(CF_2)_5(CH_2)_2Si(CH_3)(OCH_3)_2$,
$H_2N(CH_2)_{11}Si(CH_3)(OCH_3)_2$,
$H_3COO(CH_2)_3Si(CH_3)(OCH_3)_2$,
$CH_3COO(CH_2)_3Si(CH_3)(OCH_3)_2$,
$H_2N(CH_2)_3OC(CH_3)_2CH=CHSi(CH_3)(OCH_3)_2$
$CH_2=CHCOO(CH_2)_3Si(CH_3)(OCH_3)_2$,

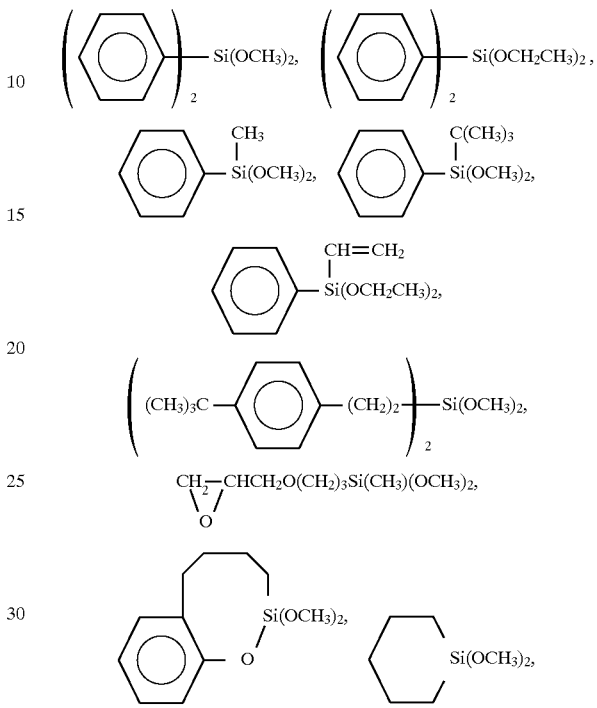

Silane derivatives represented by the general formula (18):
$(CH_3)_3SiCl$,
$(CH_3)_3Si(NCO)$,
$(CH_3)_3Si(OCH_3)$,
$(CH_3)_3Si(OCH_2CH_3)$,
$(CH_3)_3Si(O(CH_2)_2OH_3)$,
$(CH_3)_3Si(OCH(CH_3)_2)$,
$(CH_3)_3Si(O(CH_2)_3CH_3)$,
$(CH_3)_3Si(OC(CH_3)_3)$,
$(CH_2CH_3)_3SiCl$,
$(CH_2CH_3)_3Si(OCH_3)$,
$(CH_2CH_3)_3Si(OCH_2CH_3)$,
$(CH_2CH_3)_3Si(O(CH_2)_2CH_3)$,
$(CH_2CH_3)_3Si(OCH(CH_3)_2)$,
$(CH_2CH_3)_3Si(O(CH_2)_3CH_3)$,
$(CH_2CH_3)_3Si(OC(CH_3)_3)$,
$(CH_3(CH_2)_2)_3Si(OCH_3)$,
$(CH_3(CH_2)_2)_3SiCl$,
$CH_3(CH_2)_5Si(CH_3)_2OCH_3$,
$CH_3(CH_2)_5Si(CH_3)_2(OCH_2CH_3)$,
$CH_3(CH_2)_5Si(CH_3)_2(O(CH_2)_2CH_3)$,
$CH_3(CH_2)_5Si(CH_3)_2(O(CH_2)_3CH_3)$,
$CH_3(CH_2)_5Si(CH_3)_2(OC(CH_3)_3)$,
$CH_3(CH_2)_5Si(CH_2CH_3)_2(OCH_3)$,
$(CH_3(CH_2)_5)_2Si(CH_3)(OCH_3)$,
$(CH_3(CH_2)_5)_3SiOCH_3$,
$CH_3(CH_2)_7Si(CH_3)_2(OCH_3)$,
$CH_3(CH_2)_9Si(CH_3)_2(OCH_3)$,
$CH_3(CH_2)_{11}Si(CH_3)_2(OCH_3)$,
$CH_3(CH_2)_{17}Si(CH_3)_2(OCH_3)$,
$CH=CH-(CH_2)_6Si(CH_3)_2(OCH_3)$,
$CH=CHCOO(CH_2)_3Si(CH_3)_2(OCH_3)$, CH₃COO(CH₂)₃Si(CH₃)₂(OCH₃),
H₂N(CH₂)₁₁Si(CH₃)₂(OCH₃),
F₃C(CF₂)₅(CH₂)₂Si(CH₃)₂(OCH₃),

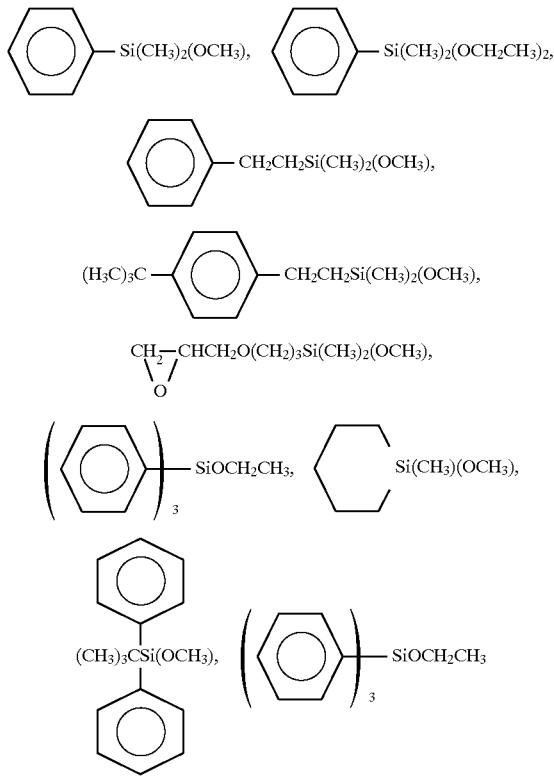

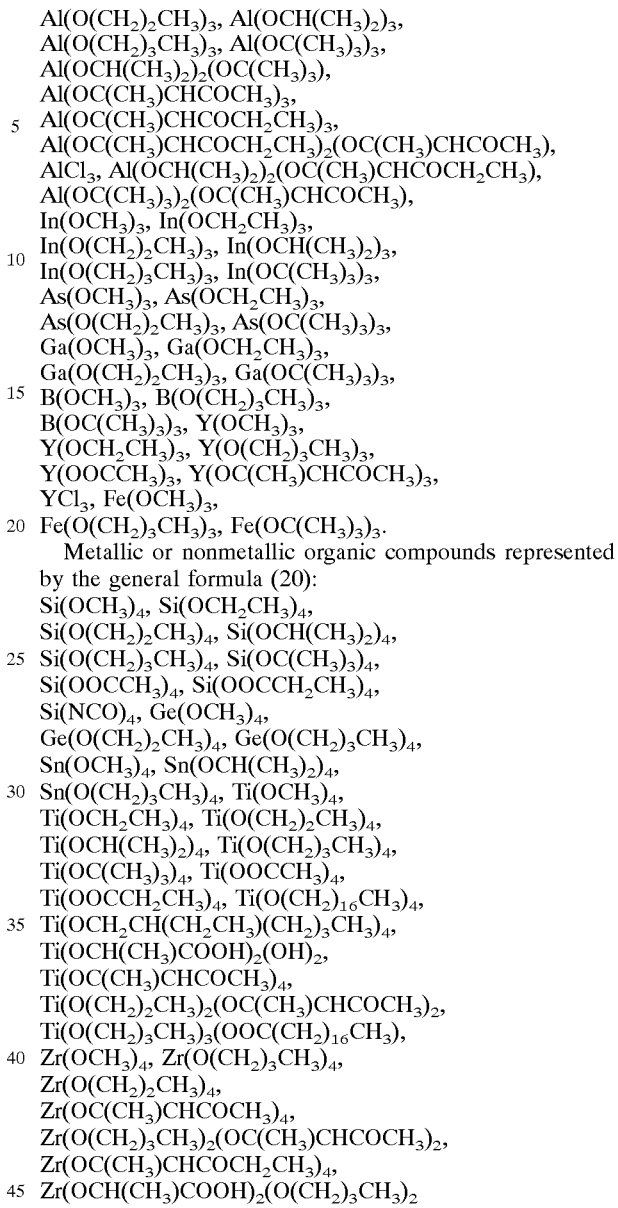

In the present invention, at least one selected from the group consisting of silane compounds represented by the foregoing general formulae (16), (17) and (18) may be preferably used in combination with at least one selected from the group consisting of metallic or nonmetallic compounds represented by the following general formulae (19) and (20):

$$M^1(Y^5)_b L^1_{3-b} \quad (19)$$

$$M^2(Y^6)_c L^2_{4-c} \quad (20)$$

wherein $M^1$ represents a trivalent atom; $M^2$ represents a tetravalent atom other than carbon atom; $Y^5$ and $Y^6$ may be the same or different and each represent a hydrolyzable functional group or a hydroxyl group; $L^1$ and $L^2$ may be the same or different and each represent a chelate group or $R_{10}$—COO— group (in which $R_{10}$ represents an alkyl group); b represents an integer 0 to 3; and c represents an integer 0 to 4, with the proviso that when b is 3 or c is 4, the plurality of $Y^5$'s or $Y^6$'s don't represent a hydroxyl group at the same time.

In this case, the amount of the metallic or nonmetallic compound represented by the foregoing general formula (19) or (20) to be used is preferably in the range of 0.01 to 80 mol % based on the amount of the high molecular compound represented by the foregoing general formula (1).

Specific examples of the metallic or nonmetallic compounds represented by the foregoing general formulae (19) and (20) include the following compounds. These compounds may be used singly or in combination. Metallic or nonmetallic organic compounds represented by the general formula (19):
Al(OCH₃)₃, Al(OCH₂CH₃)₃,
Al(O(CH₂)₂CH₃)₃, Al(OCH(CH₃)₂)₃,
Al(O(CH₂)₃CH₃)₃, Al(OC(CH₃)₃)₃,
Al(OCH(CH₃)₂)₂(OC(CH₃)₃),
Al(OC(CH₃)CHCOCH₃)₃,
Al(OC(CH₃)CHCOCH₂CH₃)₃,
Al(OC(CH₃)CHCOCH₂CH₃)₂(OC(CH₃)CHCOCH₃),
AlCl₃, Al(OCH(CH₃)₂)₂(OC(CH₃)CHCOCH₂CH₃),
Al(OC(CH₃)₃)₂(OC(CH₃)CHCOCH₃),
In(OCH₃)₃, In(OCH₂CH₃)₃,
In(O(CH₂)₂CH₃)₃, In(OCH(CH₃)₂)₃,
In(O(CH₂)₃CH₃)₃, In(OC(CH₃)₃)₃,
As(OCH₃)₃, As(OCH₂CH₃)₃,
As(O(CH₂)₂CH₃)₃, As(OC(CH₃)₃)₃,
Ga(OCH₃)₃, Ga(OCH₂CH₃)₃,
Ga(O(CH₂)₂CH₃)₃, Ga(OC(CH₃)₃)₃,
B(OCH₃)₃, B(O(CH₂)₃CH₃)₃,
B(OC(CH₃)₃)₃, Y(OCH₃)₃,
Y(OCH₂CH₃)₃, Y(O(CH₂)₃CH₃)₃,
Y(OOCCH₃)₃, Y(OC(CH₃)CHCOCH₃)₃,
YCl₃, Fe(OCH₃)₃,
Fe(O(CH₂)₃CH₃)₃, Fe(OC(CH₃)₃)₃.

Metallic or nonmetallic organic compounds represented by the general formula (20):
Si(OCH₃)₄, Si(OCH₂CH₃)₄,
Si(O(CH₂)₂CH₃)₄, Si(OCH(CH₃)₂)₄,
Si(O(CH₂)₃CH₃)₄, Si(OC(CH₃)₃)₄,
Si(OOCCH₃)₄, Si(OOCCH₂CH₃)₄,
Si(NCO)₄, Ge(OCH₃)₄,
Ge(O(CH₂)₂CH₃)₄, Ge(O(CH₂)₃CH₃)₄,
Sn(OCH₃)₄, Sn(OCH(CH₃)₂)₄,
Sn(O(CH₂)₃CH₃)₄, Ti(OCH₃)₄,
Ti(OCH₂CH₃)₄, Ti(O(CH₂)₂CH₃)₄,
Ti(OCH(CH₃)₂)₄, Ti(O(CH₂)₃CH₃)₄,
Ti(OC(CH₃)₃)₄, Ti(OOCCH₃)₄,
Ti(OOCCH₂CH₃)₄, Ti(O(CH₂)₁₆CH₃)₄,
Ti(OCH₂CH(CH₂CH₃)(CH₂)₃CH₃)₄,
Ti(OCH(CH₃)COOH)₂(OH)₂,
Ti(OC(CH₃)CHCOCH₃)₄,
Ti(O(CH₂)₂CH₃)₂(OC(CH₃)CHCOCH₃)₂,
Ti(O(CH₂)₃CH₃)₃(OOC(CH₂)₁₆CH₃),
Zr(OCH₃)₄, Zr(O(CH₂)₃CH₃)₄,
Zr(O(CH₂)₂CH₃)₄,
Zr(OC(CH₃)CHCOCH₃)₄,
Zr(O(CH₂)₃CH₃)₂(OC(CH₃)CHCOCH₃)₂,
Zr(OC(CH₃)CHCOCH₂CH₃)₄,
Zr(OCH(CH₃)COOH)₂(O(CH₂)₃CH₃)₂

In the eighth embodiment of the nonlinear optical element according to the present invention, finely divided grains of a semiconductor or metal which exert a nonlinear optical effect are incorporated in a medium formed of a hydrolyzate of a compound having a hydrolyzable substituent bonded to a trivalent atom or a tetravalent atom other than carbon atom. As the foregoing compound having a hydrolyzable substituent bonded to a trivalent atom or a tetravalent atom other than carbon atom there may be used at least a silane compound represented by the foregoing general formula (8) or (8A).

This embodiment of the nonlinear optical element according to the present invention can be prepared by a process which comprises mixing finely divided grains of a semiconductor or metal which exert a nonlinear optical effect or a metal salt or metal complex as its starting material with at least a silane compound represented by the foregoing general formula (8) or (8A) among compounds having a hydrolyzable substituent bonded to a trivalent atom or a tetravalent atom other than carbon atom in the presence of a solvent, and then subjecting the compound having a hydrolyzable substituent bonded to a trivalent atom or a tetravalent atom other than carbon atom to hydrolysis so that it is gelatinized. This embodiment of the nonlinear optical element according to the present invention can also be prepared by a process which comprises partially hydrolyzing the moiety of a compound having a hydrolyzable substituent bonded to a trivalent atom or a tetravalent atom other than carbon atom containing a silane compound represented by the foregoing general formula (8) or (8A) as an essential component which is hydrolyzed at a relatively low rate to prepare a sol, mixing the sol thus obtained, other sols of the compound having a hydrolyzable substituent bonded to a trivalent atom or a tetravalent atom other than carbon atom or a hydrolyzate thereof and finely divided grains of a semiconductor or metal which exert a nonlinear optical effect or a metal salt or metal complex as its starting material, and then allowing the mixture to undergo hydrolysis to make a gel.

In the compound having a hydrolyzable substituent bonded to a trivalent atom or a tetravalent atom other than carbon atom in the foregoing embodiment, the trivalent and tetravalent atoms are not limited to the group III and IV elements in the periodic table. As such trivalent atoms there may be used B, Al, Ga, In, Y, As, Fe, etc. As such tetravalent atoms there may be used Si, Ge, Sn, Ti, Zr, etc. As the hydrolyzable functional group there may be used any functional group which can undergo hydrolysis under known conditions. Typical examples of such a hydrolyzable functional group include a halogen atom, an isocyanate group, an alkoxy group, and an acyloxy group such as an alkanoyloxy group.

In the present invention, as the foregoing compound having a hydrolyzable substituent bonded to a trivalent atom or a tetravalent atom other than carbon atom there may be used at least a silane compound represented by the foregoing general formula (8) or (8A).

In formula (8), or (8A) $Y^1$ is preferably an alkoxy group having 1 to 3 carbon atoms or a halogen atom. $Y^2$ is preferably a halogen atom, an alkyl group having 1 to 20 carbon atoms which may be substituted by an amino group, or a vinyl group which may be substituted by a halogen atom.

Examples of $X^1$ in the general formula (8) include organic residues represented by the following structural formulae:

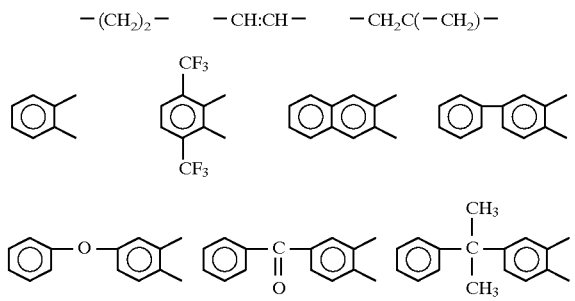

Examples of $X^{1A}$ in the general formula (8A) include those of X in the general formula (1).

Examples of $X^2$ include organic residues represented by the following structural formulae:

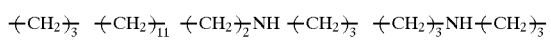

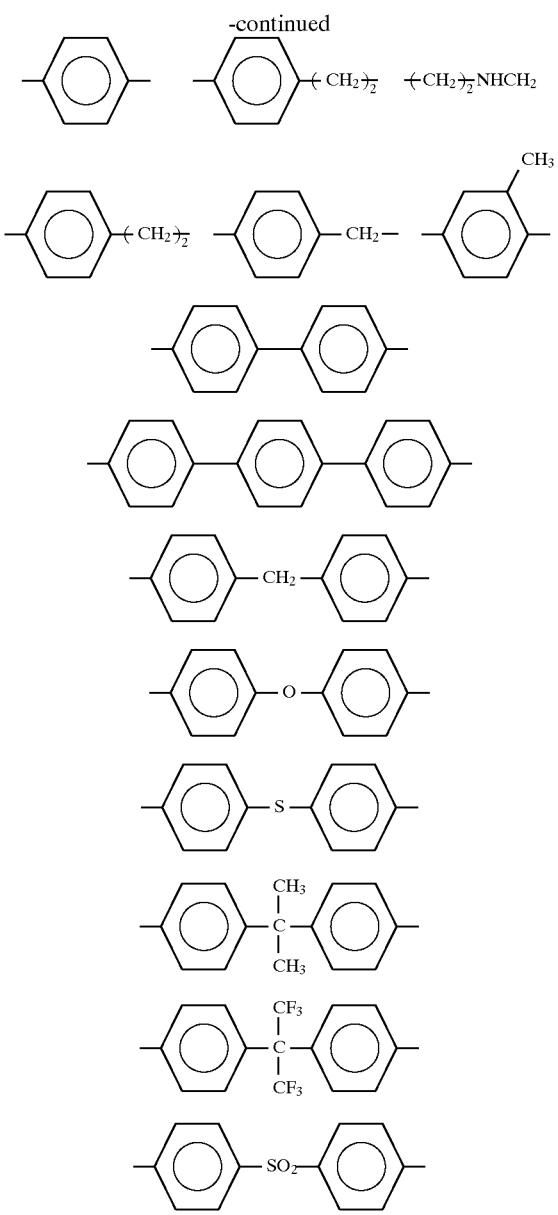

Examples of the hydrolyzable functional group represented by $Y^1$ include alkoxy group such as a methoxy group, an ethoxy group and a normal or isopropoxy group, a halogen atom such as a chlorine atom, and an isocyano group. The foregoing exemplary silane compounds can be synthesized from a dicarboxylic acid anhydride having a structure represented by $X^1$ and an amino group having a structure represented by $H_2N-X^2-SiY^1_nY^2_m$. These silane compounds can be used singly or in combination.

These silane compounds have a carboxylic acid structure and an amide structure that form a complex with various elements and inorganic compounds. Thus, these silane compounds, in the form of solution or solid obtained after gelatization and drying, can comprise a metal or semiconductor or its starting material stably dissolved therein in a relatively high concentration. When subjected to heat treatment, these silane compounds forming a matrix undergo the following reaction:

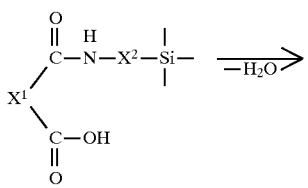

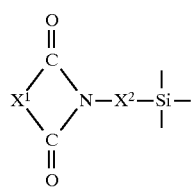

When this reaction occurs, the carboxylic acid and amide structures contained in the polysiloxane compound as a matrix are eliminated, followed by the formation of an imide ring structure with the deposition of a metal or semiconductor or a compound as its starting material which has been dissolved coordinated to the carboxylic acid structure or amide structure in the polysiloxane compound as a dopant. The heat treatment can be effected at a temperature of 30° to 400° C., preferably 70° to 300° C., and for 1 minute to 5 hours, preferably 5 minutes to 3 hours, for example, as relatively low as around 200° C.

In the present invention, the hydrolyzable compound may comprise a silane compound represented by the general formula (8) or (8A) as an essential component, preferably in combination with at least one selected from the group consisting of network-forming silane compounds represented by the foregoing general formulae (16), (17) and (18). These compounds can be used singly or in admixture.

In this case, the amount of the silane compound represented by the foregoing general formula (16), (17) or (18) to be used is preferably in the range of 0.1 to 95 wt % based on the total amount of the film.

Specific examples of the silane compounds represented by the foregoing general formulae (16), (17) and (18) are as set forth above.

In the present embodiment of the nonlinear optical element according to the present invention, the foregoing hydrolyzable compound comprises a silane compound represented by the foregoing general formula (8), preferably in combination with at least one-selected from the group consisting of silane compounds represented by the foregoing general formulae (16), (17) and (18) as well as at least one selected from the group consisting of metallic or nonmetallic compounds represented by the foregoing general formulae (19) and (20).

In this case, the amount of the metallic or nonmetallic compound represented by the foregoing general formula (19) or (20) to be used is preferably in the range of 0.1 to 95 wt % based on the total amount of the film.

In the ninth embodiment of the nonlinear optical element according to the present invention, finely divided grains of a semiconductor or metal which exert a nonlinear optical effect are incorporated in a hydrolyzate of a polyimide compound having in its main chain or side chain a silyl group having at least one hydrolyzable substituent. In this embodiment, the finely divided grains of a semiconductor or metal which exert a nonlinear optical effect may be incorporated in a medium obtained by the dehydration condensation of the foregoing polyimide with a hydrolyzate of a compound having a hydrolyzable substituent bonded to a trivalent atom or a tetravalent atom other than carbon atom.

The present embodiment of the nonlinear optical element according to the present invention can be prepared by carrying out the following successive procedure to allow finely divided grains of a semiconductor or metal to be separated out:

(a) step of dissolving finely divided grains of a semiconductor or metal which exert a nonlinear optical effect or a metal salt or metal complex as its starting material and a polyamic acid compound having in its main chain or side chain a silyl group having at least one hydrolyzable substituent in the presence of a proper solvent;

(b) step of mixing the solution thus obtained with a compound having a hydrolyzable substituent bonded to a trivalent atom or a tetravalent atom other than carbon atom or a hydrolyzate thereof to make a uniform solution;

(c) step of allowing the hydrolyzable compound thus obtained to undergo hydrolysis to gelatinize the solution; and (d) step of removing the solvent therefrom, and then subjecting the material to heat treatment to allow finely divided grains of a semiconductor or metal to be separated out.

In the present invention, the polyimide compound to be used for the preparation of an organic/inorganic composite matrix is preferably one which in the form of precursor can thoroughly make a solid solution of a semiconductor or its starting material and which can be thoroughly transparent at the wavelength of light used, i.e., the wavelength at which finely divided grains of a semiconductor exert a great nonlinear optical effect. Examples of such a high molecular compound include at least those represented by the following general formulae (21) and (22):

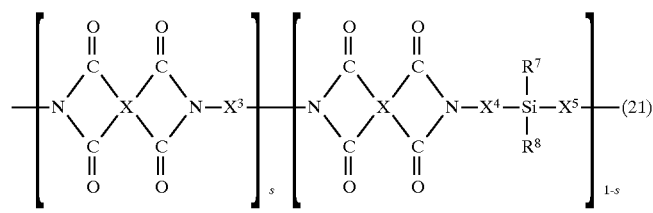

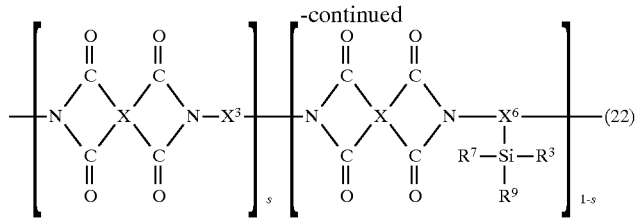

wherein X is as defined above; $X^3$, $X^4$ and to $X^5$ each represent a divalent organic residue having not less than 2 carbon atoms; $X^6$ represents a trivalent organic residue having not less than 2 carbon atoms; $R^7$ represents a hydrolyzable functional group; $R^8$ and $R^9$ each represent a hydrolyzable functional group, saturated or unsaturated aliphatic hydrocarbon group, saturated or unsaturated alicyclic group, aromatic hydrocarbon group, aralkyl group or heterocyclic group, which organic compound residues may contain substituents; and s represents a real number satisfying the relationship $0 \leq s < 1$ by mole ratio.

In formulae (21) and (22), $X^3$, $X^4$, $X^5$ and $X^6$ are preferably an alkylene group having 1 to 20 carbon atoms which may have an imino group-or an aromatic group which may be substituted by 1 to 3 substituents. When $X^3$, $X^4$, $X^5$ and $X^6$ have two or three benzene nuclei, the benzene nuclei connect directly or connect via an alkylene group having 1 to 5 carbon atoms which may be substituted by an oxygen atom, an sulfur atom, $SO_2$, an imino group, a halogen atom. Examples of a substituent of the benzene nucleus include an alkyl group having 1 to 5 carbon atoms, an alkoxy group having 1 to 5 carbon atoms, an alkyl group having 1 to 5 carbon atoms and a halogen atom.

$R^7$ is preferably an alkoxy group having 1 to 3 carbon atoms or a halogen atom.

$R^8$ and $R^9$ are preferably an alkyl group having 1 to 20 carbon atoms which may be substituted by an amino group, a vinyl group which may be substituted by a halogen atom, a cycloalkyl group having 1 to 10 carbon atoms, a cycloalkenyl group having 1 to 10 carbon atoms or a phenyl group which may be substituted by an alkyl group having 1 to 5 carbon atoms, an alkoxy group having 1 to 5 carbon atoms or a halogen atom.

Specific examples of X include those exemplified above. Examples of $X^3$ to $X^5$ include the following compounds:

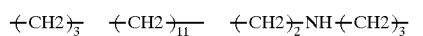

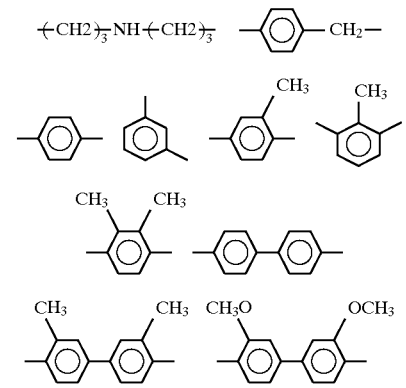

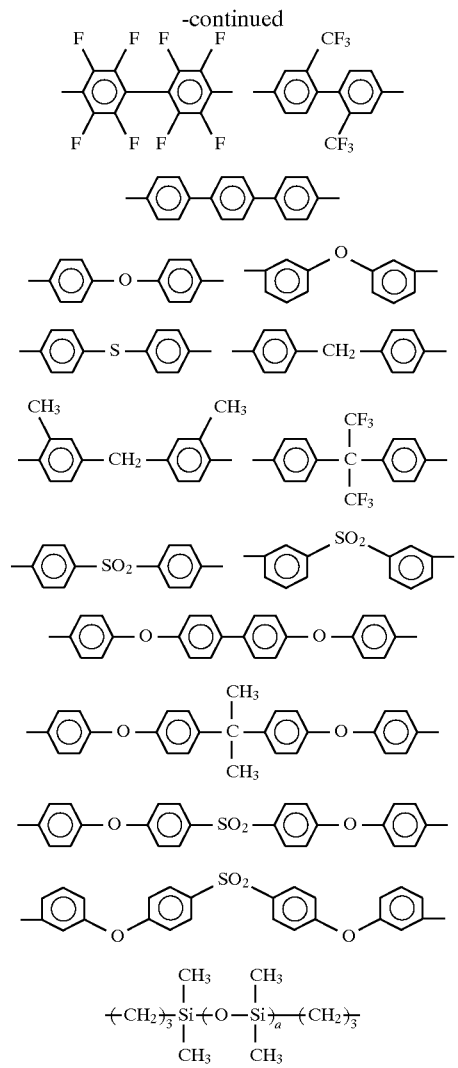

Examples of $X^6$ include the following organic residues:

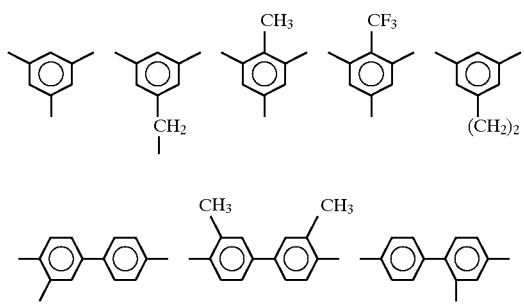

-continued

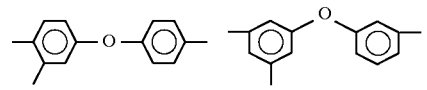

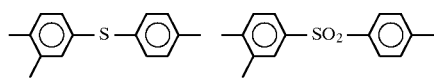

include organic residues such as the foregoing hydrolyzable groups, alkyl groups such as a methyl group, an ethyl group and a propyl group, and aromatic groups such as a phenyl group.

These high molecular compounds, in the form of precursor, have many carboxylic acid structures as functional groups that form a complex with various inorganic elements and inorganic compounds. Thus, these high molecular compounds, in the form of solution or solid obtained by gelatinization and drying, can comprise a metal or semiconductor or its starting material stably dissolved therein in a relatively high concentration. When subjected to heat treatment, these high molecular compounds undergo the following reaction:

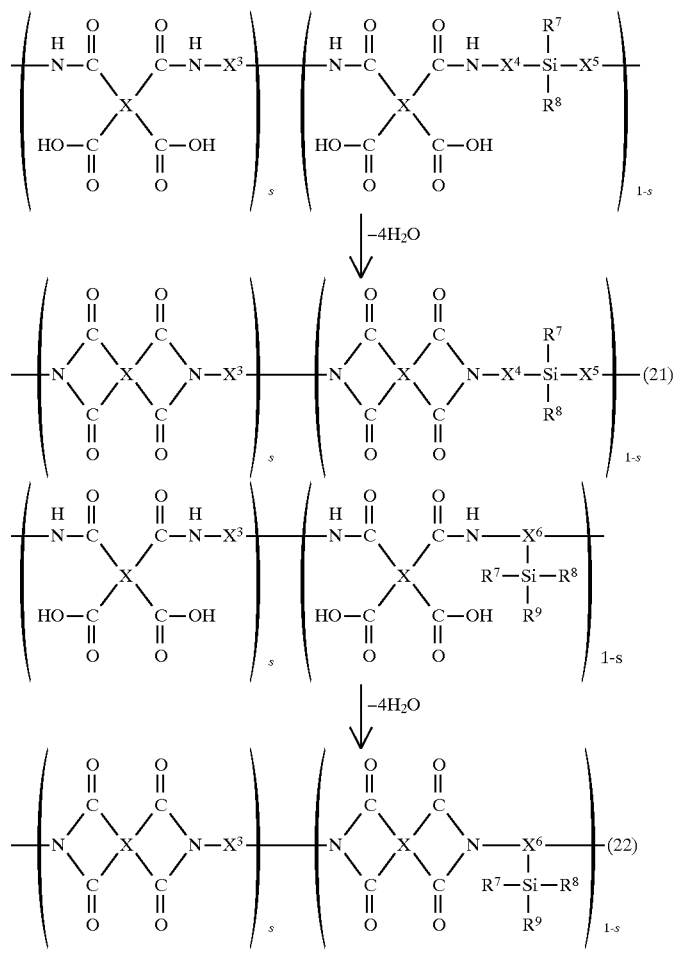

-continued

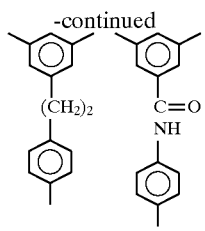

Examples of the hydrolyzable group $R^7$ include a methoxy group, an ethoxy group, an alkoxy group such as a normal or isopropoxy group, a halogen atom such as chlorine, and an isocyano group. Examples of $R^8$ and $R^9$ When this reaction occurs, the carboxylic acid and amide structures contained in the high molecular compound as a matrix are eliminated, followed by the formation of an imide ring structure with the deposition of a metal or semiconductor or a compound as its starting material which has been dissolved coordinated to the carboxylic acid site in the high molecular compound as a dopant. The heat treatment can be effected at a temperature of 30° to 400° C., preferably 70° to 300° C., and for 1 minute to 5 hours, preferably 5 minutes to 3 hours, for example, as relatively low as around 200° C.

In the present embodiment, the foregoing high molecular compound may be used in combination with a hydrolyzable compound. As the hydrolyzable compound there may be preferably used at least one selected from the group consisting of silane compounds represented by the foregoing general formulae (16), (17) and (18). These compounds may be used singly or in admixture. In this case, the amount of the silane compound represented by the foregoing general formula (16), (17) or (18) to be used is preferably in the range of 0.1 to 95 wt % based on the total amount of the film.

In the present embodiment of the nonlinear optical element according to the present invention, the matrix has a structure obtained by the microstructural complexing of a polycondensation product of a hydrolyzable compound with a polyimide having a silyl group in its main chain or side chain and thus exhibits a great flexibility as a polymer that makes itself insusceptible to crack during the drying step. Further, the matrix contains a hard inorganic component and thus exhibits a high mechanical strength and an excellent thermal stability as compared with the high molecular compound free of inorganic component.

In the eighth and ninth embodiments of the present invention, a preparation process may be used which comprises hydrolyzing a hydrolyzable compound to prepare a porous gel, dispersing finely divided grains of a semiconductor or metal in the gel so that the finely divided grains are adsorbed thereto, and then subjecting the gel to heat treatment to allow the finely divided grains of a semiconductor or metal to be separated out, as described in JP-A-2-230223. However, this preparation process is disadvantageous in that it has a difficulty of permeability, etc., making it difficult to uniformly disperse and retain finely divided grains of a semiconductor or metal in the medium. Thus, the following preparation process is preferably used in the present invention. That is, the foregoing hydrolyzable compound is added to a proper solvent, e.g., water and organic solvent such as alcohol, ether, ester, aliphatic hydrocarbon, aromatic hydrocarbon and halogenated hydrocarbon, singly or in admixture, with a predetermined amount of finely divided grains of a semiconductor or metal to be incorporated. The mixture is then gelatinized. In order to prevent the gel from cracking during drying, it is effectively used in admixture with a high boiling solvent such as formamide, dimethylformamide (DMF) and glycerin as a drying controlling agent. The sol thus prepared is (i) gelatinized in a proper solution, and then dried or formed and worked into a fiber, or (ii) coated on a proper substrate, gelatinized, and then dried. The coating of the sol on a substrate can be accomplished by any known coating method such as dip coating and spin coating. In order to accelerate the gelatinization reaction, a catalyst such as acid and base can be used as necessary. Further, gelatinization can be assisted by heat treatment at a temperature of 30° to 1,000° C.

The nonlinear optical element according to the present invention thus formed comprises finely divided grains dispersed and retained in a matrix formed by the polycondensation of a hydrolyzable compound.

The silane compounds represented by the foregoing general formulae (8), and (16) to (20) and the foregoing metallic or nonmetallic compounds can be arbitrarily selected so far as they don't depart from the scope of the present invention. In general, these compounds have different hydrolysis rates. In the case where various hydrolyzable substances having different hydrolysis rates are used, when all these hydrolyzable substances are mixed and then subjected to hydrolysis as in the conventional sol-gel process, the structure of the matrix thus gelatinized is determined by the component which undergoes hydrolysis reaction at a high rate, making it impossible to fully attain the desired effects of the present invention. Thus, the present invention preferably employs a multi-stage hydrolysis process in which hydrolysis is effected every component. That is, a process is preferably used which comprises mixing silane compounds and metallic or nonmetallic compounds which undergo hydrolysis at a relatively low rate with water or mixture of water and an organic solvent, stirring the mixture at a proper temperature for a desired period of time, allowing the mixture to stand so that it is partially kept under hydrolysis, adding a predetermined amount of other silane compounds and metallic or nonmetallic organic compounds, as it is or in the form of a sol obtained by the hydrolysis thereof in a separate vessel, to the sol with finely divided grains of a starting material in admixture, and then allowing the mixture to further undergo hydrolysis reaction so that it is subjected to dehydration condensation to make a gel, whereby an excellent inorganic medium can be formed. In the nonlinear optical element according to the present invention, if a silane compound represented by the foregoing general formula (8) in which some of the four hydrolyzable groups are replaced by nonhydrolyzable groups is used, three-dimensionally crosslinked networks are less connected in a medium retaining finely divided grains, increasing the flexibility as a polymer and hence rendering the matrix insusceptible to crack during the drying step.

Further, if the nonlinear optical element comprises a silane compound represented by the foregoing general formula (16), (17) or (18) as a hydrolyzable compound, its compatibility with a high molecular compound is enhanced because the silane compound has a nonhydrolyzable substituent, making it possible to form a matrix which is more densely complexed. In such a matrix, the compatibility with finely divided grains can be changed, facilitating the deposition of finely divided grains at a low temperature and the control of grain diameter.

As the metallic or non-metallic compound of formula (19) or (20) is a compound capable of forming an oxide by hydrolysis and providing bonds between the network of silica gel or a high molecular compound-silica gel composite, which is a main component of the matrix, the resulting nonlinear optical element exhibits an enhanced mechanical strength.

As the solvent used in preparation of the nonlinear optical elements of the present invention is eliminated before a heat treatment or a chemical treatment as described above, the amount of the solvent is not particularly limited as long as it dissolves the matrix-forming substances, and metal, semiconductor or its precursor.

The heat treatment for forming the matrix of the present invention is generally carried out under the condition of temperature and time such that the matrix-forming substances are not thermally decomposed. The heating temperature is generally not higher than 400° C., preferably from 50° to 250° C., and more preferably from 100° to 200° C., and the heating time varies depending on the heating temperature and is generally from 10 minutes to 10 days, preferably from 1 hour to 40 hours, more preferably 2 hours to 20 hours. In the case that a matrix-forming substance having a hydrolyzable group is used in combination, however, the heating temperature may be not higher than 1,500° C., preferably from 50° to 1,300° C.

The chemical treatment may be effected by immersing a coated film of a mixture of a matrix-forming substance and a metal, semiconductor or its precursor in the aforesaid solvent for chemical treatment, or by bring the coated film into contact with the solvent vapor. When immersed, the chemical treatment can be conducted at a reflux temperature. The chemical treatment is generally practiced in the case where the coated film is deteriorated by the heat treatment, and thus the chemical treatment should not be conducted at an extremely high temperature and it is preferably 50° to 400° C., more preferably 100° to 200° C. The processing time is generally from 10 minutes to 10 days, preferably from 1 hour to 40 hours and particularly preferably from 2 hours to 20 hours.

In the present invention, as "finely divided grains of a semiconductor or metal" to be separated out in the matrix there may be used any materials which provide a nonlinear optical effect. Examples of such materials include finely divided grains of colloid of metal such as Au, Ag, Pt and Cu, compound semiconductor such as PbS, ZnS, CdS, CdSe and CdTe, oxide semiconductor such as TiO, $SnO_2$, $Cu_2O$, ZnO, MnO and CoO, and halide such as AgI, $HgI_2$, CuCl, CuBr and CuI.

As effected in the case of AgI, $HgCl_2$, etc., the desired semiconductor may be dissolved in a proper solvent or a high molecular solution as it is. Alternatively, an organic metal compound such as metal halide, metal nitrate, metal complex, metal alkoxide, metal carboxylate and chelate compound as a starting material of semiconductor or metal may be dissolved in a proper solvent or a high molecular solution which is then allowed to undergo sol-gel reaction or subjected to heat treatment so that the semiconductor or metal compound is thermally reacted to form the desired finely divided grains of semiconductor or metal. Further, these semiconductor or metal compound may be subjected to reduction by hydrogen, etc. or a treatment by hydrogen sulfide, etc. to chemically change the desired finely divided grains of semiconductor or metal. Examples of the starting material of semiconductor or metal employable in the present invention include metal halides such as AgI, $HgI_2$, HgCl, AuCl, NiCl, $PtCl_2$, CuCl, $CuCl_2$, $FeCl_3$, $MoCl_5$, $IrCl_3$ and $SnCl_4$, metal complex compounds such as $HAuCl_4 \cdot 4H_2O$, $NaAuCl_4 \cdot 2H_2O$ and $H_2PtCl_4$, nitrates such as $AgNO_3$, $Hg(NO_3)_2 \cdot \frac{1}{2}H_2O$ and $Zn(NO_3)_2 \cdot 6H_2O$, carboxylates such as $CH_3COOAg$, $Zn(CH_3COO)_2 \cdot 2H_2O$, $Cu(CH_3COO)_2 \cdot H_2O$, $Mn(CH_3COO)_2 \cdot 4H_2O$, $Pb(CH_3COO)_2 \cdot 3H_2O$, $Cd(CH_3COO)_2 \cdot 2H_2O$, $Sn(CH_3COO)_2$, $Co(C_8H_{18}O_2)_2$ and $Fe(C_8H_{18}O_2)_2$, and organic metal chelate compounds such as $Fe(C_5H_5O_2)_2$, $Fe(C_5H_5O_2)_3$ and $Mn(C_5H_5O_2)_2$.

In the nonlinear optical element according to the present invention, as a material which provides a nonlinear optical effect there may be preferably used a cuprous halide which has excitons having a small Bohr diameter that can be effectively confined to possibly give a great three-dimensional nonlinear optical effect.

Such a material may be incorporated in the system in a proportion of 0.01 to 99 wt %, preferably 0.1 to 95 wt % based on the total amount of the film.

Further, if as finely divided grains of a semiconductor or metal there is used a dispersion of finely divided grains of a cuprous halide which is susceptible to denaturation by oxidation, a solution preparation step of dissolving a cuprous halide in a solution of a high molecular compound or hydrolyzable compound, a step of coating the solution and subjecting the high molecular compound to heat treatment or chemical treatment, or a step of hydrolyzing the hydrolyzable compound and coating the high molecular solution thus obtained on a substrate or conducting other treatments to make a film are all preferably effected in an inert atmosphere such as nitrogen and argon. Subsequently, the solvent is preferably removed in vacuo or in an inert atmosphere.

The present invention will be further described in the following examples, but the present invention should not be construed as being limited thereto.

EXAMPLE 1

In a stream of dried nitrogen, 0.236 g of diaminodiphenylether represented by the following general formula (23) was dissolved in 7.5 ml of dimethylacetamide. After complete dissolution was made, 0.314 g of pyromellitic dianhydride represented by the general formula (24) was gradually added to the solution. Subsequently, in a stream of dried nitrogen, the mixture was slowly stirred with its temperature kept at 10° to 15° C. for 1 hour. The mixture was further stirred with its temperature kept at 20° to 25° C. for 2 hours to obtain a solution of a high molecular compound represented by the general formula (25). The solution of a high molecular compound thus obtained and a turbid colloidal dispersion obtained by mixing 0.072 g of CuCl and 7.5 ml of dimethylacetamide with stirring were then mixed. As a result, the solution turned to a light green transparent liquid in which CuCl had been dissolved. The foregoing mixing procedures were all effected in an atmosphere of dried nitrogen.

Figure 1B:
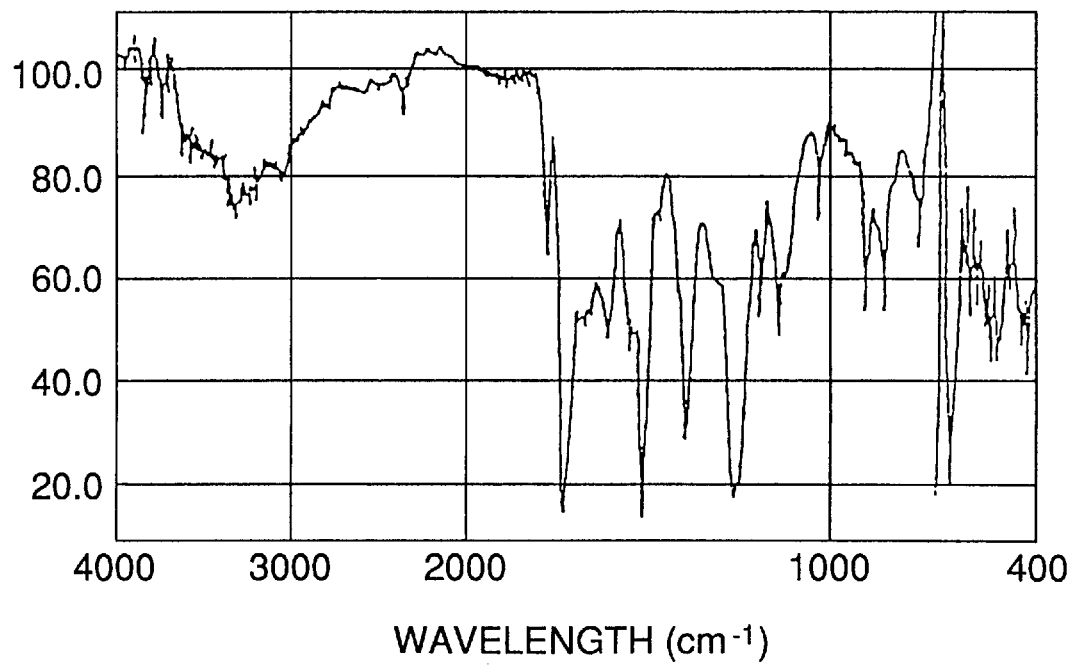

The solution was then spin-coated on a glass substrate in the atmosphere. The coated material was heated to a temperature of 70° C. for 30 minutes in vacuo under a reduced pressure of 1 Torr, and then kept for 30 minutes so that the solvent was removed therefrom to obtain a light green transparent film. This film was then subjected to heat treatment at a temperature of 200° C. for 30 minutes under a nitrogen-stream of 200 ml/min. FIG. 1 illustrates the change of infrared absorption spectrum by heat treatment wherein FIG. 1(a) illustrates the infrared absorption spectrum before heat treatment and FIG. 1(b) illustrates the infrared absorption spectrum after heat treatment. These results show that the heat treatment involves the change of the matrix from the high molecular compound represented by the general formula (25) to the high molecular compound represented by the general formula (26). When the matrix was examined by X-ray diffractometry using CuKa rays for the presence of deposit, it was confirmed that $Cu_2O$ had been deposited by the heat treatment. The grain diameter of the deposit was found to be 10 to 50 nm under a transmission electron microscope. The high molecular compound/$Cu_2O$ composite film thus obtained contained a deposit having a sufficiently small grain diameter and thus assumed transparent and brown.

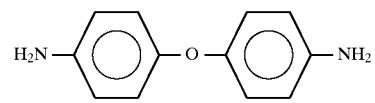

(23)

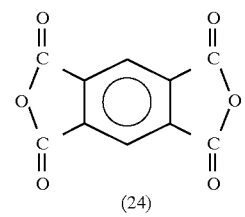

(24)

-continued

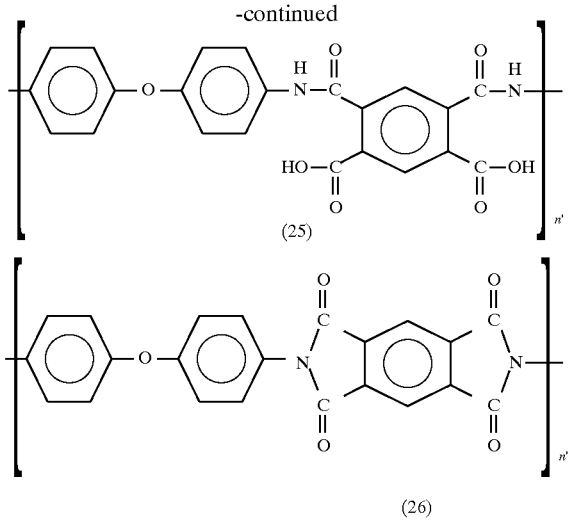

wherein n' is about 500.

EXAMPLE 2

In a stream of dried nitrogen, 0.236 g of diaminodiphenylether represented by the following general formula (23) was dissolved in 7.5 ml of dimethylacetamide. After complete dissolution was made, 0.314 g of pyromellitic dianhydride represented by the general formula (24) was gradually added to the solution. Subsequently, in a stream of dried nitrogen, the mixture was slowly stirred with its temperature kept at 10° to 15° C. for 1 hour. The mixture was further stirred with its temperature kept at 20° to 25° C. for 2 hours to obtain a solution of a high molecular compound represented by the general formula (25). The solution of a high molecular compound thus obtained and a turbid colloidal dispersion obtained by mixing 0.080 g of tetrachloroauric acid and 7.5 ml of dimethylacetamide with stirring were then mixed to obtain a light orange transparent liquid. The foregoing mixing procedures were all effected in an atmosphere of dried nitrogen.

The solution was then spin-coated on a glass substrate in the atmosphere. The coated material was heated to a temperature of 70° C. for 30 minutes in vacuo under a reduced pressure of 1 Torr, and then kept for 30 minutes so that the solvent was removed therefrom to obtain a light yellow transparent film. This film was then subjected to heat treatment at a temperature of 200° C. for 30 minutes in the atmosphere. FIG. 1 illustrates the change of infrared absorption spectrum by heat treatment. When the material was examined by X-ray diffractometry for the presence of Au, it was confirmed that Au had been deposited by the heat treatment. The grain diameter of the deposit was found to be 5 to 20 nm under a transmission electron microscope. The high molecular compound/Au composite film thus obtained contained a deposit having a sufficiently small grain diameter and thus assumed transparent and red purple. The absorption spectrum shows that the material has a broad peak absorption at 570 nm. This absorption corresponds to the wavelength of plasma oscillation of metal grains. This shows that the material thus prepared can be thoroughly used as a nonlinear optical element.

EXAMPLE 3

In a stream of dried nitrogen, 1.028 g of 2,2-bis[4-(4-aminophenoxy)phenyl]hexafluoropropane represented by the following general formula (27) was dissolved in 7.5 ml of dimethylacetamide. After complete dissolution was made, 0.888 g of 4,4'-(hexafluoroisopropyridene)phthalic anhydride represented by the general formula (28) was gradually added to the solution. Subsequently, in a stream of dried nitrogen, the mixture was slowly stirred with its temperature kept at 10° to 15° C. for 1 hour. The mixture was further stirred with its temperature kept at 20° to 25° C. for 2 hours to obtain a solution of a high molecular compound represented by the general formula (29). The solution of a high molecular compound thus obtained and a solution obtained by mixing 0.080 g of tetrachloroauric acid and 7.5 ml of dimethylacetamide were then mixed to obtain a light orange transparent solution. The foregoing mixing procedures were all effected in an atmosphere of dried nitrogen.

The solution was then spin-coated on a glass substrate in the atmosphere. The coated material was heated to a temperature of 70° C. for 30 minutes in vacuo under a reduced pressure of 1 Torr, and then kept for 30 minutes so that the solvent was removed therefrom to obtain a light yellow transparent film (general formula (30)). This film was then subjected to heat treatment at a temperature of 200° C. for 30 minutes in the atmosphere. When the material was examined by X-ray diffractometry for the presence of deposit, it was confirmed that Au had been deposited by the heat treatment. The grain diameter of the deposit was found to be 5 to 15 nm under a transmission electron microscope. The high molecular compound/Au composite film thus obtained contained a deposit having a sufficiently small grain diameter and thus assumed transparent and red purple.

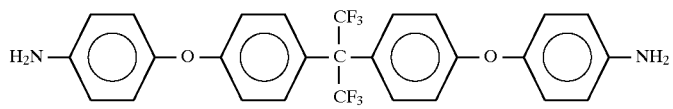

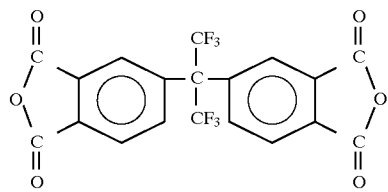

-continued

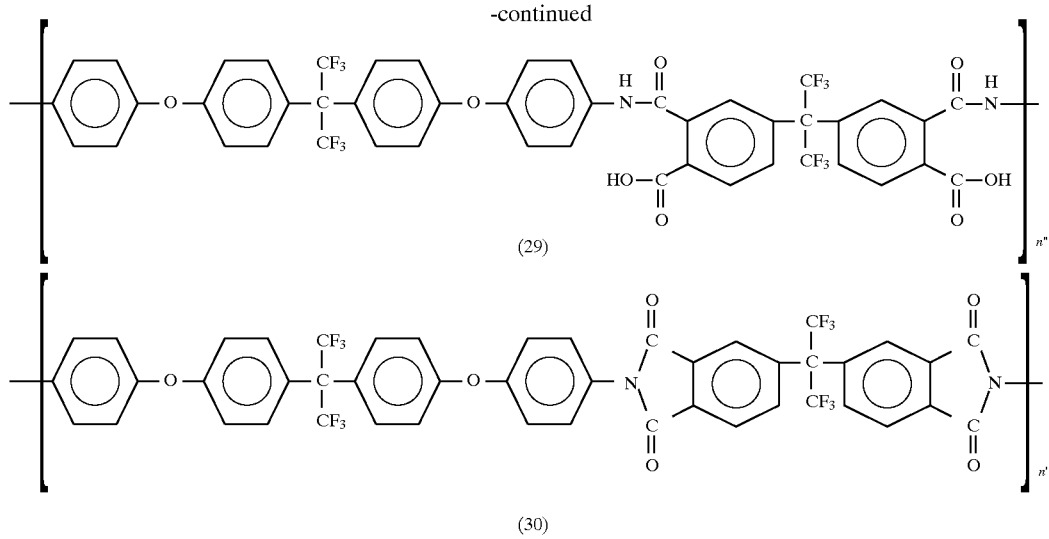

(29)

(30)

wherein n" is about 300.

EXAMPLE 4

In a stream of dried nitrogen, a dispersion obtained by mixing 0.035 g of CuCl, 0.02 g of dicyandiamide and 7.5 ml of dimethylacetamide with stirring and 2.0 g of a bisphenol A type epoxy resin (trade name: Epicoat 562, available from Shell) were mixed to obtain a light green transparent liquid. The foregoing mixing procedures were all effected in an atmosphere of dried nitrogen. The solution was then spin-coated on a glass substrate in the atmosphere. The coated material was heated to a temperature of 70° C. in the atmosphere, and then kept for 60 minutes so that the solvent was removed therefrom to obtain a light yellow transparent film. This film was then subjected to heat treatment at a temperature of 200° C. for 30 minutes under a nitrogen-stream of 200 ml/min. When the material was examined by X-ray diffractometry for the presence of deposit, it was confirmed that $Cu_2O$ had been deposited. The high molecular compound/$Cu_2O$ composite film thus obtained contained a deposit having a sufficiently small grain diameter and thus assumed transparent and brown.

EXAMPLE 5

In a stream of dried nitrogen, 0.236 g of diaminodiphenylether represented by the foregoing general formula (23) was dissolved in 7.5 ml of dimethylacetamide. After complete dissolution was made, 0.314 g of pyromellitic dianhydride represented by the foregoing general formula (24) was gradually added to the solution. Subsequently, in a stream of dried nitrogen, the mixture was slowly stirred with its temperature kept at 10° to 15° C. for 1 hour. The mixture was further stirred with its temperature kept at 20° to 25° C. for 2 hours to obtain a solution of a high molecular compound represented by the foregoing general formula (25). The solution of a high molecular compound thus obtained and a turbid colloidal dispersion obtained by mixing 0.065 g of CuCl and 7.5 ml of dimethylacetamide with stirring were then mixed. As a result, the solution turned to a light green transparent liquid in which CuCl had been dissolved. The foregoing mixing procedures were all effected in an atmosphere of dried nitrogen.

The solution was then spin-coated on a glass substrate in an atmosphere of dried nitrogen. The coated material was heated to a temperature of 70° C. for 30 minutes in vacuo under a reduced pressure of 1 Torr, and then kept for 30 minutes so that the solvent was removed therefrom to obtain a colorless transparent film. This film was then subjected to heat treatment at a temperature of 200° C. for 30 minutes in vacuo under a reduced pressure of $1 \times 10^{-5}$ Torr. FIG. 1 illustrates the change of infrared absorption spectrum by heat treatment wherein FIG. 1(a) illustrates the infrared absorption spectrum before heat treatment and FIG. 1(b) illustrates the infrared absorption spectrum after heat treatment. These results show that the heat treatment involves the change of the matrix from the high molecular compound represented by the foregoing general formula (25) to the high molecular compound represented by the foregoing general formula (26). When the matrix was examined by X-ray diffractometry for the presence of deposit, it was confirmed that CuCl had been deposited by the heat treatment. The grain diameter of the deposit was found to be 5 to 50 nm under a transmission electron microscope. The high molecular compound/CuCl composite film thus obtained contained a deposit having a sufficiently small grain diameter and thus assumed transparent and light yellow.

EXAMPLE 6

In a stream of dried nitrogen, 0.236 g of diaminodiphenylether represented by the foregoing general formula (23) was dissolved in 7.5 ml of dimethylacetamide. After complete dissolution was made, 0.314 g of pyromellitic dianhydride represented by the foregoing general formula (24) was gradually added to the solution. Subsequently, in a stream of dried nitrogen, the mixture was slowly stirred with its temperature kept at 10° to 15° C. for 1 hour. The mixture was further stirred with its temperature kept at 20° to 25° C. for 2 hours to obtain a solution of a high molecular compound represented by the foregoing general formula (5). The solution of a high molecular compound thus obtained and a turbid colloidal dispersion obtained by mixing 0.094 g of CuBr and 7.5 ml of dimethylacetamide with stirring were then mixed. As a result, the solution turned to a light green transparent liquid. The foregoing mixing procedures were all effected in an atmosphere of dried nitrogen.

The solution was then spin-coated on a glass substrate in an atmosphere of dried nitrogen. The coated material was heated to a temperature of 70° C. for 30 minutes in vacuo under a reduced pressure of 1 Torr, and then kept for 30 minutes so that the solvent was removed therefrom to obtain a light green transparent film. This film was then subjected to heat treatment at a temperature of 200° C. for 30 minutes in vacuo under a reduced pressure of $1 \times 10^{-5}$ Torr. When the material was examined by X-ray diffractometry for the presence of deposit, it was confirmed that CuBr had been deposited by the heat treatment. The grain diameter of the deposit was found to be 5 to 50 nm under a transmission electron microscope. The high molecular compound/CuCl composite film thus obtained contained a deposit having a sufficiently small grain diameter and thus assumed transparent and yellow.

EXAMPLE 7

In a stream of dried nitrogen, 1.028 g of 2,2-bis[4-(4-aminophenoxy)phenyl]hexafluoropropane represented by the foregoing general formula (27) was dissolved in 37.5 ml of dimethylacetamide. After complete dissolution was made, 0.888 g of 4,4'-(hexafluoroisopropyridene)phthalic anhydride represented by the foregoing general formula (28) was gradually added to the solution. Subsequently, in a stream of dried nitrogen, the mixture was slowly stirred with its temperature kept at 10° to 15° C. for 1 hour. The mixture was further stirred with its temperature kept at 20° to 25° C. for 2 hours to obtain a solution of a high molecular compound represented by the foregoing general formula (29). The solution of a high molecular compound thus obtained and a solution obtained by mixing 0.099 g of CuCl and 37.5 ml of dimethylacetamide were then mixed to obtain a light blue transparent solution. The foregoing mixing procedures were all effected in an atmosphere of dried nitrogen.

Figure 2:
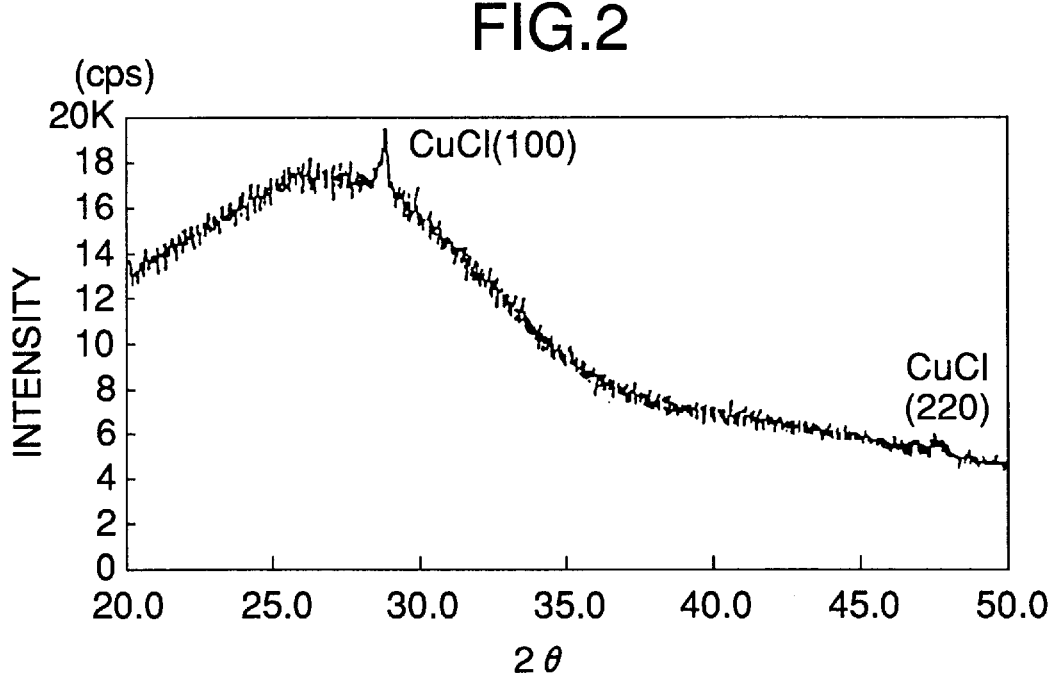
FIG. 2 shows an X-ray diffraction spectrum of a high molecular compound/CuCl composite film of Example 7 (determined with CuKα rays)
Figure 3:
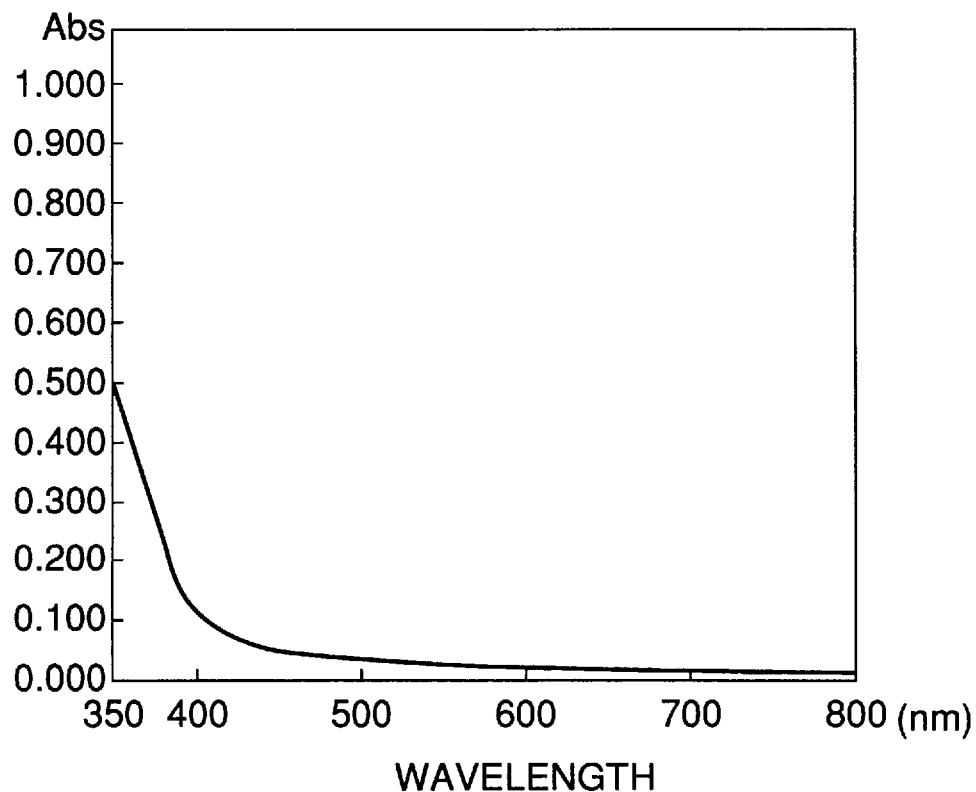
FIG. 3 shows an absorption spectrum of a high molecular compound/CuCl composite film of Example 7.

The solution was then spin-coated on a glass substrate in an atmosphere of dried nitrogen. The coated material was heated to a temperature of 70° C. for 30 minutes in vacuo under a reduced pressure of 1 Torr, and then kept for 30 minutes so that the solvent was removed therefrom to obtain a colorless transparent film. This film was then subjected to heat treatment at a temperature of 200° C. for 30 minutes in vacuo under a reduced pressure of $1 \times 10^{-5}$ Torr (the foregoing general formula (30)). When the material was examined by X-ray diffractometry for the presence of deposit, it was confirmed that CuCl had been deposited by the heat treatment (see FIG. 2). The grain diameter of the deposit was found to be 10 to 50 nm under a transmission electron microscope. The high molecular compound/CuCl composite film thus obtained contained a deposit having a sufficiently small grain diameter and thus assumed transparent and light yellow. FIG. 3 illustrates the absorption spectrum of this film. A CuCl excimer absorption sub-band structure is found at 370 nm.

Figure 9:
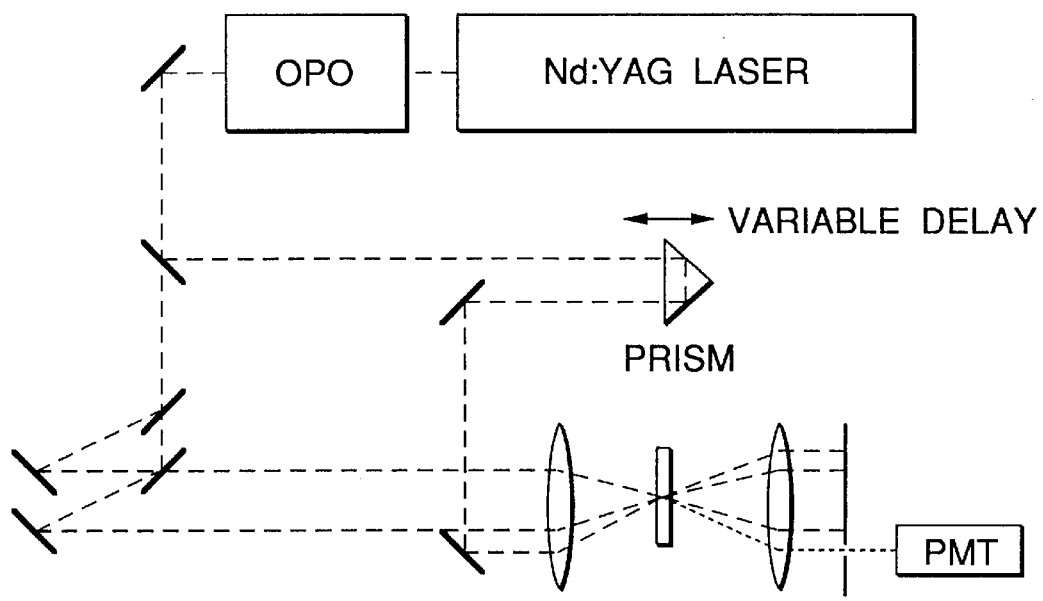
FIG. 9 illustrates an apparatus for evaluating nonlinear optical characteristic of the thin films prepared in the Examples.

Then, the CuCl fine grain-dispersed thin film thus obtained was measured with respect to the nonlinear susceptibility $\chi^{(3)}$ using an optical apparatus shown in FIG. 9 according to the degenerate four-light wave mixing method. As a result, the value of $\chi^{(3)}$ was very high, $5.4 \times 10^{-8}$ esu.

In the measurement of the nonlinear susceptibility, a Nd:YAG laser was used as a light source, and its 4th harmonic (266 nm) was applied as excitation light to β-BaB$_2$O$_4$(BBO) crystals in an optical parametric oscillator (OPO) to adjust a light wavelength for each tested sample. As shown in FIG. 9, an outgoing beam from OPO is divided by a half mirror to two pump lights and one probe light which are impinged into a sample whereupon a signal light is generated. The value of $\chi^{(3)}$ is calculated from light strength of the signal light measured by a photomultiplier (PMT).

EXAMPLE 8

In a stream of dried nitrogen, 1.028 g of 2,2-bis[4-(4-aminophenoxy)phenyl]hexafluoropropane represented by the foregoing general formula (27) was dissolved in 37.5 ml of dimethylacetamide. After complete dissolution was made, 0.888 g of 4,4'-(hexafluoroisopropyridene)-2-phthalic anhydride represented by the foregoing general formula (28) was gradually added to the solution. Subsequently, in a stream of dried nitrogen, the mixture was slowly stirred with its temperature kept at 10° to 15° C. for 1 hour. The mixture was further stirred with its temperature kept at 20° to 25° C. for 2 hours to obtain a solution of a high molecular compound represented by the foregoing general formula (29). The solution of a high molecular compound thus obtained and a solution obtained by mixing 0.142 g of CuBr and 37.5 ml of dimethylacetamide with stirring were then mixed to obtain a light blue transparent solution. The foregoing mixing procedures were all effected in an atmosphere of dried nitrogen.

Figure 4:
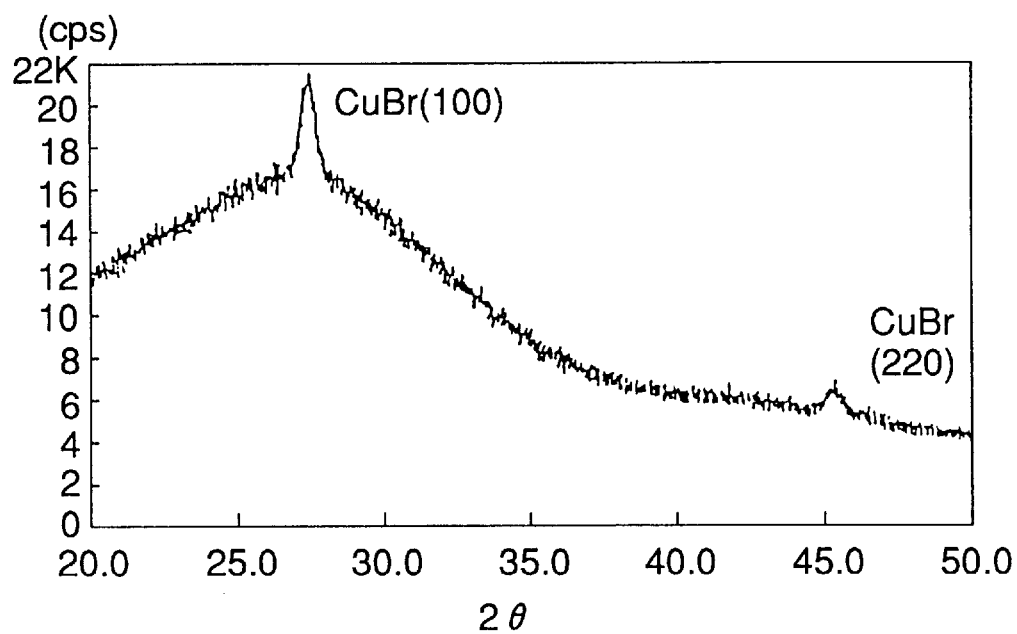
FIG. 4 shows an X-ray diffraction spectrum of a high molecular compound/CuBr composite film of Example 8 (determined with CuKα rays)
Figure 5:
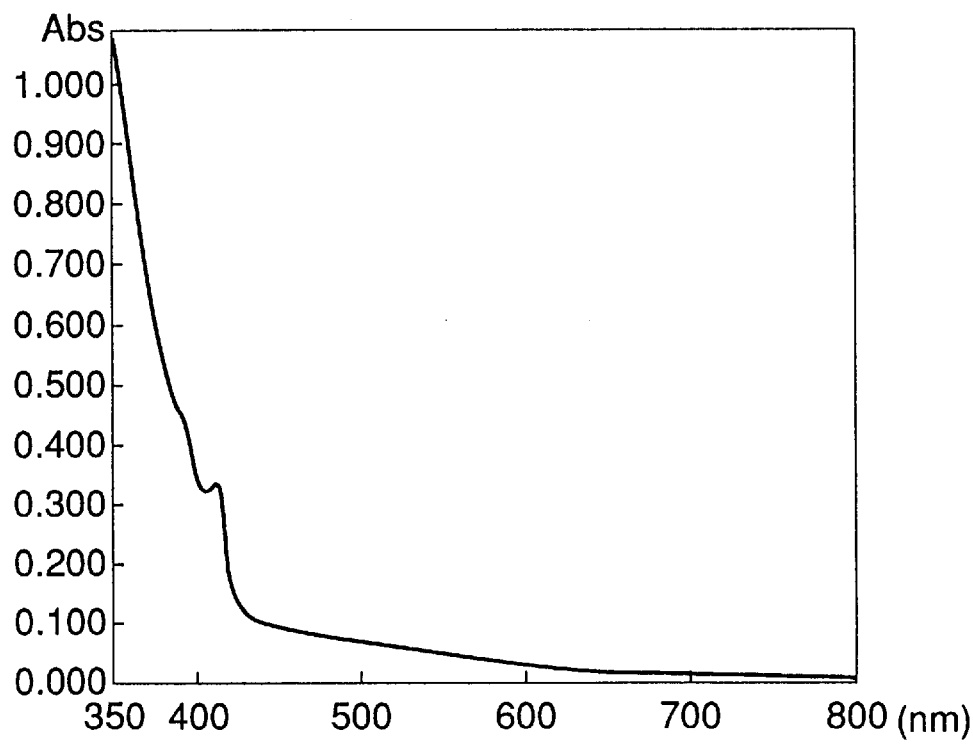
FIG. 5 shows an absorption spectrum of a high molecular compound/CuBr composite film of Example 8.

The solution was then spin-coated on a glass substrate in an atmosphere of dried nitrogen. The coated material was heated to a temperature of 70° C. in vacuo under a reduced pressure of 1 Torr, and then kept at the same temperature for 30 minutes so that the solvent was removed therefrom to obtain a colorless transparent film. This film was then subjected to heat treatment at a temperature of 200° C. for 30 minutes under a reduced pressure of $1 \times 10^{-5}$ Torr (the foregoing general formula (30)). When the material was examined by X-ray diffractometry for the presence of deposit, it was confirmed that CuBr had been deposited by the heat treatment (see FIG. 4). The grain diameter of the deposit was found to be 15 to 50 nm under a transmission electron microscope. The high molecular compound/CuBr composite film thus obtained contained a deposit having a sufficiently small grain diameter and thus assumed transparent and light yellow. FIG. 5 illustrates the absorption spectrum of this film. A CuBr excimer absorption sub-band structure is found at 380 nm and 415 nm.

Then the CuBr fine grain-dispersed thin film thus obtained was measured with respect to the nonlinear susceptibility $\chi^{(3)}$ using the apparatus as shown in FIG. 9 wherein the light wavelength was adjusted to 420 nm. The value of $\chi^{(3)}$ was very high, $9.5 \times 10^{-9}$ esu.

EXAMPLE 9

In a stream of dried nitrogen, 0.236 g of diaminodiphenylether represented by the foregoing general formula (23) was dissolved in 7.5 ml of dimethylacetamide. After complete dissolution was made, 0.314 g of pyromellitic dianhydride represented by the foregoing general formula (24) was gradually added to the solution. Subsequently, in a stream of dried nitrogen, the mixture was slowly stirred with its temperature kept at 10° to 15° C. for 1 hour. The mixture was further stirred with its temperature kept at 20° to 25° C. for 2 hours to obtain a solution of a high molecular compound represented by the foregoing general formula (25). The solution of a high molecular compound thus obtained and a turbid colloidal dispersion obtained by mixing 0.065 g of CuCl and 7.5 ml of dimethylacetamide with stirring were then mixed. As a result, CuCl was dissolved in the solution, and the mixture then turned to a light green transparent liquid. The foregoing mixing procedures were all effected in an atmosphere of dried nitrogen.

The solution was then spin-coated on a glass substrate in an atmosphere of dried nitrogen. The coated material was heated to a temperature of 70° C. in vacuo under a reduced pressure of 1 Torr, and then kept at the same temperature for 60 minutes so that the solvent was removed therefrom to obtain a light green transparent film. This film was then subjected to heat treatment at a temperature of 200° C. for 30 minutes in vacuo under a reduced pressure of $1 \times 10^{-5}$ Torr. When the material was examined by X-ray diffractometry for the presence of deposit, it was confirmed that CuCl had been deposited by the heat treatment. The high molecular compound/CuCl composite film thus obtained contained a deposit having a sufficiently small grain diameter and thus assumed transparent and brown.

EXAMPLE 10

In a stream of dried nitrogen, 0.235 g of diaminodiphenylether represented by the foregoing general formula (23) was dissolved in 15 ml of dimethylacetamide. After complete dissolution was made, 0.315 g of pyromellitic dianhydride represented by the foregoing general formula (24) was gradually added to the solution. Subsequently, in a stream of dried nitrogen, the mixture was slowly stirred with its temperature kept at 10° to 15° C. for 1 hour. The mixture was further stirred with its temperature kept at 20° to 25° C. for 2 hours to obtain a solution of a high molecular compound represented by the foregoing general formula (25). The solution of a high molecular compound thus obtained and 0.07 g of CuCl were mixed with stirring to obtain a light green transparent liquid. The foregoing mixing procedures were all effected in an atmosphere of dried nitrogen. The solution was then spin-coated on a glass substrate in an atmosphere of dried nitrogen. The coated material was heated to a temperature of 70° C. for 30 minutes in vacuo under a reduced pressure of 1 Torr, and then kept for 30 minutes so that the solvent was removed therefrom to obtain a light green transparent film. The glass substrate with this film was then dipped in a 4:3.5:8 (volumetric ratio) of acetic anhydride, pyridine and benzene in an atmosphere of dried nitrogen for 12 hours. An infrared absorption spectrum measurement showed that the heat treatment had involved the change of the matrix from a high molecular compound represented by the general formula (25) to a high molecular compound represented by the general formula (26). When the material was examined by X-ray diffractometry for the presence of deposit, the deposition of CuCl was observed in the material which had been subjected to chemical treatment. The film thus obtained contained a deposit having a sufficiently small grain diameter and thus assumed transparent and light brown.

EXAMPLE 11

In a stream of dried nitrogen, 1.028 g of 2,2-bis[4-(4-aminophenoxy)phenyl]hexafluoropropane represented by the foregoing general formula (27) was dissolved in 35 ml of dimethylacetamide. After complete dissolution was made, 0.888 g of 4,4'-(hexafluoroisopropyridene)-2-phthalic anhydride represented by the foregoing general formula (28) was gradually added to the solution. Subsequently, in a stream of dried nitrogen, the mixture was slowly stirred with its temperature kept at 10° to 15° C. for 1 hour. The mixture was further stirred with its temperature kept at 20° to 25° C. for 2 hours to obtain a solution of a high molecular compound represented by the foregoing general formula (29). The solution of a high molecular compound thus obtained and 0.15 g of CuCl were mixed with stirring to obtain a light blue transparent liquid. The foregoing mixing procedures were all effected in an atmosphere of dried nitrogen. The solution was then spin-coated on a glass substrate in an atmosphere of dried nitrogen. The coated material was heated to a temperature of 70° C. in vacuo under a reduced pressure of 1 Torr, and then kept at the same temperature for 30 minutes so that the solvent was removed therefrom to obtain a light blue transparent film. This film was then subjected to chemical treatment in the same manner as in Example 10. When the material was examined by X-ray diffractometry for the presence of deposit, the deposition of CuCl was observed. The film thus obtained contained a deposit having a sufficiently small grain diameter and thus assumed transparent and colorless. FIG. 6 illustrates the absorption spectrum of this film. A CuCl excimer absorption sub-band structure is found at 370 nm.

EXAMPLE 12

In a stream of dried nitrogen, 0.20 g of a poly-p-aminostyrene (synthesized by the method described in C. Kotlarchik and L. M. Minsk, "J. Polymer Sci. Polym. Chem.", Ed., 13, 1743 (1975)) was dissolved in 10 ml of dimethylformamide. 0.25 g of phthalic anhydride was then gradually added to the solution under cooling with stirring. The mixture was then stirred for 3 hours. The high molecular compound solution thus obtained was mixed with a turbid colloidal dispersion obtained by mixing 0.072 g of CuCl with 7.5 ml of dimethylformamide to obtain a mixture of a high molecular compound and CuCl. The foregoing mixing procedures were all effected in an atmosphere of dried nitrogen. The solution thus obtained was then spin-coated on a glass substrate in an atmosphere of dried nitrogen. The coated material was then heated to a temperature of 70° C. for 30 minutes and 10° C. for 30 minutes in vacuo under a reduced pressure of 1 Torr to obtain a film. When this film was observed under a transmission electron microscope, finely divided grains having a size of several nanometers to scores of nanometers were observed to be separated out.

EXAMPLE 13

In a stream of dried nitrogen, 0.20 g of a poly-p-aminostyrene was dissolved in 10 ml of dimethylformamide. 0.36 g of pyromellitic dianhydride was gradually added to the solution with stirring. The mixture was then stirred for 24 hours. The high molecular compound solution thus obtained was then mixed with 0.17 g of p-toluidine. The mixture was then stirred for 3 hours. The high molecular compound solution was then mixed with a solution obtained by mixing 0.080 g of tetrachloroauric acid with 7.5 ml of dimethylacetamide with stirring to obtain a coating solution. The foregoing mixing procedures were all effected in an atmosphere of dried nitrogen. The coating solution was then spin-coated on a glass substrate in the atmosphere. The coated material was then heated to a temperature of 70° C. for 30 minutes and 160° C. for 30 minutes in vacuo under a reduced pressure of 1 Torr to obtain a film. When this film was measured for absorption spectrum, a peak absorption was found in the vicinity of 570 nm. This absorption corresponds to the frequency of plasma oscillation of metal grains. This showed that the material thus prepared can be thoroughly used as a nonlinear optical material. When the material was examined for the presence of deposit under a transmission electron microscope, grains having a size of several nanometers to scores of nanometers were observed to be separated out.

EXAMPLE 14

A film was prepared in the same manner as in Example 12 except that 0.01 g of a polyamide-imide represented by the general formula (31) (synthesized by the method described in C. J. Huang, et al., "J. Appl. Polym. Sci.", 42, 2267 (1991)) was added to the high molecular compound solution. The film was observed under a transmission electron microscope. As a result, finely divided grains having a size of several nanometers to scores of nanometers were observed to be separated out.

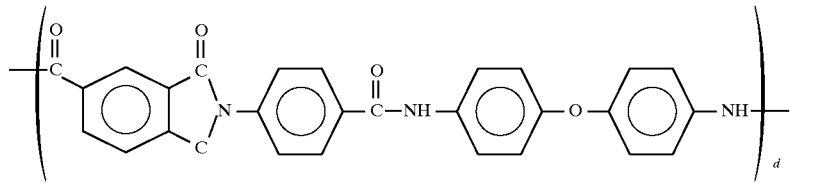

EXAMPLE 15

A film was prepared in the same manner as in Example 13 except that 4,4'-diaminodiphenylether was used instead of p-toluidine. The film was observed under a transmission electron microscope. As a result, finely divided grains having a size of several nanometers to scores of nanometers were observed to be separated out.

Comparative Example 1

In a stream of dried nitrogen, a dimethylformamide solution of a polystyrene was mixed with a turbid colloidal dispersion obtained by mixing CuCl with dimethylformamide with stirring to prepare a solution. The solution was then used to prepare a film. However, this film had a poor transparency.

EXAMPLE 16

In a stream of dried nitrogen, a turbid colloidal dispersion obtained by mixing 0.072 g of CuCl with 7.5 ml of dimethylformamide with stirring was added to a solution of 0.20 g of the same poly-p-aminostyrene as used in Example 12 in 10 ml of dimethylformamide with stirring to obtain a mixture of a high molecular compound and CuCl. To the mixture was added diglycidylether of bisphenol A in an amount of half the equal part of the poly-p-aminostyrene. The solution thus obtained was then spin-coated on a glass substrate in an atmosphere of dried nitrogen. The coat thus obtained was then heated to a temperature of 70° C. for 1 hour and 120° C. for 30 minutes in vacuo to obtain a film. When the film was observed under a transmission electron microscope, finely divided grains having a size of several nanometers to scores of nanometers were observed to be separated out.

EXAMPLE 17

In a stream of dried nitrogen, 0.20 g of a polycarbonate represented by the following general formula (32) (80:20 copolymer of diphenolic acid and bisphenol A) was dissolved in 10 ml of dimethylformamide. A solution obtained by mixing 0.080 g of tetrachloroauric acid with 7.5 ml of dimethylacetamide with stirring was added to the solution with stirring. To the solution was then added a 1:5 mixture of hexamethylene-1,6-diisocyanate and methylphenylisocyanate in an amount of the equal part of the carboxylic group in the polycarbonate to prepare a coating solution. The solution thus obtained was then spin-coated on a glass substrate. The coat thus obtained was then heated to a temperature of 70° C. for 1 hour and 120° C. for 30 minutes in vacuo under a reduced pressure of 1 Torr to obtain a film. When the film was measured for absorption spectrum, a peak absorption was found in the vicinity of 570 nm. This peak absorption corresponds to the frequency of plasma oscillation of metal grains. This showed that the material thus prepared can be thoroughly used as a nonlinear optical material. When the material was examined for the presence of deposit under a transmission electro n microscope, finely divided grains having a size of several nanometers to scores of manometers were observed to be separated out.

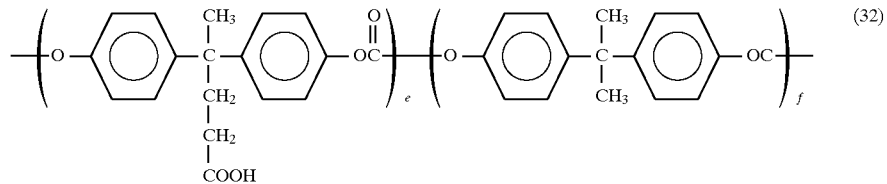

EXAMPLE 18

A film was prepared in the same manner as in Example 16 except that a polycarbonate represented by the foregoing general formula (31) was used instead of the poly-p-aminostyrene. The film was observed under a transmission electron microscope for the presence of deposit. As a result, finely divided grains having a size of several nanometers to scores of nanometers were observed to be separated out.

EXAMPLE 19

A film was prepared in the same manner as in Example 17 except that 0.01 g of a polyamide-imide represented by the foregoing general formula (31) was added to the high molecular compound solution. The film was observed under a transmission electron microscope. As a result, finely divided grains having a size of several nanometers to scores of nanometers were observed to be separated out.

EXAMPLE 20

A film was prepared in the same manner as in Example 16 except that CuBr was used instead of CuCl. The film was observed under a transmission electron microscope. As a result, finely divided grains having a size of several nanometers to scores of nanometers were observed to be separated out.

EXAMPLE 21

A film was prepared in the same manner as in Example 17 except that a high molecular compound (50:50 copolymer)

represented by the following general formula (33) was used instead of the polycarbonate. The film was observed under a transmission electron microscope. As a result, finely divided grains having a size of several nanometers to scores of nanometers were observed to be separated out.

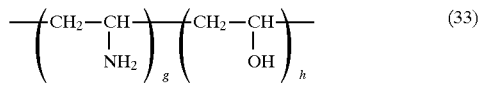

EXAMPLE 22

In a stream of dried nitrogen, 0.3 g of a compound represented by the following general formula (34) (synthesized by the method described in M. H. Kailani, et al., "Macromoleculaes", 25, 3751 (1992)) was dissolved in a solution of 0.6 g of the polyamide-imide represented by the foregoing general formula (31) in 15 ml of dimethylformamide. The solution thus obtained was then mixed with 0.4 g of CuCl with stirring to obtain a light green transparent liquid. The solution thus obtained was then spin-coated on a glass substrate in an atmosphere of dried nitrogen. The coated material was heated to a temperature of 70° C. for 30 minutes in vacuo under a reduced pressure of 1 Torr, and then kept at the same temperature for 30 minutes so that the solvent was removed therefrom to obtain a light green transparent film. This film was heated to a temperature of 150° C. in vacuo under a reduced pressure of $1\times10^{-5}$ Torr, and then kept at the same temperature for 1 hour. When this film was examined for the presence of deposit by X-ray diffractometry, the deposition of CuCl crystal was observed. When this film was measured for the grain diameter of the deposit under a transmission electron microscope, finely divided grains having a size of several nanometers to scores of nanometers were observed to be separated out. When this film was measured for absorption spectrum, a CuCl exiton absorption sub-band structure was found at 370 nm.

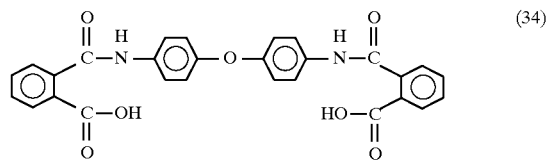

EXAMPLE 23

In a stream of dried nitrogen, 0.3 g of a compound represented by the following general formula (34) was dissolved in a solution of 0.6 g of the polyamide-imide represented by the foregoing general formula (31) in 15 ml of dimethylformamide. The solution thus obtained was then mixed with 0.4 g of CuCl with stirring to obtain a light green transparent liquid. The solution thus obtained was then spin-coated on a glass substrate in an atmosphere of dried nitrogen. The coated material was heated to a temperature of 70° C. for 30 minutes in vacuo under a reduced pressure of 1 Torr, and then kept at the same temperature for 30 minutes so that the solvent was removed therefrom to obtain a light green transparent film. The glass substrate with this film was then dipped in a 4:3.5:8 (volumetric acid) of acetic anhydride, pyridine and benzene in a stream of dried nitrogen for 12 hours. When this film was examined for the presence of deposit by X-ray diffractometry, the deposition of CuCl crystal was observed. When this film was measured for the grain diameter of the deposit under a transmission electron microscope, finely divided grains having a size of several nanometers to scores of nanometers were observed to be separated out. When this film was measured for absorption spectrum, a CuCl excimer absorption sub-band structure was found at 370 nm.

EXAMPLE 24

In a stream of dried nitrogen, 0.1 g of a compound represented by the foregoing general formula (34) was dissolved in a solution of 0.6 g of polycarbonate resin (molecular weight: 21,000) having a repeating unit represented by the following formula (35) in 15 ml of dimethylformamide. The solution thus obtained was then mixed with 0.05 g of CuCl with stirring to obtain a light green transparent liquid. The solution thus obtained was then spin-coated on a glass substrate in an atmosphere of dried nitrogen. The coated material was heated to a temperature of 70° C. for 30 minutes in vacuo under a reduced pressure of 1 Torr, and then kept at the same temperature for 30 minutes so that the solvent was removed therefrom to obtain a pale blue transparent film. This film was heated to a temperature of 150° C. in vacuo under reduced pressure of $1\times10^{-5}$ Torr, and then kept at the same temperature for 1 hour. When this film was examined for the presence of deposit by X-ray diffractometry, the deposition of CuCl crystal was observed. When this film was measured for the grain diameter of the deposit under a transmission electron microscope, finely divided grains having a size of several nanometers to scores of nanometers were observed to be separated out. When this film was measured for absorption spectrum, a CuCl exiton absorption sub-band structure was found at 370 nm.

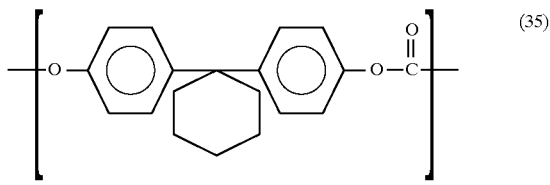

EXAMPLE 25

In a stream of dried nitrogen, 0.3 g of a compound represented by the following general formula (34) was dissolved in a solution of 0.6 g of the polyamide-imide represented by the foregoing general formula (31) in 15 ml of dimethylformamide. The solution thus obtained was then mixed with 0.1 g of tetrachloroauric acid with stirring to obtain a light orange transparent liquid. The solution thus obtained was then spin-coated on a glass substrate in a stream of dried nitrogen. The coated material was heated to a temperature of 70° C. for 30 minutes in vacuo under a reduced pressure of 1 Torr, and then kept at the same temperature for 30 minutes so that the solvent was removed therefrom to obtain a light yellow transparent film. This film was heated to a temperature of 250° C. in the atmosphere, and then kept at the same temperature for 1 hour. When this film was measured for the grain diameter of the deposit under a transmission electron microscope, finely divided grains having a size of several nanometers to scores of nanometers were observed to be separated out. When this film was measured for absorption spectrum, a broad absorption with its peak centered at 570 nm was observed. This absorption corresponds to the frequency of plasma oscillation of metal grains. This showed that the material thus prepared can be thoroughly used as a nonlinear optical material.

Comparative Example 2

In a stream of dried nitrogen, a solution of 0.6 g of a polycarbonate resin consisting of repeating structure units represented by the foregoing general formula (35) (molecular weight: 21,000) in 15 ml of dimethylformamide was mixed with 0.05 g of CuCl. As a result, a turbid green liquid was obtained. Thus, CuCl could not be thoroughly dissolved in the solution.

EXAMPLE 26

In a stream of dried nitrogen, 30 ml of a 20% aqueous solution of a high molecular compound having an intrinsic viscosity of 0.95 dl/g at a temperature of 30° C. in the water consisting of repeating structure units represented by the following general formula (36) was mixed with 0.05 g of CuCl to obtain a light green transparent liquid. The solution thus obtained was then spin-coated on a glass substrate in an atmosphere of dried nitrogen. The coated material was heated to a temperature of 70° C. in vacuo under a reduced pressure of 1 Torr, and then kept at the same temperature for 30 minutes so that the solvent was removed therefrom to obtain a light green transparent film. The glass substrate with this film was exposed to hydrogen chloride gas in an atmosphere of dried nitrogen for 1 hour. When the material was examined for the presence of deposit by X-ray diffractometry, the deposition of CuCl was observed. This film contained a deposit having a sufficiently small grain diameter and thus assumed transparent and light green.

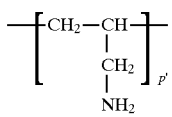

(36)

EXAMPLE 27

In a stream of dried nitrogen, 30 ml of a 20% aqueous solution of a high molecular compound consisting of repeating structure units represented by the foregoing general formula (36) was mixed with 0.05 g of CuBr to obtain a light green transparent liquid. The solution thus obtained was then spin-coated on a glass substrate in an atmosphere of dried nitrogen. The coated material was heated to a temperature of 70° C. in vacuo under a reduced pressure of 1 Torr, and then kept at the same temperature for 30 minutes so that the solvent was removed therefrom to obtain a light green transparent film. The glass substrate with this film was exposed to hydrogen chloride gas in an atmosphere of dried nitrogen for 1 hour. When the material was examined for the presence of deposit by X-ray diffractometry, the deposition of CuBr was observed. This film contained a deposit having a sufficiently small grain diameter and thus assumed transparent and light green.

EXAMPLE 28

In a stream of dried nitrogen, 30 ml of a 20% aqueous solution of a high molecular compound consisting of repeating structure units represented by the foregoing general formula (36) was mixed with 0.05 g of CuCl to obtain a light green transparent liquid. The solution thus obtained was then spin-coated on a glass substrate in an atmosphere of dried nitrogen. The coated material was heated to a temperature of 70° C. in vacuo under a reduced pressure of 1 Torr, and then kept at the same temperature for 30 minutes so that the solvent was removed therefrom to obtain a light green transparent film. The glass substrate with this film was exposed to acetic acid vapor in an atmosphere of dried nitrogen for 1 hour. When the material was examined for the presence of deposit by X-ray diffractometry, the deposition of CuCl was observed. This film contained a deposit having a sufficiently small grain diameter and thus assumed transparent and light green.

EXAMPLE 29

In a stream of dried nitrogen, 5 g of a high molecular compound consisting of repeating structure units represented by the following general formula (37) synthesized by the method described in L. J. Guilbault, M. Murano, H. J. Harwood, "J. Macromol: Sci. Chem. A", 7, 1065 (1973) was dissolved in 30 ml of dimethylformamide. To the solution was then added 0.05 g of CuCl with stirring to obtain a light green transparent liquid. The solution thus obtained was then spin-coated on a glass substrate in the atmosphere. The coated material was heated to a temperature of 70° C. in vacuo under a reduced pressure of 1 Torr, and then kept at the same temperature for 30 minutes so that the solvent was removed therefrom to obtain a light green transparent film. When the material was examined for the presence of deposit by X-ray diffractometry, the deposition of CuCl was observed. This film contained a deposit having a sufficiently small grain diameter and thus assumed transparent and light green. The grain material of the deposit was found to be from 50 to 200 Å under a transmission electron microscope.

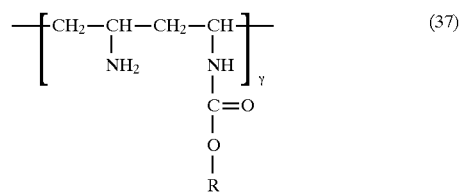

wherein the intrinsic viscosity is 1.0 dl/g.

EXAMPLE 30

In a stream of dried nitrogen, 5 g of a high molecular compound represented by the foregoing general formula (37) was dissolved in 30 ml of dimethylformamide. To the solution was then added 0.07 g of CuBr with stirring to obtain a light green transparent liquid. The solution thus obtained was then spin-coated on a glass substrate in the atmosphere. The coated material was heated to a temperature of 70° C. in vacuo under a reduced pressure of 1 Torr, and then kept at the same temperature for 30 minutes so that the solvent was removed therefrom to obtain a light green transparent film. The film thus obtained was then kept at a temperature of 200° C. in the atmosphere for 2 hours. When the material was examined for the presence of deposit by X-ray diffractometry, the deposition of CuBr was observed. This film contained a deposit having a sufficiently small grain diameter and thus assumed transparent and light green.

EXAMPLE 31

In a stream of dried nitrogen, 0.236 g of diaminodiphenylether represented by the foregoing general formula (23) was dissolved in 7.5 ml of dimethylacetamide. After complete dissolution was made, 0.314 g of pyromellitic dianhydride represented by the foregoing general formula (24) was gradually added to the solution. Subsequently, in a stream of dried nitrogen, the mixture was slowly stirred with its temperature kept at 10° to 15° C. for 1 hour. The mixture was further stirred with its temperature kept at 20° to 25° C. for 2 hours to obtain a solution of a high molecular compound represented by the foregoing general formula (25). The high molecular compound solution thus obtained and a turbid colloidal solution obtained by mixing 0.065 g of CuCl with 7.5 ml of dimethylacetamide with stirring were mixed. As a result, the solution turned to a light green transparent liquid in which CuCl had been dissolved. The foregoing mixing procedures were all effected in an atmosphere of dried nitrogen. To the solution thus obtained was then added 0.133 g of methyltrimethoxysilane with stirring to obtain a uniform solution. To the solution was then added 0.036 g of a 0.05N hydrochloric acid. The mixture was then stirred at room temperature for 6 hours to undergo hydrolysis.

The solution thus obtained as a coating solution was then spin-coated on a quartz glass substrate to form a thin film. The foregoing procedures were all effected in an atmosphere of dried nitrogen. After dried, the coated material was heated to a temperature of 80° C. in vacuo under a reduced pressure of 1 Torr, and then kept at the same temperature for 1 hour to remove the solvent therefrom and accelerate gelatinization to obtain a light yellow transparent crack-free homogeneous film. The foregoing coating solution was diluted with ethanol three times. The coating solution thus diluted was then spin-coated on a crystalline silicon substrate to form a thin film. This film was heated and dried at the same time with the foregoing film. These specimens were measured for infrared absorption spectrum. These specimens were then allowed to cool to room temperature. These specimens were heated to a temperature of 200° C. in vacuo under a reduced pressure of $1 \times 10^{-5}$ Torr at a rate of 20° C./min. and then kept at the same temperature for 1 hour. These specimens were then allowed to cool to room temperature in vacuo.

The specimen formed on the crystalline silicon substrate was measured for infrared absorption spectrum before and after heat treatment to effect comparison of the change of absorption spectrum. As a result, it was found that the heat treatment involves the change from the polyamic acid compound represented by the foregoing general formula (25) to the polyimide compound represented by the foregoing general formula (26). It was also found that ethoxy group and hydroxyl group which had been unreacted before the heat treatment underwent decomposition to cause sol-gel reaction. The specimen formed on the quartz glass substrate was subjected to X-ray diffractometry and absorption spectrometry. As a result, X-ray diffraction spectrum showed diffraction peaks by microcrystal of CuCl, proving that finely divided grains of CuCl can be separated out in this thin film. Further, when this film was measured for absorption spectrum, a CuCl exiton absorption sub-band structure was found at around 370 nm. This shows that the material thus prepared can be applied to a nonlinear optical material.

A section of this thin film was observed under a transmission electron microscope. As a result, it was found that this film comprises finely divided grains of CuCl having a size of 5 to 10 nm uniformly dispersed therein in a high density.

EXAMPLE 32

A thin film was formed on a quartz glass substrate in the same manner as in Example 31 except that CuBr was used as a starting material of finely divided grains. The thin film thus obtained was a thin film that assumes transparent and light yellow and is homogeneous and insusceptible to crack. This film was subjected to X-ray diffractometry, absorption spectrometry and section observation under a transmission electron microscope in the same manner as in Example 1. This film was found to comprise finely divided grains of CuBr having a size of 5 to 10 nm uniformly dispersed therein in a high density and exhibit absorption of excimers of finely divided grains of CuBr. Thus, this thin film can be applied to a nonlinear optical material.

EXAMPLE 33

1.043 g of tetraethoxysilane ($Si(OCH_2CH_3)_4$) was mixed with 2.0 ml of ethanol. The mixture was then mixed with 0.544 g of a 0.05N hydrochloric acid. The mixture was heated to a temperature of 50° C. under reflux for 3 hours to obtain a partial hydrolyzate of tetraethoxysilane. To the solution thus obtained was then added dropwise 1.332 g of methyltrimethoxysilane. The mixture was then stirred for 5 hours to undergo hydrolysis. The sol thus obtained was then added to the polyamic acid solution of CuCl obtained in Example 31 to obtain a light yellow transparent solution. The solution thus obtained as a coating solution was then subjected to coating and calcination in the same manner as in Example 31. The thin film thus obtained was a film that assumes transparent and light yellow and is homogenous and insusceptible to crack.

This film was subjected to X-ray diffractometry, absorption spectrometry and section observation under a transmission electron microscope in the same manner as in Example 1. As a result, X-ray diffraction peaks were observed, showing that finely divided grains of CuCl had been separated out in the film. The absorption spectrum showed absorption of excimers of finely divided grains of CuCl. Thus, this thin film can be applied to a nonlinear optical material.

Comparative Example 3

2.083 g of tetraethoxysilane was dissolved in 1.5 ml of ethanol. The mixture was then mixed with 0.721 g of a 0.05N hydrochloric acid. The mixture was then heated to a temperature of 50° C. under reflux for 3 hours to obtain a partial hydrolyzate of tetraethoxysilane. The solution thus obtained was then stirred at room temperature for 5 hours to undergo hydrolysis. To the sol was then added a solution of 0.032 g of CuCl in 2.0 ml of acetonitrile with stirring. The solution thus obtained as a coating solution was then subjected to coating and calcination in the same manner as in Example 29. The thin film thus obtained had many cracks thereon and thus were peeled off the substrate, making it impossible to evaluate the properties thereof.

EXAMPLE 34

To 3.5 ml of dimethylacetamide were added 1.467 g of phthalic anhydride. The mixture was stirred in an ice-water bath until complete dissolution was made. To the solution were then added dropwise 2.150 g of γ-aminopropyltriethoxysilane [γ-APS:$H_2N$-$(CH_2)_3Si(OCH_2CH_3)_3$] with stirring. The mixture was then stirred for 2 hours to undergo reaction. To the solution was then added 0.085 g of CuCl. The mixture was stirred until CuCl was completely dissolved to obtain a light blue transparent solution. To the solution was then added dropwise 0.523 g of a 0.2N hydrochloric acid. The mixture was then stirred for 5 hours to undergo hydrolysis. The dropwise addition of hydrochloric acid caused the solution to turn to a yellow transparent solution.

The solution thus obtained as a coating solution was then spin-coated on a quartz glass substrate to form a thin film. The foregoing procedures were all effected in an atmosphere of dried nitrogen. After dried, the coated material was heated to a temperature of 80° C. in vacuo under a reduced pressure of 1 Torr, and then kept at the same temperature for 1 hour to remove the solvent therefrom and accelerate gelatinization to obtain a light yellow transparent crack-free homogeneous film. However, the thin film thus obtained was a soft film that can be marked with fingerprint when pressed with a finger. The thin film was measured for thickness by a light interference type thickness gauge at a refrax index of 1.5. The result was 1.2 μm. The foregoing coating solution was diluted with ethanol three times. The coating solution thus diluted was then spin-coated on a crystalline silicon substrate to form a thin film. This film was heated and dried at the same time with the foregoing film. These specimens were measured for infrared absorption spectrum.

These specimens were then allowed to cool to room temperature. These specimens were heated to a temperature of 200° C. in vacuo under a reduced pressure of 1×10$^{-5}$ Torr at a rate of 20° C./min. and then kept at the same temperature for 1 hour. These specimens were then allowed to cool to room temperature in vacuo. The film thus obtained exhibited an insufficient hardness even after heat treatment such that it can be damaged when rubbed with a metallic pin.

Figure 7A:
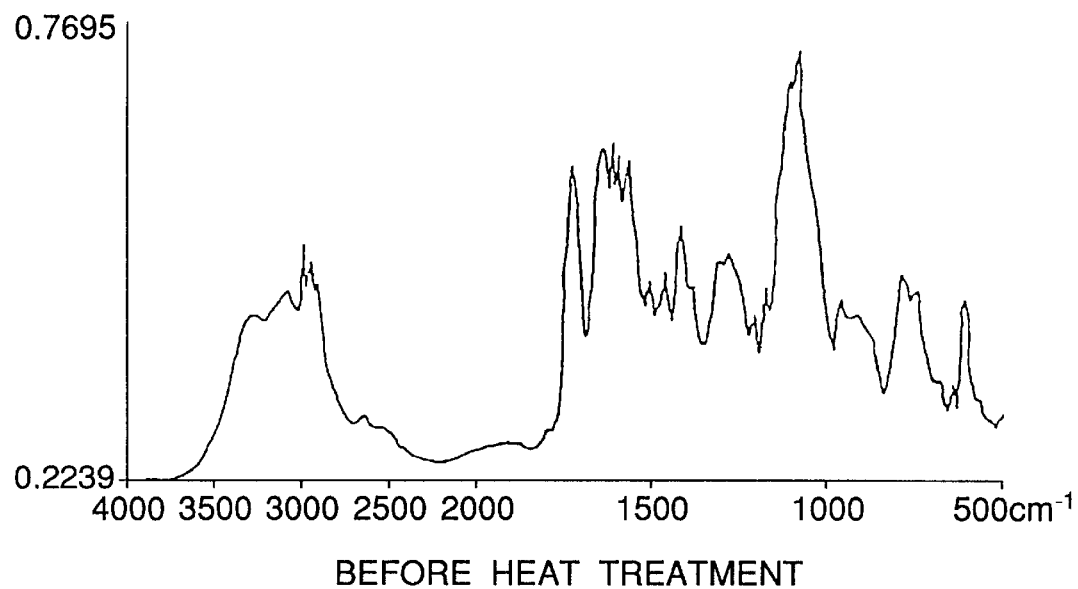
Figure 7B:
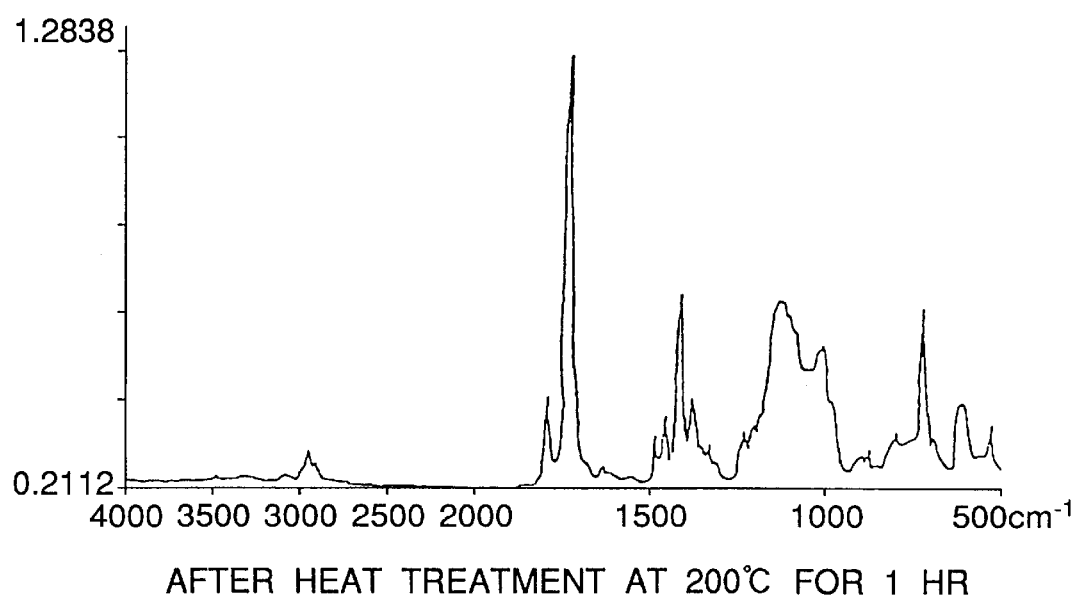

The specimen formed on the crystalline silicon substrate was measured for infrared absorption spectrum before and after heat treatment to effect comparison of the change of absorption spectrum. FIGS. 7(a) and (b) show infrared absorption spectrum before and after heat treatment, respectively. As a result, it was found that the heat treatment involves the change of the matrix from the polysiloxane compound represented by the following general formula (38) to the polysiloxane compound represented by following general formula (39). It was also found that ethoxy group and hydroxyl group which had been unreacted before the heat treatment underwent decomposition to cause sol-gel reaction.

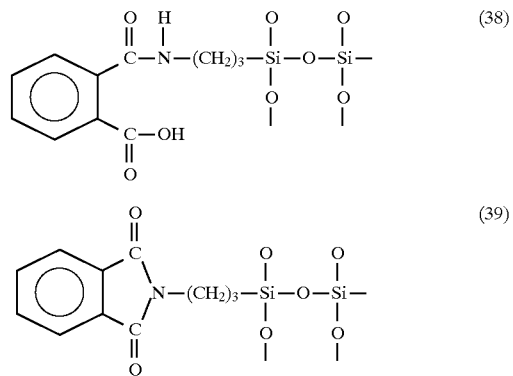

Figure 8:
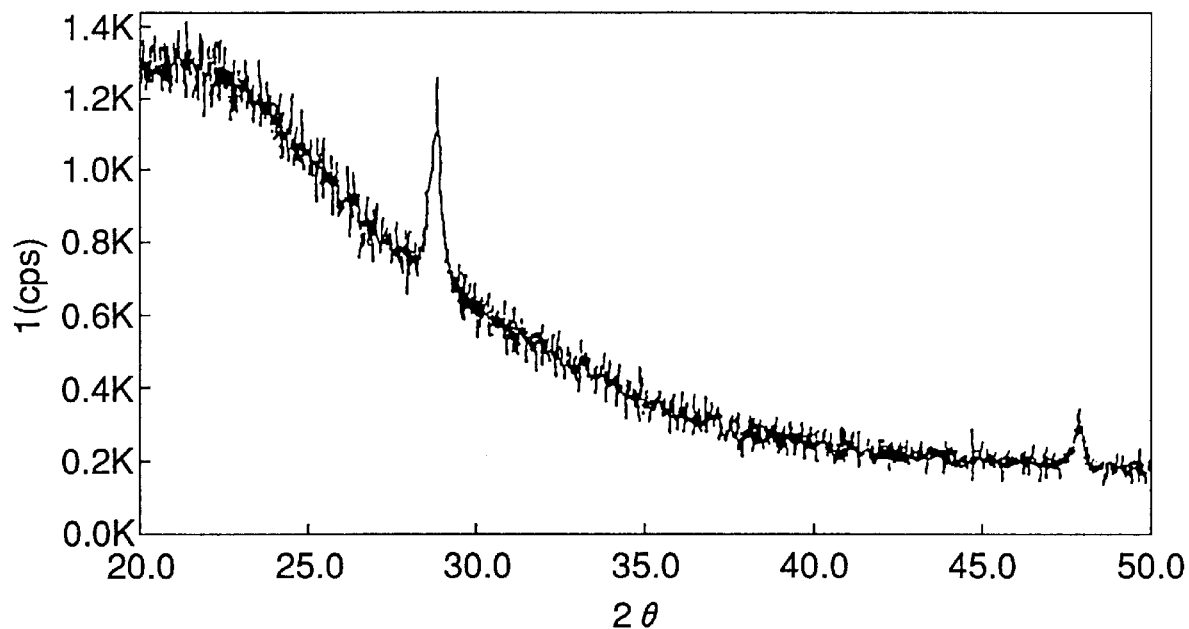
FIG. 8 shows an X-ray diffraction pattern of a high molecular compound/CuCl composite film of Example 34.

The specimen formed on the quartz glass substrate was subjected to X-ray diffractometry and absorption spectrometry. FIG. 8 show X-ray spectrum and absorption spectrum, respectively. As a result, X-ray diffraction spectrum showed diffraction peaks by microcrystal of CuCl, proving that finely divided grains of CuCl can be separated out in this thin film. Further, the absorption spectrum showed two definite absorption peaks in the vicinity of 370 nm. These absorption peaks-correspond to the absorption of excimers of finely divided grains of CuCl. This shows that the material thus prepared can be applied to a nonlinear optical material.

A section of this thin film was observed under a transmission electron microscope. As a result, it was found that this film comprises finely divided grains of CuCl having a size of 5 to 10 nm uniformly dispersed therein in a high density.

Then, the CuCl fine grain-dispersed thin film thus obtained was measured with respect to the nonlinear susceptibility $\chi^{(3)}$ in the same manner as in Example 7. The value of $\chi^{(3)}$ was very high, 2.5×10$^{-8}$ esu.

EXAMPLE 35

A thin film was formed on a quartz glass substrate in the same manner as in Example 34 except that CuBr was used as a starting material of finely divided grains. The thin film thus obtained was a thin film that assumes transparent and light yellow and is homogeneous and insusceptible to crack. The result was 1.3 μm.

This film was subjected to X-ray diffractometry, absorption spectrometry and section observation under a transmission electron microscope in the same manner as in Example 34. This film was found to comprise finely divided grains of CuBr having a size of 5 to 10 nm uniformly dispersed therein in a high density and exhibit absorption of excimers of finely divided grains of CuBr. Thus, this thin film can be applied to a nonlinear optical material.

Then, the CuBr fine grain-dispersed thin film thus obtained was measured with respect to the nonlinear susceptibility $\chi^{(3)}$ in the same manner as in Example 8. The value of $\chi^{(3)}$ was very high, 4.6×10$^{-9}$ esu.

EXAMPLE 36

1.250 g of tetraethoxysilane (Si(OCH$_2$CH$_3$)$_4$) was mixed with 2.0 ml of ethanol and 0.652 g of a 0.5N hydrochloric acid. The mixture was heated to a temperature of 50° C. under reflux for 3 hours to obtain a partial hydrolyzate of tetraethoxysilane. To the solution thus obtained was then added 1.362 g of methyltrimethoxysilane and 1.0 ml of ethanol. To the mixture was then added dropwise 0.375 g of a 0.5N hydrochloric acid with stirring. The mixture was then stirred for 5 hours to undergo hydrolysis. To the sol thus obtained was then added 2.582 g of the CuCl solution obtained in Example 34 to obtain a light yellow transparent solution. The solution thus obtained as a coating solution was then subjected to coating and calcination in the same manner as in Example 34. The thin film thus obtained was then measured for thickness in the same manner as in Example 34. The result was 1.5 μm. The thin film thus obtained was a film that assumes transparent and light yellow and is homogenous and insusceptible to crack. This thin film had a sufficient hardness such that it could not be visually damaged even when rubbed with a metal pin after dried.

This film was subjected to X-ray diffractometry, absorption spectrometry and section observation under a transmission electron microscope in the same manner as in Example 34.

As a result, X-ray diffraction peaks were observed, showing that finely divided grains of CuCl had been separated out in the film. The absorption spectrum showed absorption of excimers of finely divided grains of CuCl. Thus, this thin film can be applied to a nonlinear optical material.

EXAMPLE 37

A thin film was prepared in the same manner as in Example 36 except that methyltrimethoxysilane was replaced by ethyltrimethoxysilane [CH$_3$CH$_2$Si(OCH$_3$)$_3$]. The thin film thus obtained was then measured for thickness in the same manner as in Example 34. The result was 1.8 μm. The thin film thus obtained was a film that assumes transparent and light yellow and is homogenous and insusceptible to crack. This thin film had a sufficient hardness such that it could not be visually damaged even when rubbed with a metal pin after dried.

This film was subjected to X-ray diffractometry, absorption spectrometry and section observation under a transmission electron microscope in the same manner as in Example 34.

As a result, X-ray diffraction peaks were observed, showing that finely divided grains of CuCl had been separated out in the film. The absorption spectrum showed absorption of excimers of finely divided grains of CuCl. Thus, this thin film can be applied to a nonlinear optical material.

Comparative Example 4

2.084 g of tetraethoxysilane was mixed with 2.5 ml of ethanol and 0.721 g of a 0.5N hydrochloric acid. The mixture was heated to a temperature of 50° C. under reflux for 3 hours to obtain a partial hydrolyzate of tetraethoxysilane. To the solution thus obtained was then added 0.210 g of an acetonitrile solution of CuCl. The mixture was then stirred. The solution thus obtained as a coating solution was then subjected to coating and calcination in the same manner as in Example 34. The thin film thus obtained had many cracks thereon and thus were peeled off the substrate, making it impossible to evaluate the properties thereof. Thus, the coating solution was coated on the substrate, and then immediately measured for thickness. The result was 1.3 μm (as calculated at a refrax index of 1.5).

EXAMPLE 38

In a stream of dried nitrogen, 0.236 g of diaminodiphenylether represented by the following general formula (23) and 0.178 g of di(aminophenyl)diethoxysilane represented by the following general formula (40) were dissolved in 10.0 ml of dimethylacetamide. After complete dissolution was made, 0.472 g of pyromellitic dianhydride represented by the general formula (24) was gradually added to the solution. Subsequently, in a stream of dried nitrogen, the mixture was slowly stirred with its temperature kept at 10° to 15° C. for 1 hour. The mixture was further stirred with its temperature kept at 20° to 25° C. for 2 hours to obtain a solution of a high molecular compound represented by the following general formula (41) which has an intrinsic viscosity of 0.92 dl/g at a temperature of 30° C. in dimethylacetamide. The solution of a high molecular compound thus obtained and a turbid colloidal dispersion obtained by mixing 0.065 g of CuCl and 7.5 ml of dimethylacetamide with stirring were then mixed. As a result, the solution turned to a light green transparent liquid in which CuCl had been dissolved. The foregoing mixing procedures were all effected in an atmosphere of dried nitrogen. To the solution was then added 0.133 g of methyltrimethoxysilane. The mixture was then stirred to obtain a uniform solution. To the solution was then added 0.036 g of a 0.05N hydrochloric acid. The mixture was stirred at room temperature for 6 hours to undergo hydrolysis.

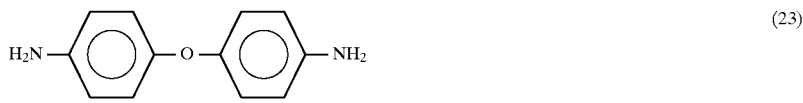

(23)

(24)

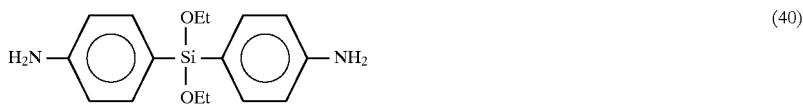

(40)

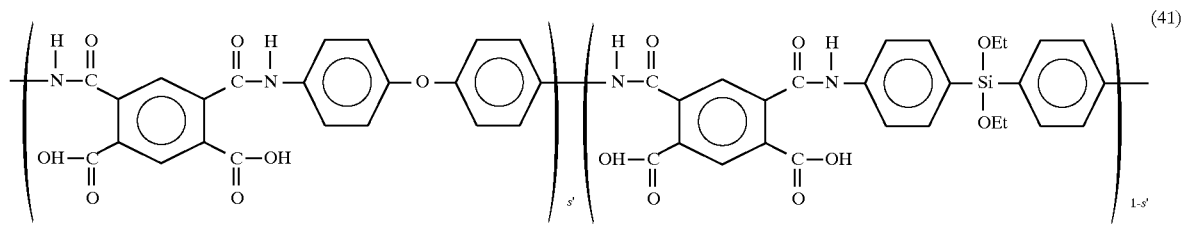

(41)

The solution thus obtained as a coating solution was then spin-coated on a quartz glass substrate to form a thin film. The foregoing procedures were all effected in an atmosphere of dried nitrogen. After dried, the coated material was heated to a temperature of 80° C. in vacuo under a reduced pressure of 1 Torr, and then kept at the same temperature for 1 hour to remove the solvent therefrom and accelerate gelatinization to obtain a light yellow transparent crack-free homogeneous film. The foregoing coating solution was diluted with ethanol three times. The coating solution thus diluted was then spin-coated on a crystalline silicon substrate to form a thin film. This film was heated and dried at the same time with the foregoing film. These specimens were measured for infrared absorption spectrum.

These specimens were then allowed to cool to room temperature. These specimens were heated to a temperature of 200° C. in vacuo under a reduced pressure of $1 \times 10^{-5}$ Torr at a rate of 20° C./min. and then kept at the same temperature for 1 hour. These specimens were then allowed to cool to room temperature in vacuo.

The specimen formed on the crystalline silicon substrate was measured for infrared absorption spectrum before and after heat treatment to effect comparison of the change of absorption spectrum. As a result, it was found that the heat treatment involves the change of the polyamic acid compound represented by the foregoing general formula (41) in the matrix to the polyimide compound represented by following general formula (42). It was also found that methoxy group, ethoxy group and hydroxyl group which had been unreacted before the heat treatment underwent decomposition to cause sol-gel reaction. It was further found that finely divided grains of CuCl can be separated out in this thin film. This shows that the material thus prepared can be applied to a nonlinear optical material. A section of this thin film was observed under a transmission electron microscope. As a result, it was found that this film comprises finely divided grains of CuCl having a size of 5 to 10 nm uniformly dispersed therein in a high density.

This film was subjected to X-ray diffractometry, absorption spectrometry and section observation under a transmission electron microscope in the same manner as in Example 34.

As a result, X-ray diffraction peaks were observed, showing that finely divided grains of CuCl had been separated out in the film. The absorption spectrum showed absorption of excimers of finely divided grains of CuCl. Thus, this thin film can be applied to a nonlinear optical material.

EXAMPLE 40

A thin film was formed on a quartz glass substrate in the same manner as in Example 38 except that the polyamic acid compound represented by the following general formula

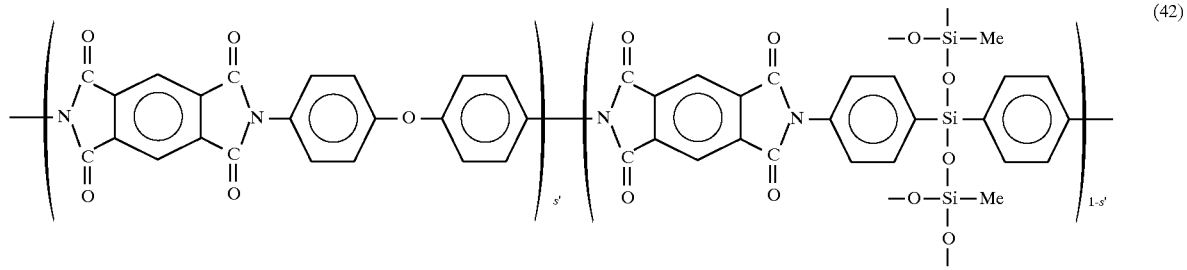

EXAMPLE 39

A thin film was formed on a quartz glass substrate in the same manner as in Example 38 except that CuBr was used as a starting material of finely divided grains. The thin film thus obtained was a thin film that assumes transparent and light yellow and is homogeneous and insusceptible to crack.

This film was subjected to X-ray diffractometry, absorption spectrometry and section observation under a transmission electron microscope in the same manner as in Example 38. This film was found to comprise finely divided grains of CuBr having a size of 10 to 20 nm uniformly dispersed therein in a high density and exhibit absorption of excimers of finely divided grains of CuBr. Thus, this thin film can be applied to a nonlinear optical material.

(44) synthesized from a compound represented by the following general formula (43) was used instead of the compound represented by the foregoing general formula (40). The thin film thus obtained was a thin film that assumes transparent and light yellow and is homogeneous and insusceptible to crack.

This film was subjected to X-ray diffractometry, absorption spectrometry and section observation under a transmission electron microscope in the same manner as in Example 38. This film was found to comprise finely divided grains of CuCl having a size of 5 to 20 nm uniformly dispersed therein in a high density and exhibit absorption of excimers of finely divided grains of CuCl. Thus, this thin film can be applied to a nonlinear optical material.

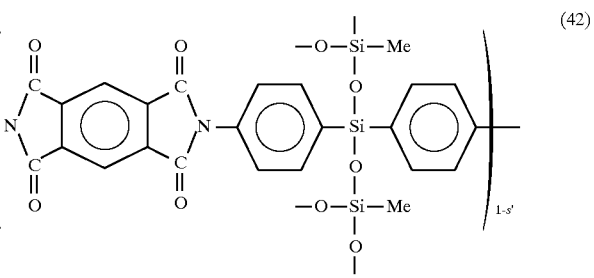

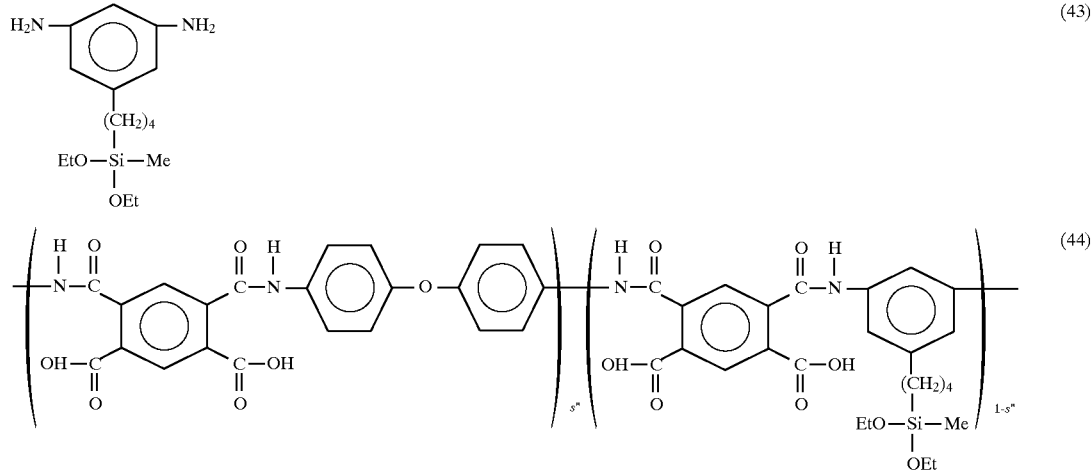

Comparative Example 5

2.084 g of tetraethoxysilane was mixed with 2.5 ml ethanol and 0.721 g of a 0.5N hydrochloric acid. The mixture was heated to a temperature of 50° C. under reflux for 3 hours to obtain a partial hydrolyzate of tetraethoxysilane. The solution thus obtained was then stirred at room temperature for 5 hours to undergo hydrolysis. To the sol thus obtained was then added 0.209 g of an acetonitrile solution of CuCl. The mixture was then stirred. The solution thus obtained as a coating solution was then subjected to coating and calcination in the same manner as in Example 38. The thin film thus obtained had many cracks thereon and thus were peeled off the substrate, making it impossible to evaluate the properties thereof.

EXAMPLE 41

In a stream of dried nitrogen, 0.572 g of diaminodiphenylether represented by the following general formula (23) was dissolved in 20 ml of dimethylacetamide. After complete dissolution was made, 0.628 g of pyromellitic dianhydride represented by the general formula (24) was gradually added to the solution. Subsequently, in a stream of dried nitrogen, the mixture was slowly stirred with its temperature kept at 10 to 15° C. for 1 hour. The mixture was further stirred with its temperature kept at 20° to 25° C. for 2 hours to obtain a solution of a high molecular compound represented by the general formula (5). To the solution of a high molecular compound was added 0.20 g of $ZnCl_2$ with stirring to obtain a light-yellow clear liquid.

The thus obtained solution was spin-coated or a glass substrate and heated at 70° C. for 30 minutes in vacuo to remove the solvent, whereby a light-yellow transparent film was obtained. The film was then subjected to a heat treatment at 250° C. for one hour in a stream of a mixed gas of $O_2$ and $H_2O$ at the rate of 100 ml/min. The mixed gas was obtained by bubbling oxygen gas in water. An X-ray diffractometry of the treated film revealed that finely divided grains of ZnO were precipitated in the film. The grain size of the precipitate was 5 to 50 nm when measured with a transmission electron microscope. As the ZnO grains were small so that the resulting film was transparent and appeared light-yellow.

As mentioned above, the nonlinear optical material according to the present invention comprises finely divided grains of a semiconductor or metal which have been separated out by the change of functional groups in a matrix, which finely divided grains being dispersed therein. Thus, when coated on a substrate to form a thin film, it provides a nonlinear optical element having a sufficient thickness that is insusceptible to crack and exhibits a high nonlinear optical effect. Further, the nonlinear optical material according to the present invention can comprise finely divided grains of a semiconductor or metal having a nonlinear optical effect stably retained in a high molecular compound or analogy to glass in a high concentration, making it possible to provide a material which exhibits a high nonlinear optical effect and mechanical strength and an excellent optical transparency.

Accordingly, the nonlinear optical material according to the present invention can be effectively used in the field of optoelectronics. That is, it can be used as photo switch or photo memory or for wavelength conversion, automatic correction of optical system or light computing.

In the present invention, a nonlinear optical material can be prepared at a low temperature, making it possible to provide a material which can easily decompose or evaporate on heating. Further, since a functional gel can be prepared beginning with the solution state, no complicated preparation procedures are required, making it easy to change the shape of the gel. Thus, in accordance with the present invention, the nonlinear optical material can be formed into any shape such as film, plate, block and fiber.

While the invention has been described in detail and with reference to specific embodiments thereof, it will be apparent to one skilled in the art that various changes and modifications can be made therein without departing from the spirit and scope thereof.

What is claimed is:

1. A process for the preparation of a nonlinear optical element that gives a nonlinear response to incident light, comprising:

mixing a solution of a matrix-forming substance containing a functional group with a metal, a semiconductor or precursor thereof to form a uniform solution, accelerating dissolution of said metal, semiconductor or precursor by interaction with said functional group;

reducing or eliminating said interaction between said functional group and said metal, semiconductor, or precursor to form a matrix while precipitating finely divided grains of said metal or semiconductor in said matrix.

2. The process for the preparation of a nonlinear optical element according to claim 1, wherein the reaction of a functional group is an imide ring formation reaction.

3. The process for the preparation of a nonlinear optical element according to claim 1, wherein the reaction of a functional group is an acid addition salt formation reaction by the acid treatment of an amino compound.

4. The process for the preparation of a nonlinear optical element according to claim 1, wherein as said matrix-forming substance containing a functional group there is used a high molecular compound containing a repeating structural unit represented by the following general formula (9):

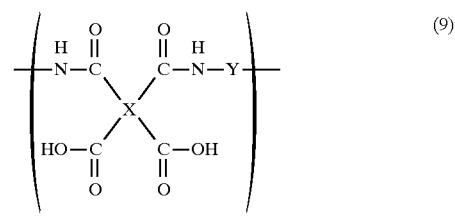

wherein X represents a tetravalent organic group having not less than 2 carbon atoms; and Y represents a divalent organic group having not less than 2 carbon atoms.

5. The process for the preparation of a nonlinear optical element according to claim 1, wherein as said matrix-forming substance containing a functional group there is used at least one high molecular compound containing in its side chain or crosslinked moiety an amide acid structure represented by any one of the following general formulae (10) to (12):

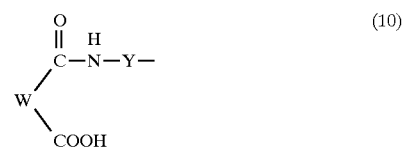

-continued

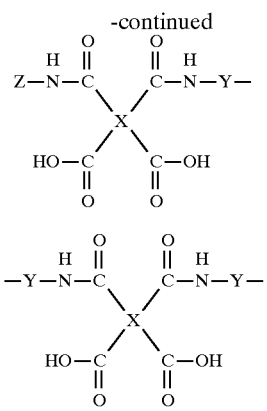

(11)

(12)

wherein X represents a tetravalent organic group having not less than 2 carbon atoms; Y represents a divalent organic group having not less than 2 carbon atoms; W represents an organic group having not less than 2 carbon atoms necessary for the formation of an imide ring; and Z represents an alkyl, aryl or aralkyl group.

6. The process for the preparation of a nonlinear optical element according to of claim 1, wherein said finely divided grains of a semiconductor are finely divided grains of cuprous halide.

* * * * *